United States Patent
Sato et al.

(10) Patent No.: US 9,794,563 B2
(45) Date of Patent: Oct. 17, 2017

(54) IMAGE PROCESSING APPARATUS AND METHOD

(71) Applicant: SONY CORPORATION, Tokyo (JP)

(72) Inventors: Kazushi Sato, Kanagawa (JP); Yoshitaka Morigami, Tokyo (JP); Shuo Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 339 days.

(21) Appl. No.: 14/403,747

(22) PCT Filed: Jun. 21, 2013

(86) PCT No.: PCT/JP2013/067109
§ 371 (c)(1),
(2) Date: Nov. 25, 2014

(87) PCT Pub. No.: WO2014/002897
PCT Pub. Date: Jan. 3, 2014

(65) Prior Publication Data
US 2015/0139305 A1  May 21, 2015

(30) Foreign Application Priority Data

Jun. 29, 2012  (JP) ................................ 2012-147877
Jul. 6, 2012  (JP) ................................ 2012-153112

(51) Int. Cl.
*H04N 19/124* (2014.01)
*H04N 19/70* (2014.01)
(Continued)

(52) U.S. Cl.
CPC .......... *H04N 19/124* (2014.11); *H04N 19/12* (2014.11); *H04N 19/157* (2014.11); *H04N 19/176* (2014.11); *H04N 19/70* (2014.11)

(58) Field of Classification Search
CPC .... H04N 19/124; H04N 19/70; H04N 19/176; H04N 19/12; H04N 19/157
See application file for complete search history.

(56) References Cited

U.S. PATENT DOCUMENTS

| 2012/0128065 A1 | 5/2012 | Shibahara et al. |
| 2013/0051457 A1* | 2/2013 | Joshi .................... H04N 19/147 375/240.03 |
| 2013/0343448 A1* | 12/2013 | He ....................... H04N 19/176 375/240.03 |

FOREIGN PATENT DOCUMENTS

CN  102474270 A  5/2012

OTHER PUBLICATIONS

Extended European Search Report issued on Mar. 4, 2016 in Patent Application No. 13810643.0.
(Continued)

*Primary Examiner* — Nam Pham
(74) *Attorney, Agent, or Firm* — Oblon, McClelland, Maier & Neustadt, L.L.P.

(57) ABSTRACT

The present disclosure relates to an image processing device and a method capable of suppressing the reduction of an image quality due to encoding/decoding. The image processing device includes: a quantization unit that when orthogonal transform processing is skipped with respect to a current block, quantizes all components of the current block using one weighting coefficient and when the orthogonal transform processing is performed on the current block, quantizes each component of the current block using a quantization matrix; an encoding unit that encodes the coefficient of the current block which is quantized by the quantization unit; and a transmission unit that transmits the coded data of the current block which is obtained by being
(Continued)

encoded by the encoding unit. The present disclosure can be applied to, for example, an image processing device.

11 Claims, 40 Drawing Sheets

(51) Int. Cl.
*H04N 19/176* (2014.01)
*H04N 19/12* (2014.01)
*H04N 19/157* (2014.01)

(56) References Cited

OTHER PUBLICATIONS

Extended European Search Report issued on Mar. 4, 2016 in Patent Application No. 13810165.4.
Marta Mrak, et al. "Complexity reduction for intra transform skipping proposal JCTVC-I0408", Joint Collaborative Team on Video Coding (JCT-VC) of ITU-T SG 16 WP 3 and ISO/IEC JTC 1/SC 29/WG 11, 9th Meeting, JCTVC-I 564, XP030112327, Apr. 27-May 7, 2012, pp. 1-8.
Matteo Naccari, et al., "CE5.a: Quantization for transform skipping", Joint Collaborative Team on Video Coding (JCT-VC) of ITU-T SG16 WP3 and Iso/Iec JTC1/SC29/WG11, 8th Meeting, JCTVC-H0208, XP030111235, Feb. 1-10, 2012, pp. 1-8.
Benjamin Bross, et al., "WD4: Working Draft 4 of High-Efficiency Video Coding" Joint Collaborative Team on Video Coding (JCT-VC)-F803 of ITU-T SG16 WP3 and ISO/IEC JTC1/SC29/WG11, Jul. 14-22, 2011, 226 Pages.
Cuiling Lan, et al., "Intra Transform Skipping" Joint Collaborative Team on Video Coding (JTC-VC)-I0408, Apr. 27, 2012, 49 Pages.
Office Action dated Jun. 6, 2017 in Japanese Patent Application No. 2014-522593.
Office Action dated Jun. 6, 2017 in Japanese Patent Application No. 2014-522595.
Cuiling Lan et al., "Intra transform skipping", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-I0408, pp. 1-11.
Cuiling Lan et al., "Intra and inter coding tools for screen contents", Joint Collaborative Team on Video Coding (JCT-VC) of ITU-T SG16 WP3 and ISO/IEC JTC1/SC29/WG 11, 5th Meeting: Geneva, CH, Mar. 16-23, 2011, JCTVC-E145, Pages 1-11.
Office Action cited in Chinese Application No, 201380032800.5 dated Jun. 7, 2017 with English translation.

\* cited by examiner

FIG. 4

| seq_parameter_set_rbsp( ) { | Descriptor |
|---|---|
| profile_space | u(3) |
| profile_idc | u(5) |
| constraint_flags | u(16) |
| level_idc | u(8) |
| for (i = 0; i < 32; i++) | |
|     profile_compatability_flag[i] | u(1) |
| seq_parameter_set_id | ue(v) |
| video_parameter_set_id | ue(v) |
| chroma_format_idc | ue(v) |
| if(chroma_format_idc == 3) | |
|     separate_colour_plane_flag | u(1) |
| sps_max_temporal_layers_minus1 | u(3) |
| pic_width_in_luma_samples | ue(v) |
| pic_height_in_luma_samples | ue(v) |
| pic_cropping_flag | u(1) |
| if(pic_cropping_flag) { | |
|     pic_crop_left_offset | ue(v) |
|     pic_crop_right_offset | ue(v) |
|     pic_crop_top_offset | ue(v) |
|     pic_crop_bottom_offset | ue(v) |
| } | |
| bit_depth_luma_minus8 | ue(v) |
| bit_depth_chroma_minus8 | ue(v) |
| [Ed. (BB):chroma bit depth present in HM software but not used further] | |
| pcm_enabled_flag | u(1) |
| if(pcm_enabled_flag) { | |
|     pcm_sample_bit_depth_luma_minus1 | u(4) |
|     pcm_sample_bit_depth_chroma_minus1 | u(4) |
| } | |
| log2_max_pic_order_cnt_lsb_minus4 | ue(v) |
| for (i = 0; i <= sps_max_temporal_layers_minus1; i++) { | |
|     sps_max_dec_pic_buffering[i] | ue(v) |
|     sps_num_reorder_pics[i] | ue(v) |
|     sps_max_latency_increase[i] | ue(v) |
| } | |
| restricted_ref_pic_lists_flag | u(1) |
| if(restricted_ref_pic_lists_flag ) | |
|     lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if(pcm_enabled_flag) { | |
|     log2_min_pcm_coding_block_size_minus3 | ue(v) |
|     log2_diff_max_min_pcm_coding_block_size | ue(v) |
| } | |

FIG. 5

| | |
|---|---|
| max_transform_hierarchy_depth_inter | ue(v) |
| max_transform_hierarchy_depth_intra | ue(v) |
| scaling_list_enable_flag | u(1) |
| if(scaling_list_enable_flag ){ | |
|   sps_scaling_list_data_present_flag | u(1) |
|   if(sps_scaling_list_data_present_flag ) | |
|     scaling_list_param( ) | |
| } | |
| chroma_pred_from_luma_enabled_flag | u(1) |
| transform_skip_enabled_flag | u(1) |
| seq_loop_filter_across_slices_enabled_flag | u(1) |
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |
| if(adaptive_loop_filter_enabled_flag) | |
|   alf_coef_in_slice_flag | u(1) |
| if(pcm_enabled_flag) | |
|   pcm_loop_filter_disable_flag | u(1) |
| sps_temporal_id_nesting_flag | u(1) |
| [Ed. (BB):xy padding syntax missing here, present in HM software] | |
| if(log2_min_coding_block_size_minus3 == 0) | |
|   inter_4x4_enabled_flag | u(1) |
| num_short_term_ref_pic_sets | ue(v) |
| for(i = 0; i < num_short_term_ref_pic_sets; i++) | |
|   short_term_ref_pic_set(i) | |
| long_term_ref_pics_present_flag | u(1) |
| sps_temporal_mvp_enable_flag | u(1) |
| vui_parameters_present_flag | u(1) |
| if(vui_parameters_present_flag ) | |
|   vui_parameters( ) | |
| sps_extension_flag | u(1) |
| if(sps_extension_flag) | |
|   while(more_rbsp_data( )) | |
|     sps_extension_data_flag | u(1) |
| rbsp_trailing_bits( ) | |
| } | |

FIG. 6

| pic_parameter_set_rbsp( ) { | Descriptor |
|---|---|
|   pic_parameter_set_id | ue(v) |
|   seq_parameter_set_id | ue(v) |
|   sign_data_hiding_flag | u(1) |
|   if(sign_data_hiding_flag) | |
|     sign_hiding_threshold | u(4) |
|   cabac_init_present_flag | u(1) |
|   num_ref_idx_l0_default_active_minus1 | ue(v) |
|   num_ref_idx_l1_default_active_minus1 | ue(v) |
| [Ed. (BB): not present in HM software] | |
|   pic_init_qp_minus26 | se(v) |
|   constrained_intra_pred_flag | u(1) |
|   slice_granularity | u(2) |
|   diff_cu_qp_delta_depth | ue(v) |
|   cb_qp_offset | se(v) |
|   cr_qp_offset | se(v) |
|   weighted_pred_flag | u(1) |
|   weighted_bipred_idc | u(2) |
|   output_flag_present_flag | u(1) |
|   transquant_bypass_enable_flag | u(1) |
|   dependent_slice_enabled_flag | u(1) |
|   tiles_or_entropy_coding_sync_idc | u(2) |
|   if(tiles_or_entropy_coding_sync_idc == 1) { | |
|     num_tile_columns_minus1 | ue(v) |
|     num_tile_rows_minus1 | ue(v) |
|     uniform_spacing_flag | u(1) |
|     if(!uniform_spacing_flag) { | |
|       for(i = 0; i < num_tile_columns_minus1; i++) | |
|         column_width[i] | ue(v) |
|       for(i = 0; i < num_tile_rows_minus1; i++) | |
|         row_height[i] | ue(v) |
|     } | |
|     loop_filter_across_tiles_enabled_flag | u(1) |
|   } else if(tiles_or_entropy_coding_sync_idc == 3) | |
|     cabac_independent_flag | u(1) |
|   deblocking_filter_control_present_flag | u(1) |
|   if(deblocking_filter_control_present_flag) { | |
|     deblocking_filter_override_enabled_flag | u(1) |
|     pps_disable_deblocking_filter_flag | u(1) |
|     if(!pps_disable_deblocking_filter_flag) { | |
|       beta_offset_div2 | se(v) |
|       tc_offset_div2 | se(v) |
|     } | |
|   } | |
|   pps_scaling_list_data_present_flag | u(1) |
|   if(pps_scaling_list_data_present_flag) | |
|     scaling_list_param( ) | |

FIG. 7

| | |
|---|---|
| log2_parallel_merge_level_minus2 | ue(v) |
| slice_header_extension_present_flag | u(1) |
| slice_extension_present_flag | u(1) |
| pps_extension_flag | u(1) |
| if(pps_extension_flag) | |
|     while( more_rbsp_data( )) | |
|         pps_extension_data_flag | u(1) |
| rbsp_trailing_bits( ) | |
| } | |

FIG. 9

| seq_parameter_set_rbsp( ) { | Descriptor |
|---|---|
| profile_space | u(3) |
| profile_idc | u(5) |
| constraint_flags | u(16) |
| level_idc | u(8) |
| for (i = 0; i < 32; i++) | |
|     profile_compatability_flag[i] | u(1) |
| seq_parameter_set_id | ue(v) |
| video_parameter_set_id | ue(v) |
| chroma_format_idc | ue(v) |
| if (chroma_format_idc == 3) | |
|     separate_colour_plane_flag | u(1) |
| sps_max_temporal_layers_minus1 | u(3) |
| pic_width_in_luma_samples | ue(v) |
| pic_height_in_luma_samples | ue(v) |
| pic_cropping_flag | u(1) |
| if (pic_cropping_flag) { | |
|     pic_crop_left_offset | ue(v) |
|     pic_crop_right_offset | ue(v) |
|     pic_crop_top_offset | ue(v) |
|     pic_crop_bottom_offset | ue(v) |
| } | |
| bit_depth_luma_minus8 | ue(v) |
| bit_depth_chroma_minus8 | ue(v) |
| [Ed. (BB):chroma bit depth present in HM software but not used further] | |
| pcm_enabled_flag | u(1) |
| if (pcm_enabled_flag) { | |
|     pcm_sample_bit_depth_luma_minus1 | u(4) |
|     pcm_sample_bit_depth_chroma_minus1 | u(4) |
| } | |
| log2_max_pic_order_cnt_lsb_minus4 | ue(v) |
| for (i = 0; i <= sps_max_temporal_layers_minus1; i++) { | |
|     sps_max_dec_pic_buffering[i] | ue(v) |
|     sps_num_reorder_pics[i] | ue(v) |
|     sps_max_latency_increase[i] | ue(v) |
| } | |
| restricted_ref_pic_lists_flag | u(1) |
| if (restricted_ref_pic_lists_flag) | |
|     lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if (pcm_enabled_flag) { | |
|     log2_min_pcm_coding_block_size_minus3 | ue(v) |
|     log2_diff_max_min_pcm_coding_block_size | ue(v) |
| } | |

FIG. 10

| | |
|---|---|
| max_transform_hierarchy_depth_inter | ue(v) |
| max_transform_hierarchy_depth_intra | ue(v) |
| sps_transform_skip_enabled_flag | u(1) |
| scaling_list_enable_flag | u(1) |
| if(scaling_list_enable_flag) { | |
| sps_scaling_list_data_present_flag | u(1) |
| if(sps_scaling_list_data_present_flag) | |
| scaling_list_param() | |
| } | |
| chroma_pred_from_luma_enabled_flag | u(1) |
| transform_skip_enabled_flag | u(1) |
| seq_loop_filter_across_slices_enabled_flag | u(1) |
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |
| if(adaptive_loop_filter_enabled_flag) | |
|    alf_coef_in_slice_flag | u(1) |
| if(pcm_enabled_flag) | |
|    pcm_loop_filter_disable_flag | u(1) |
| sps_temporal_id_nesting_flag | u(1) |
| [Ed. (BB):xy padding syntax missing here, present in HM software] | |
| if(log2_min_coding_block_size_minus3 == 0) | |
|    inter_4x4_enabled_flag | u(1) |
| num_short_term_ref_pic_sets | ue(v) |
| for(i = 0; i < num_short_term_ref_pic_sets; i++) | |
|    short_term_ref_pic_set(i) | |
| long_term_ref_pics_present_flag | u(1) |
| sps_temporal_mvp_enable_flag | u(1) |
| vui_parameters_present_flag | u(1) |
| if(vui_parameters_present_flag) | |
|    vui_parameters( ) | |
| sps_extension_flag | u(1) |
| if(sps_extension_flag | |
|    while(more_rbsp_data( )) | |
|      sps_extension_data_flag | u(1) |
| rbsp_trailing_bits( ) | |
| } | |

FIG. 11

| pic_parameter_set_rbsp( ) { | Descriptor |
|---|---|
| pic_parameter_set_id | ue(v) |
| seq_parameter_set_id | ue(v) |
| sign_data_hiding_flag | u(1) |
| if(sign_data_hiding _flag) | |
| sign_hiding_threshold | u(4) |
| cabac_init_present_flag | u(1) |
| num_ref_idx_l0_default_active_minus1 | ue(v) |
| num_ref_idx_l1_default_active_minus1 | ue(v) |
| [Ed. (BB):not present in HM software] | |
| pic_init_qp_minus26 | se(v) |
| constrained_intra_pred_flag | u(1) |
| slice_granularity | u(2) |
| diff_cu_qp_delta_depth | ue(v) |
| cb_qp_offset | se(v) |
| cr_qp_offset | se(v) |
| weighted_pred_flag | u(1) |
| weighted_bipred_idc | u(2) |
| output_flag_present_flag | u(1) |
| transquant_bypass_enable_flag | u(1) |
| dependent_slice_enabled_flag | u(1) |
| tiles_or_entropy_coding_sync_idc | u(2) |
| if(tiles_or_entropy_coding_sync_idc == 1) { | |
| num_tile_columns_minus1 | ue(v) |
| num_tile_rows_minus1 | ue(v) |
| uniform_spacing_flag | u(1) |
| if(!uniform_spacing_flag) { | |
| for(i = 0; < num_tile_columns_minus1;i++) | |
| column_width[i] | ue(v) |
| or(i = 0;i < num_tile_rows_minus1;i++) | |
| row_height[i] | ue(v) |
| } | |
| loop_filter_across_tiles_enabled_flag | u(1) |
| } else if(tiles_or_entropy_coding_sync_idc == 3) | |
| cabac_independent_flag | u(1) |
| deblocking_filter_control_present_flag | u(1) |
| if(deblocking_filter_control_present_flag) { | |
| deblocking_filter_override_enabled_flag | u(1) |
| pps_disable_deblocking_filter_flag | u(1) |
| if(!pps_disable_deblocking_filter_flag) { | |
| beta_offset_div2 | se(v) |
| tc_offset_div2 | se(v) |
| } | |
| } | |
| pps_transform_skip_enabled_flag | u(1) |
| pps_scaling_list_data_present_flag | u(1) |
| if(pps_scaling_list_data_present_flag) | |

FIG. 12

| | |
|---|---|
| scaling_list_param( ) | |
| log2_parallel_merge_level_minus2 | ue(v) |
| slice_header_extension_present_flag | u(1) |
| slice_extension_present_flag | u(1) |
| pps_extension_flag | u(1) |
| if( pps_extension_flag ) | |
|    while( more_rbsp_data( ) ) | |
|      pps_extension_data_flag | u(1) |
| rbsp_trailing_bits( ) | |
| } | |

FIG. 24

| seq_parameter_set_rbsp() { | Descriptor |
|---|---|
| ... | |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if(pcm_enabled_flag) { | |
| log2_min_pcm_coding_block_size_minus3 | ue(v) |
| log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | u(1) |
| if(scaling_list_enable_flag) { | |
| sps_scaling_list_data_present_flag | u(1) |
| if(sps_scaling_list_data_present_flag) | |
| scaling_list_param() | |
| } | |
| chroma_pred_from_luma_enabled_flag | u(1) |
| if(log2_min_transform_block_size_minus2 == 0) { | |
| transform_skip_enabled_flag | u(1) |
| } | |
| ... | |
| } | |

FIG. 25

| pic_parameter_set_rbsp() { | Descriptor |
|---|---|
| ... | ue(v) |
| pps_log2_min_transform_block_size_minus2 | u(1) |
| if(pps_log2_min_transform_block_size_minus2 == 0) { | |
| transform_skip_enabled_flag | |
| } | |
| pps_scaling_list_data_present_flag | u(1) |
| if(pps_scaling_list_data_present_flag) | |
| scaling_list_param() | |
| log2_parallel_merge_level_minus2 | ue(v) |
| slice_header_extension_present_flag | u(1) |
| slice_extension_present_flag | u(1) |
| pps_extension_flag | u(1) |
| if(pps_extension_flag ) | |
| while(more_rbsp_data()) | |
| pps_extension_data_flag | u(1) |
| rbsp_trailing_bits() | |
| } | |

IMAGE PROCESSING APPARATUS AND METHOD

TECHNICAL FIELD

The present disclosure relates to an image processing device and method, and more particularly relates to an image processing device and method capable of suppressing image deterioration.

BACKGROUND ART

In recent years, devices have come into widely use in which an image is subjected to compression encoding by employing a coding system by handling image information as digital, and at this time compressing the image by orthogonal transform, such as discrete cosine transform or the like, and motion compensation, taking advantage of redundancy which is a feature of the image information, in order to perform highly efficient transmission and storage of information. Examples of this coding system include a Moving Picture Experts Group (MPEG) and so forth.

In particular, MPEG2 (ISO/IEC 13818-2) is defined as a general-purpose image coding system, and is a standard that covers both interlaced scanning images and progressive scanning images as well as standard-resolution images and high-definition images. For example, the MPEG2 is currently widely used in a wide range of applications for professional use and for consumer use. With use of the MPEG2 compression method, in the case of a standard-resolution interlaced scanning image having, for example, 720×480 pixels, an amount of encode (bit rate) of 4 to 8 Mbps is allocated. In addition, with use of the MPEG-2 compression method, in the case of a high-resolution interlaced scanning image having, for example, 1920×1088 pixels, an amount of encode (bit rate) of 18 to 22 Mbps is allocated. Owing to this, it is possible to realize a high compression rate and favorable image quality.

The MPEG2 has been mainly used for high image quality encoding suitable for broadcasting, but has not been compatible with coding systems of an amount of encode (bit rate) lower than that of MPEG1, in other words, a higher compression rate. With the widespread use of mobile terminals, it is expected that the demand for such a coding system will increase in the future, and in response to this, standardization of a MPEG4 coding system has been performed. With regard to an image coding system, the specification thereof was approved as an international standard as ISO/IEC 14496-2 in December 1998.

Further, in recent years, standardization of a standard called H.26L (ITU-T (International Telecommunication Union Telecommunication Standardization Sector) Q6/16 VCEG (Video Coding Expert Group)) has progressed, the object of which was initially image encoding for videoconferencing usage. With H.26L, it has been known that though greater computation amount is requested for encoding and decoding thereof as compared to a conventional coding system such as MPEG2 or MPEG4, higher encoding efficiency is realized. Also, currently, as part of activity of MPEG4, standardization including a function that is not supported by H.26L with this H.26L taken as base to realize higher encoding efficiency has been performed as Joint Model of Enhanced-Compression Video Coding.

As a standardization schedule, an international standard called H.264 and MPEG-4 Part 10 (Advanced Video Coding, hereinafter referred to as AVC) was established in March 2003.

Furthermore, as an extension of the H.264/AVC, standardization of FRExt (Fidelity Range Extension), including encoding tools necessary for business use, such as RGB, 4:2:2, or 4:4:4, as well as 8×8 DCT and quantization matrices defined in MPEG-2, was completed in February 2005. Accordingly, a coding system capable of favorably expressing even film noise included in movies, using H.264/AVC, has been established, which is used for a wide range of applications such as Blu-Ray Discs (registered trademark).

However, there have recently been growing needs for encoding at a higher compression rate, for example, needs for compressing an image having about 4000×2000 pixels, which is four times that of a high-vision image, or for distributing high-vision images in an environment with a limited transmission capacity, such as the Internet. Therefore, in a Video Coding Expert Group (VCEG) under ITU-T, which is described above, studies for improving encoding efficiency have been continuously performed.

Therefore, for the purpose of further improving an encoding efficiency compared with the AVC, standardization of a coding system called High Efficiency Video Coding (HEVC) is currently being conducted by Joint Collaboration Team-Video Coding (JCTVC), which is a joint standardization team of ITU-T and ISO/IEC (see, for example, Non-Patent Document 1).

However, in the HEVC standard disclosed in Non-Patent Document 1, a technique called "Intra Transform Skipping" is employed (see, for example, Non-Patent Document 2).

That is, first, a flag relating whether Transform Skip (referred also to as an "orthogonal transform skip") is applicable in the sequence, is transmitted to a Sequence Parameter Set (SPS).

When the value is 1, it is possible to apply the TransformSkip to 4×4 luminance and chrominance orthogonal transform blocks.

A flag relating on/off of the TransformSkip is transmitted to each block.

With respect to the block to which the TransformSkip is applied, there is no change in entropy encoding, quantization, loop filter processing or the like.

CITATION LIST

Non-Patent Document

Non-Patent Document 1: Benjamin Bross, Woo-Jin Han, Jens-Rainer Ohm, Gary J. Sullivan, Thomas Wiegand, "Working Draft 4 of High-Efficiency Video Coding", JCTVC-F803_d2, Joint Collaborative Team on Video Coding (JCT-VC) of ITU-T SG16 WP3 and ISO/IEC JTC1/SC29/WG11 6th Meeting: Torino, IT, 14-22 Jul. 2011

Non-Patent Document 2: Cuiling Lan, Jizheng Xu, Gary J. Sullivan, Feng Wu, "Intra transform skipping", JCTVC-I0408, Joint Collaborative Team on Video Coding (JCT-VC) of ITU-T SG 16 WP 3 and ISO/IEC JTC 1/SC 29/WG 119th Meeting: Geneva, CH, 27 Apr. -7 May 2012

SUMMARY OF THE INVENTION

Problems to be Solved by the Invention

However, a coefficient of a block to which a Transform-Skip is applied is a value relating to a spatial domain, a coefficient of a block to which the TransformSkip is not applied is a value relating to a frequency domain, and thus both characteristics are different from each other.

For this reason, when an encoding process is performed on both of the block to which the TransformSkip is applied and the block to which the TransformSkip is not applied without taking the difference in these characteristics into consideration, there is a concern that encoding efficiency is deteriorated.

The present disclosure is developed in consideration of such a situation and can suppress the reduction of image quality due to encoding/decoding processes.

Solutions to Problems

According to an aspect of the present disclosure, there is provided an image processing device including: a decoding unit that decodes coded data and generates a quantized coefficient; and an inverse quantization unit that uses a weighting coefficient applied to an orthogonal transform skip block, in which orthogonal transform processing is skipped, to inversely quantize the quantized coefficient of the orthogonal transform skip block generated by the decoding unit.

The inverse quantization unit may use the one weighting coefficient.

The inverse quantization unit may inversely quantize a quantized coefficient of an orthogonal transform skip block having a block size of 4×4, using the weighting coefficient.

The image processing device may further include a receiving unit that receives skip enable information transmitted as a picture parameter set and indicating whether or not to enable the skip of the orthogonal transform processing.

The receiving unit may further receive the transmitted weighting coefficient, and the inverse quantization unit may inversely quantize the quantized coefficient of the orthogonal transform skip block, using the weighting coefficient received by the receiving unit.

The inverse quantization unit may inversely quantize a quantized coefficient of a non-orthogonal transform skip block in which the orthogonal transform processing is performed, using a quantization matrix different from a weighting coefficient matrix obtained by performing matrix processing on the weighting coefficient.

The image processing device may further include a transmission unit that extracts a desired channel signal by receiving broadcasting signals and obtains coded data by decoding the extracted signal, and the decoding unit may decode the coded data obtained from the broadcasting signals by the transmission unit.

The image processing device may further include a demultiplexer that demultiplexes and separates the transmitted coded data into video coded data and audio coded data, and the decoding unit may decode the video coded data separated from the audio coded data by the demultiplexer.

The image processing device may further include a reproduction unit that reproduces video data obtained by performing decoding processing by the decoding unit and inverse quantization processing by the inverse quantization unit on the coded data.

The image processing device may further include an audio codec unit that performs encoding and decoding on audio data.

The image processing device may further include a reproduction unit that reads out coded data recorded on a storage medium, and the decoding unit may decode the coded data read out from the storage medium by the reproduction unit.

According to another aspect of the present disclosure, there is provided an image processing method including: decoding coded data and generating a quantized coefficient; and inversely quantizing the generated quantized coefficient of the orthogonal transform skip block using a weighting coefficient applied to an orthogonal transform skip block in which orthogonal transform processing is skipped.

In the another aspect of the present disclosure, coded data is decoded, a quantized coefficient is generated, and a weighting coefficient applied to an orthogonal transform skip block, in which orthogonal transform processing is skipped, are used to inversely quantize the generated quantized coefficient of the orthogonal transform skip block.

Further, the image processing device described above may be an independent device or may be an internal block constituting one image decoding device.

Effects of the Invention

According to the present disclosure, it is possible to decode an image. In particular, it is possible to suppress the reduction of image quality due to decoding.

BRIEF DESCRIPTION OF DRAWINGS

FIG. 4 is a diagram illustrating an example of a sequence parameter set.

FIG. 5 is a diagram illustrating an example of the sequence parameter set which follows FIG. 4.

FIG. 6 is a diagram illustrating an example of a picture parameter set.

FIG. 7 is a diagram illustrating an example of the picture parameter set which follows FIG. 6.

FIG. 9 is a diagram illustrating an example of a sequence parameter set.

FIG. 10 is a diagram illustrating an example of the sequence parameter set which follows FIG. 9.

FIG. 11 is a diagram illustrating an example of a picture parameter set.

FIG. 12 is a diagram illustrating an example of the picture parameter set which follows FIG. 11.

FIG. 13 is a block diagram illustrating an example of a main configuration of an orthogonal transform skip or the like.

FIG. 20 is a block diagram illustrating an example of a main configuration of an inverse orthogonal transform skip unit or the like.

FIG. 24 is a diagram illustrating another example of a sequence parameter set.

FIG. 25 is a diagram illustrating an example of a picture parameter set.

MODE FOR CARRYING OUT THE INVENTION

Hereinafter, modes for carrying out the present disclosure (hereinafter, referred to as embodiments) will be described. Further, the description is given in the following order.

1. First embodiment (Image encoding device)
2. Second embodiment (Image decoding device)
3. Third embodiment (Transmission control of skip enable information)
4. Fourth embodiment (Multiple viewpoint image encoding/Multiple viewpoint image decoding device)
5. Fifth embodiment (Hierarchical image encoding/Hierarchical image decoding device)
6. Sixth embodiment (Computer)
7. Seventh embodiment (Application example)
8. Eighth embodiment (Application example of scalable encoding)
9. Ninth embodiment (Set/Unit/Module/Processor)

<1. First Embodiment>
[Image Encoding Device]

Figure 1:
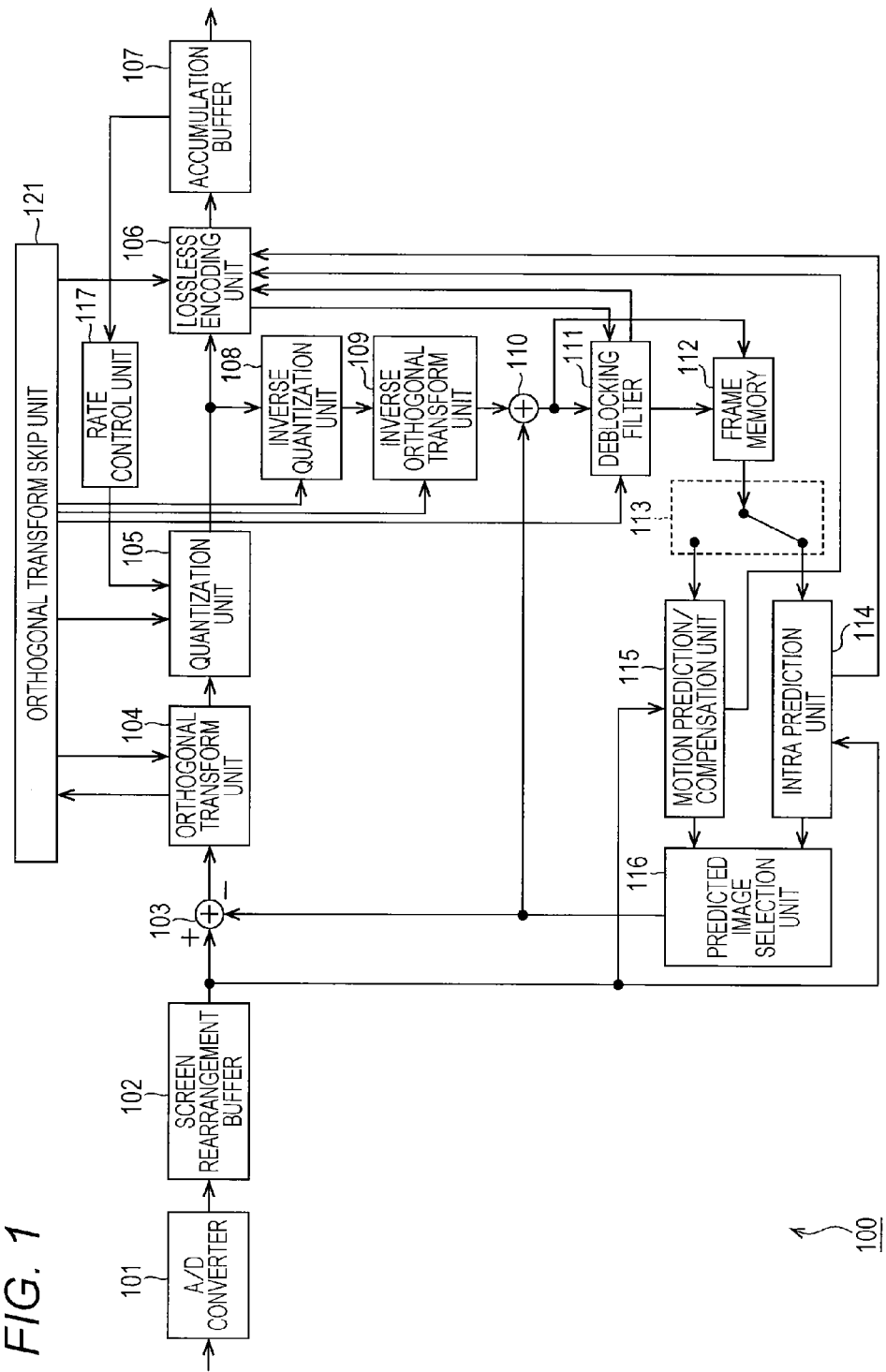
FIG. 1 is a block diagram illustrating an example of a main configuration of an image encoding device.

FIG. 1 is a block diagram illustrating an example of a main configuration of an image encoding device.

An image encoding device 100 illustrated in FIG. 1 encodes image data using prediction processing of, for example, high efficiency video coding (HEVC) or a system that is compliant therewith.

As illustrated in FIG. 1, the image encoding device 100 includes an A/D converter 101, a screen rearrangement buffer 102, a computation unit 103, an orthogonal transform unit 104, a quantization unit 105, a lossless encoding unit 106, an accumulation buffer 107, an inverse quantization unit 108, and an inverse orthogonal transform unit 109. In addition, the image encoding device 100 includes a computation unit 110, a deblocking filter 111, a frame memory 112, a selection unit 113, an intra prediction unit 114, a motion prediction/compensation unit 115, a predicted image selection unit 116, and a rate control unit 117.

The image encoding device 100 further includes an orthogonal transform skip unit 121.

The A/D converter 101 performs A/D conversion on input image data, supplies the image data (digital data) obtained by the conversion to the screen rearrangement buffer 102, and stores the image data therein. The screen rearrangement buffer 102 rearranges the frame images stored in display order into order of frames for encoding according to a group of picture (GOP) structure and supplies the image, in which order of the frames has been rearranged, to the computation unit 103. In addition, the screen rearrangement buffer 102 supplies the image, in which the order of the frames has been rearranged, to the intra prediction unit 114 and the motion prediction/compensation unit 115.

The computation unit 103 subtracts a predicted image supplied from the intra prediction unit 114 or the motion prediction/compensation unit 115 through the predicted image selection unit 116 from the image read from the screen rearrangement buffer 102 and outputs difference information to the orthogonal transform unit 104. For example, in a case of the image to which intra encoding is performed, the computation unit 103 subtracts, from the image read from the screen rearrangement buffer 102, the predicted image supplied from the intra prediction unit 114. Further, in a case of the image to which inter encoding is performed, for example, the computation unit 103 subtracts, from the image read from the screen rearrangement buffer 102, the predicted image supplied from the motion prediction/compensation unit 115.

The orthogonal transform unit 104 performs an orthogonal transform such as a discrete cosine transform and a Karhunen-Loeve transform on the difference information supplied from the computation unit 103 and supplies a transform coefficient thereof to the quantization unit 105.

The quantization unit 105 quantizes the transform coefficient supplied from the orthogonal transform unit 104. The quantization unit 105 sets a quantization parameter based on information on a target value of an encode amount supplied from the rate control unit 117 and performs quantization thereof. The quantization unit 105 supplies the quantized transform coefficient to the lossless encoding unit 106.

The lossless encoding unit 106 encodes the transform coefficient, which is quantized by the quantization unit 105, using any coding system. Since coefficient data is quantized under control of the rate control unit 117, the encode amount thereof is the target value set by the rate control unit 117 (or approximates the target value).

In addition, the lossless encoding unit 106 acquires information indicating a mode of intra prediction and the like from the intra prediction unit 114 and acquires information indicating a mode of inter prediction or difference motion vector information from the motion prediction/compensation unit 115.

The lossless encoding unit 106 encodes these various information pieces according to a coding system, to contain (multiplex) the various information pieces as part of header information of coded data (referred also to as a coded stream). The lossless encoding unit 106 supplies the coded data obtained by the encoding to the accumulation buffer 107 and accumulates the coded data therein.

For example, the coding system of the lossless encoding unit 106 includes variable-length encoding or computation encoding. For example, the variable-length encoding includes Context-Adaptive Variable Length Coding (CAVLC) and the like defined by the H.264/AVC system. For example, the computation encoding includes Context-Adaptive Binary Arithmetic Coding (CABAC) and the like.

The accumulation buffer 107 temporarily holds the coded data supplied from the lossless encoding unit 106. The accumulation buffer 107 outputs the held coded data to, for example, a recording device (recoding medium) or a transmission path not illustrated in the latter part at predetermined timing. That is, the accumulation buffer 107 is also a transmission unit for transmitting the coded data.

The quantized transform coefficient by the quantization unit 105 is also supplied to the inverse quantization unit 108. The inverse quantization unit 108 inversely quantizes the quantized transform coefficient by a method corresponding to the quantization by the quantization unit 105. The inverse quantization unit 108 supplies the obtained transform coefficient to the inverse orthogonal transform unit 109.

The inverse orthogonal transform unit 109 performs inverse orthogonal transform on the transform coefficient supplied from the inverse quantization unit 108 by a method corresponding to orthogonal transform processing by the orthogonal transform unit 104. An output obtained by the inverse orthogonal transform processing (restored difference information) is supplied to the computation unit 110.

The computation unit 110 adds an predicted image supplied from the intra prediction unit 114 or the motion prediction/compensation unit 115 through the predicted image selection unit 116 to the restored difference information which is a result of the inverse orthogonal transform processing supplied from the inverse orthogonal transform unit 109, thereby obtaining a locally decoded image (decoded image). The decoded image is supplied to the deblocking filter 111 or the frame memory 112.

The deblocking filter 111 appropriately performs deblocking filter processing on the decoded image supplied from the computation unit 110. For example, the deblocking filter 111 performs the deblocking filter processing on the decoded image to remove block distortion of the decoded image.

The deblocking filter 111 supplies a result of the filter processing (decoded image after filter processing) to the frame memory 112. Further, as described above, the decoded image output from the computation unit 110 can be supplied to the frame memory 112 without passing through the deblocking filter 111. That is, it is possible to omit the filter processing by the deblocking filter 111.

The frame memory 112 stores the decoded image to be supplied and supplies the stored decoded image as a reference image to the selection unit 113 at predetermined timing.

The selection unit 113 selects a supply destination of the reference image supplied from the frame memory 112. For example, in the case of the inter prediction, the selection unit 113 supplies the reference image supplied from the frame memory 112 to the motion prediction/compensation unit 115.

The intra prediction unit 114 performs an intra prediction (in-screen prediction) to generate the predicted image using a pixel value within a current picture which is the reference image supplied from the frame memory 112 through the selection unit 113. The intra prediction unit 114 performs the intra prediction in a plurality of intra prediction modes prepared in advance.

The intra prediction unit 114 generates the predicted image in all of the intra prediction modes to be candidates and evaluates a cost function value of each predicted image using the input image supplied from the screen rearrangement buffer 102 to select an optimal mode. Upon selecting the optimal intra prediction mode, the intra prediction unit 114 supplies the generated predicted image to the predicted image selection unit 116 in the optimal mode.

In addition, as described above, the intra prediction unit 114 appropriately supplies intra prediction mode information indicating an adopted intra prediction mode to the lossless encoding unit 106 to encode the supplied intra prediction mode information.

The motion prediction/compensation unit 115 performs motion prediction (inter prediction) using the input image supplied from the screen rearrangement buffer 102 and the reference image supplied from the frame memory 112 through the selection unit 113. The motion prediction/compensation unit 115 performs motion compensation processing according to a detected motion vector and generates the predicted image (inter predicted image information). The motion prediction/compensation unit 115 performs such an inter prediction in the plurality of inter prediction modes prepared in advance.

The motion prediction/compensation unit 115 generates the predicted image in all of the inter prediction modes to be candidates. The motion prediction/compensation unit 115 evaluates the cost function value of each predicted image using the input image supplied from the screen rearrangement buffer 102 and the information of the generated difference motion vector to select an optimal mode. Upon selecting the optimal inter prediction mode, the motion prediction/compensation unit 115 supplies the generated predicted image in the optimal mode to the predicted image selection unit 116.

The motion prediction/compensation unit 115 supplies the information indicating an adopted inter prediction mode, information required for performing the processing in the inter prediction mode at the time of decoding the coded data and the like to the lossless encoding unit 106 and encodes the supplied information. For example, the required information may include information of the generated difference motion vector, a flag indicating the index of a prediction motion vector as prediction motion vector information, and the like.

The predicted image selection unit 116 selects a supply source of the predicted image to be supplied to the computation unit 103 or the computation unit 110. For example, in the case of intra encoding, the predicted image selection unit 116 selects intra prediction unit 114 as the supply source of the predicted image and supplies the predicted image to be supplied from the intra prediction unit 114 to the computation unit 103 or the computation unit 110. In addition, for example, in the case of inter encoding, the predicted image selection unit 116 selects the motion prediction/compensation unit 115 as the supply source of the predicted image and supplies the predicted image to be supplied from the motion prediction/compensation unit 115 to the computation unit 103 or the computation unit 110.

Based on an encode amount of the coded data accumulated in the accumulation buffer 107, the rate control unit 117 controls a rate of quantization operation of the quantization unit 105 such that overflow or underflow does not occur.

The orthogonal transform skip unit 121 controls execution of the orthogonal transform processing in the orthogonal transform unit 104. In addition, according to the control, the orthogonal transform skip unit 121 controls quantization processing by the quantization unit 105, inverse quantization processing by the inverse quantization unit 108, inverse orthogonal transform processing by the inverse orthogonal transform unit 109, and deblocking filter processing by the deblocking filter 111. Further, the orthogonal transform skip unit 121 supplies information necessary on a skip of the orthogonal transform processing and information on the quantization or the deblocking filter to the lossless encoding unit 106 and transmits the supplied information to a decoding side from the accumulation buffer 107.

[Coding Unit]

In an AVC system, a hierarchical structure including a macroblock and a sub macroblock is specified. However, a macroblock of 16 pixels×16 pixels is not most suitable for a large image frame, such as an ultra high definition (UHD; 4000 pixels×2000 pixels), that will be the subject of a next-generation coding system.

Figure 2:
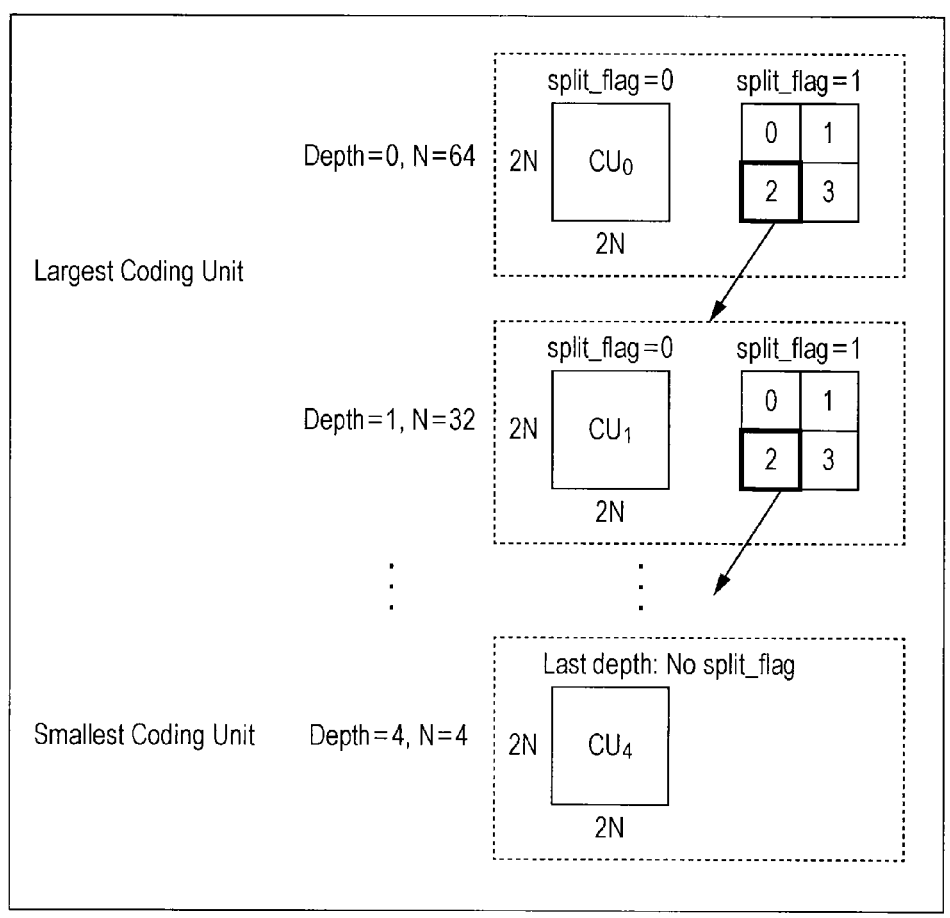
FIG. 2 is a diagram for describing an example of a configuration of a coding unit.

Thus, for example, a coding unit (CU) is specified in an HEVC system as illustrated in FIG. 2.

The CU is also called a coding tree block (CTB), and is a partial region of an image in a picture unit, which serves the similar role as the macroblock in the AVC system. The latter has a fixed size of 16×16 pixels, whereas the size of the former is not fixed and is thus specified in image compression information in each sequence.

For example, the maximum size (Largest Coding Unit (LCU)) and the minimum size (Smallest Coding Unit (SCU)) of the CU are specified in a sequence parameter set (Sequence Parameter Set (SPS)) included in the coded data to be output.

Each LCU can be further divided into a smaller CU by setting split_flag=1 within the range not falling below the size of the SCU. In an example illustrated in FIG. 2, the LCU is 128×128 pixels in size while the maximum hierarchical depth becomes 5. The CU having the size of 2N×2N pixels is divided into CUs having the size of N×N pixels that is one level lower in the hierarchy when the value of split_flag is "1".

Further, the CU is divided into a prediction unit (PU) that is a region (a partial region of an image in a picture unit) to be a processing unit for the intra prediction or the inter prediction and is also into a transform unit (TU) that is a region (a partial region of an image in a picture unit) to be a processing unit for the orthogonal transform. Currently, the HEVC system can perform 16×16 and 32×32 orthogonal transforms in addition to 4×4 and 8×8 orthogonal transforms.

As in the above HEVC system, in the case of a coding system in which the CU is defined and various types of processing are performed with the CU as a unit, it is considered that the macroblock in the AVC system corresponds to the LCU and a block (sub-block) corresponds to the CU. In addition, it is considered that a motion compensation block in the AVC system corresponds to the PU. However, since the CU has a hierarchical structure, the size of the LCU in the uppermost level thereof is generally set larger than the macroblock in the AVC system, for example, 128×128 pixels.

Therefore, hereinafter, it is assumed that the LCU also includes the macroblock in the AVC system and the CU also includes the block (sub-block) in the AVC system. That is, the "block" used in the following description indicates any partial region within the picture, and is not limited in the size, shape, characteristics of the block and the like. In order words, any region (processing unit), for example, TU, PU, SCU, CU, LCU, sub-block, macroblock, or slice is included in the "block". Naturally, partial regions (processing units) other than these regions are also included therein. The description is appropriately given in the case of limiting the size or the processing unit as necessary.

Next, basic technical elements related to the present technology will be described.

[Quantization Matrix]

As in the AVC, the quantization of an orthogonal transform coefficient is performed for every orthogonal transform processing unit in the HEVC. A quantization matrix is used for the quantization, but the quantization matrix is prepared for every size of the orthogonal transform processing unit. However, for example, when a large quantization matrix such as 16×16 matrix or 32×32 matrix is transmitted, there is a concern that encoding efficiency is reduced.

Figure 3:
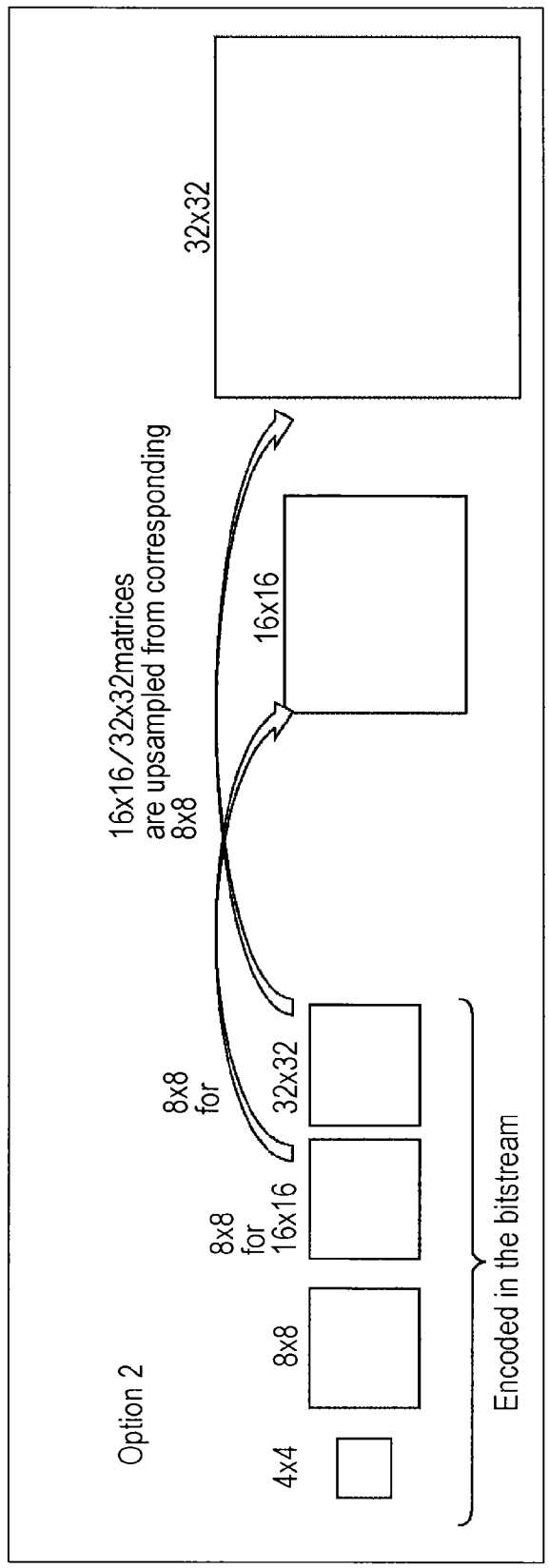
FIG. 3 is a diagram illustrating an example of a quantization matrix transmission.

Here, as illustrated in FIG. 3, the large quantization matrix (or quantization matrix larger than a predetermined size) for example, 16×16 matrix or 32×32 matrix is transmitted in a size of 8×8 and is upsampled by a zero-order hold to be applied to each orthogonal transform size. Further, a DC component is separately transmitted to a matrix to which upsample is applied.

In HEVC, as illustrated in FIGS. 4 to 7, information on the quantization matrix (Scaling List) is transmitted to a sequence parameter set (SPS) or a picture parameter set (PPS). FIGS. 4 and 5 are diagrams illustrating examples of the sequence parameter set. FIGS. 6 and 7 are diagrams illustrating examples of the picture parameter set.

[Deblocking Filter]

As in the AVC, the deblocking filter is defined in a motion compensation loop in the HEVC. The deblocking filter performs filter processing for reducing block distortion occurring in block boundaries.

That is, in the deblocking filter processing, the block boundaries are detected, a type or an strength of the filter, an offset and the like are decided based on quantization parameters or the like at the block boundaries, thereby performing the filter processing.

[Mode Selection]

However, it is important to select an appropriate prediction mode in order to achieve higher encoding efficiency in the AVC and HEVC coding systems.

As an example of the selection method, a method which is implemented in the reference software called a joint model (JM)) of H.264/MPEG-4/AVC (which is available at http://iphome.hhi.de/suehring/tml/index.htm) can be used.

The JM software enables a mode decision method to be selected from two modes of High Complexity Mode and Low Complexity Mode which will be described below. In any modes, a cost function value for every prediction mode 'Mode' is calculated, and a prediction mode which minimizes the cost function value is selected as an optimal mode for the block or the macroblock.

In the High Complexity Mode, the cost function is expressed by the following expression (1).

$$\text{Cost(Mode } \epsilon\Omega) = D + \lambda * R \quad (1)$$

Here, "Ω" represents a universal set of candidate modes for encoding the block or the macroblock and "D" represents energy difference between a decoded image and an input image when the encoding is performed in the prediction mode. "λ" represents a Lagrange multiplier given as a function of a quantization parameter. "R" represents a total encode amount including the orthogonal transformation coefficient when the encoding is performed in the mode.

That is, in order to perform encoding in the High Complexity Mode, a larger computation amount is required because a temporary encoding processing needs to be performed once in all candidate modes to calculate the parameters D and R.

In the Low Complexity Mode, the cost function is expressed by the following expression (2).

$$\text{Cost(Mode } \epsilon\Omega) = D + QP2\text{Quant}(QP) * \text{HeaderBit} \quad (2)$$

Here, "D" represents energy difference between a predicted image and an input image and is different from the High Complexity Mode. "QP2Quant (QP)" is given as a function of a quantization parameter QP, and "HeaderBit" is an encode amount related to information which belongs to a Header such as a motion vector or a mode, not including the orthogonal transform coefficient.

That is, in the Low Complexity Mode, although it is necessary to perform a prediction process for the respective candidate modes, since it is not necessary to obtain a decoded image, it is not necessary to perform the encoding process. Thus, the low complexity mode can be realized with lower computation amount than the High Complexity Mode.

[Orthogonal Transform Skip]

Incidentally, a technique of "Intra Transform Skipping" proposed in Non-Patent Document 2 is employed in an HEVC standard. An orthogonal transform skip (Transform Skip) is a technique of omitting (skipping) orthogonal transform processing.

Generally, the orthogonal transform processing is performed on image data (differential image data) for every block to convert spatial domain information in the block into frequency domain information, thereby allowing coefficients in the block to be concentrated on a lower frequency, and thus it is possible to increase a bias. Thus, the encoding efficiency is improved.

However, it may be also considered that there is a case where such a bias is less likely to occur according to designs in the block. For example, a gradation or a strong edge easily occurs in artificial images such as CG images or captions, compared to natural images. For this reason, a high-frequency component easily occurs, and the bias is unlikely to occur even when the orthogonal transform processing is performed. Therefore, by allowing for the skipping of the orthogonal transform processing in such a block, it is possible to further improve the encoding efficiency.

Further, the skipping of the orthogonal transform processing is referred to as an orthogonal transform skip (Transform Skip) in the following description, and a block to which the orthogonal transform skip (Transform Skip) is applied is also referred to as an orthogonal transform skip block. In addition, a block to which the orthogonal transform skip is not applied (orthogonal transform is performed) is also referred to as a non-orthogonal transform skip block.

In this technique, first, a flag indicating whether the orthogonal transform skip (Transform Skip) can be applied in the sequence is transmitted to the sequence parameter set (SPS).

A flag (transform_skip_enabled_flag), which is skip enable information indicating whether or not to enable/disable the orthogonal transform skip (TransformSkip), is transmitted to the sequence parameter set (SPS), as illustrated in FIG. 5.

This skip enable information (transform_skip_enabled_flag) is set by, for example, a user or the like. When this value is 1, the orthogonal transform skip (TransformSkip) can be applied to 4×4 luminance orthogonal transform blocks or 4×4 chrominance orthogonal transform blocks.

Then, on/off of the orthogonal transform skip (TransformSkip) is determined for every block, and a flag about the on/off thereof is transmitted.

[Encoding Efficiency]

Regardless of such skip control of the orthogonal transform, an entropy encoding process, quantization processing, loop filter processing and the like are uniformly performed. That is, as on the non-orthogonal transform skip block, the entropy encoding process, the quantization processing, the loop filter processing and the like are also performed on the orthogonal transform skip block.

However, the quantization matrix is a weighting coefficient regarding the frequency domain. That is, the quantization matrix is designed to be applied to an orthogonal transform coefficient block. Accordingly, when such a quantization matrix is applied to a block having a spatial domain value (differential image data), the encoding efficiency may be reduced. That is, image quality may be deteriorated.

In addition, as described above, the orthogonal transform skip is applied to an image in which the high-frequency component tends to appear. Therefore, there is a high possibility that the content of an image on the orthogonal transform skip block are largely different from those on the non-orthogonal transform skip block. That is, the block distortion easily occurs at the boundary between the orthogonal transform skip block and the non-orthogonal transform skip block.

Therefore, as on other boundaries, when the deblocking filter processing is performed on the boundary between the orthogonal transform skip block and the non-orthogonal transform skip block, the encoding efficiency may be reduced. That is, the image quality may be deteriorated.

[Control According to Orthogonal Transform Skip]

Thus, according to whether a current block is the orthogonal transform skip (TransformSkip) block, the encoding process is controlled. More specifically, the quantization processing (inverse quantization processing) of the encoding process and the deblocking processing are controlled.

[Control of Quantization Processing]

For example, in the case of the quantization processing, the quantization processing is performed on the non-orthogonal transform skip block in which the orthogonal transform is performed using a quantization matrix, and the quantization processing is performed on the orthogonal transform skip block in which the orthogonal transform is skipped using one weighting coefficient instead of the quantization matrix. That is, all coefficients of the orthogonal transform skip block serving as the current block are quantized using the one weighting coefficient.

Figure 8:
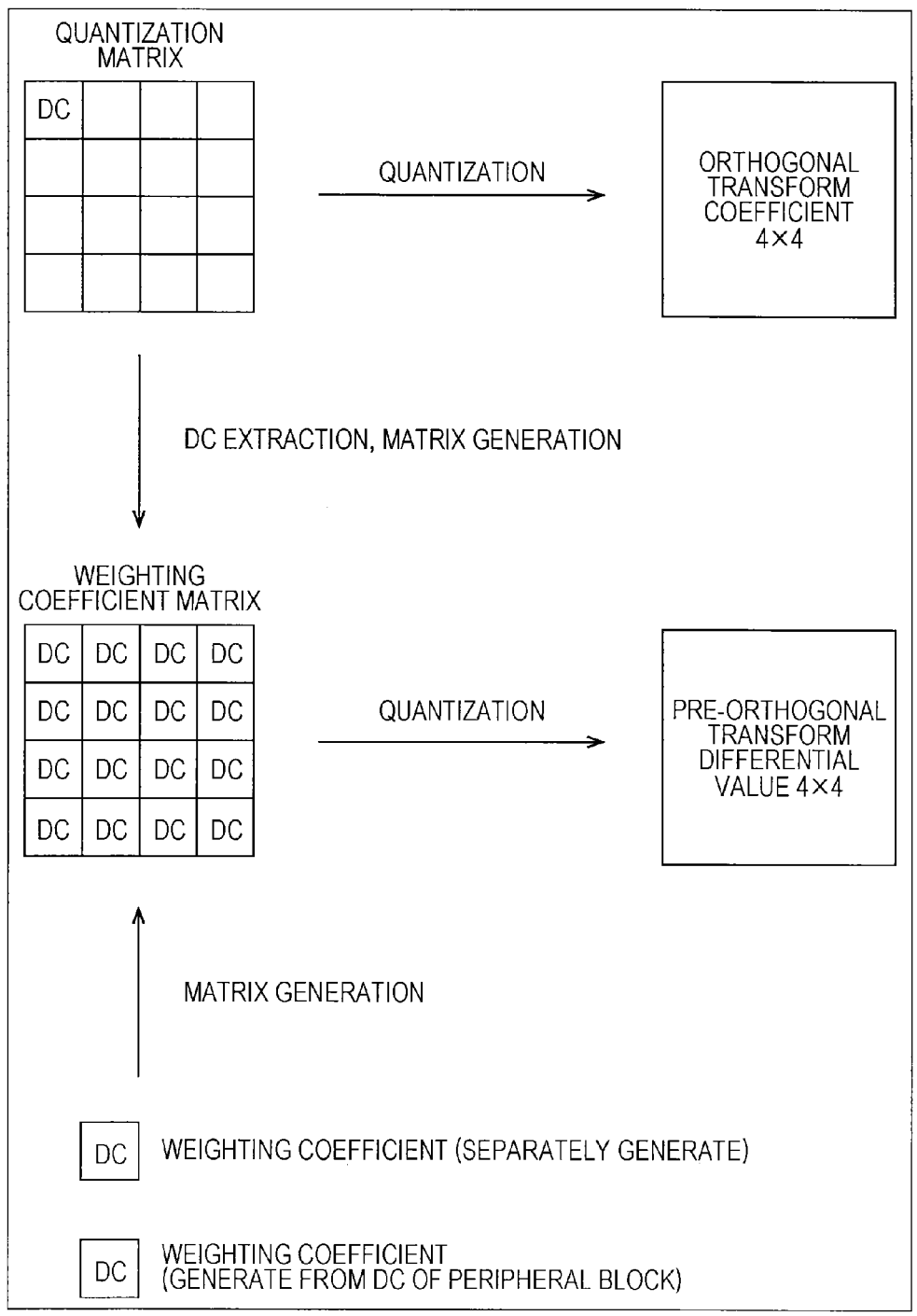
FIG. 8 is a diagram for describing an example of a condition of quantization.

A condition thereof is illustrated in FIG. 8. For example, as illustrated in FIG. 8, the quantization is performed on the non-orthogonal transform skip block (orthogonal transform coefficient matrix) using quantization matrix as in the prior art.

On the other hand, the 4×4 orthogonal transform skip block (matrix of pre-orthogonal transform differential value) is quantized using a weighting coefficient matrix which is obtained by the quantization of the one weighting coefficient. Naturally, an actual computation method is arbitrary, but basically performs a computation equivalent to that using the weighting coefficient matrix.

The weighting coefficient is arbitrary. For example, the weighting coefficient may include a scalar value. For example, the DC component of the quantization matrix may be the weighting coefficient. The quantization matrix is a weighting coefficient regarding the frequency domain, but the DC component is a value regarding the frequency domain and is also a value regarding the spatial domain. If only the DC component of the quantization matrix having these characteristics is present, it is unlikely to lead to reduction of the encoding efficiency even when the quantization is applied to each coefficient of the orthogonal transform skip block which is the value regarding the spatial domain.

In this case, as illustrated in FIG. 8, DC components are extracted from the quantization matrix, and the weighting coefficient matrix is generated by rearranging the extracted DC components in 4×4, thereby quantizing the 4×4 orthogonal transform skip block (matrix of pre-orthogonal transform differential value) using the weighting coefficient matrix.

Further, for example, apart from the quantization matrix, the weighting coefficient may be arbitrarily generated. A method of generating the weighting coefficient is arbitrary. Even in this case, as illustrated in FIG. 8, the weighting coefficient matrix is generated by rearranging the weighting coefficient in 4×4, thereby quantizing the 4×4 orthogonal transform skip block (matrix of pre-orthogonal transform differential value) using the weighting coefficient matrix. In this manner, for example, only a portion to which the orthogonal transform skip block is applied (for example, CG image) can be easily controlled to improve the image quality or the like using the weighting coefficient independent of the quantization matrix, as compared to another portion.

Further, in this case, the weighting coefficient may be calculated in the same manner such that a value on a coding side is the same as that on a decoding side and may be transmitted to the decoding side from the coding side.

In the case of transmitting the weighting coefficient, when a value of the skip enable information (transform_skip_enabled_flag) is a value (for example, 1) which enables the orthogonal transform skip, a scalar quantization value (weighting coefficient) applied to the orthogonal transform skip block is transferred. For this reason, the sequence parameter set and the picture parameter set described with reference to FIGS. 4 to 7 are changed as follows.

As a first change, the skip enable information (transform_skip_enabled_flag) is transmitted earlier than a quantization matrix (scaling list).

As a second change, skip enable information (transform_skip_enabled_flag) is also transmitted to the PPS so that the SPS is independent of the PPS in terms of parsing.

That is, the SPS is configured as illustrated in FIGS. 9 and 10, and the PPS is configured as illustrated in FIGS. 11 and 12.

Further, the weighting coefficient may be generated by a computation of an average value or the like using, for example, the DC component of the quantization matrix which is applied to the quantization of a peripheral block located at the periphery of the current block. Such a computation method is arbitrary and may be other than an average.

Even in this case, as illustrated in FIG. 8, the weighting coefficient matrix is generated by rearranging the weighting coefficient in 4×4, thereby quantizing the 4×4 orthogonal transform skip block (matrix of pre-orthogonal transform differential value) using the weighting coefficient matrix. In this manner, the weighting coefficient is calculated using the quantization matrix of the peripheral block, and thus it is also possible to easily calculate the weighting coefficient on the decoding side in the same manner as on the coding side. That is, the transmission of the weighting coefficient can be omitted, and the encoding efficiency can be improved by that rate.

[Control of Deblocking Filter]

Next, control of the deblocking filter will be described. In order for the orthogonal transform skip (TransformSkip) to improve the encoding efficiency of an area including the CG images or captions, it is considered that the block distortion is likely to occur at the boundary between the orthogonal transform skip block and the non-orthogonal transform skip block.

Thus, a detection whether the orthogonal transform skip block and the non-orthogonal transform skip block come in contact with each other across the block boundary is performed, and the strength adjustment of the deblocking filter is performed on the boundary between the orthogonal transform skip block and the non-orthogonal transform skip block in the following manner to make deblocking filtering easily performed.

For example, when the deblocking filter processing is applied to the boundary between the orthogonal transform skip block and the non-orthogonal transform skip block, a value of boundary strength (bs) acting as block-boundary strength is set to be "+1". By increasing the bs value in this manner, the control is made so as to apply stronger filtering. That is, a stronger deblocking filter can be applied to the boundary between the orthogonal transform skip block and the non-orthogonal transform skip block. Further, instead of setting the bs value to +1, the bs value may be fixed to a large value of, for example, 2 and the like.

In addition, for example, adjustment of the filter strength is performed from parameters such as the bs value, α, and β, but a strong filter may be applied to the boundary between the orthogonal transform skip block and the non-orthogonal transform skip block regardless of the control result of such a filter strength. Thus, it is possible to apply more directly a strong deblocking filter to the boundary between the orthogonal transform skip block and the non-orthogonal transform skip block.

Further, for example, the boundary between the orthogonal transform skip block and the non-orthogonal transform skip block may be set as a smaller offset compared to the β and tc. Thus, it is possible to easily apply the deblocking filter to the boundary between the orthogonal transform skip block and the non-orthogonal transform skip block.

By applying the strength adjustment of the deblocking filter as described above, it is possible to more easily apply the deblocking filter to the boundary between the orthogonal transform skip block and the non-orthogonal transform skip block and to improve the efficiency of image compression information to be output.

Further, plural methods of applying the deblocking filter are considered as described above, and it may be used in combination with the plural methods. Naturally, methods other than those described above may be included in such methods.

[Example of Configuration of Orthogonal Transform Skip or the Like]

Figure 13:
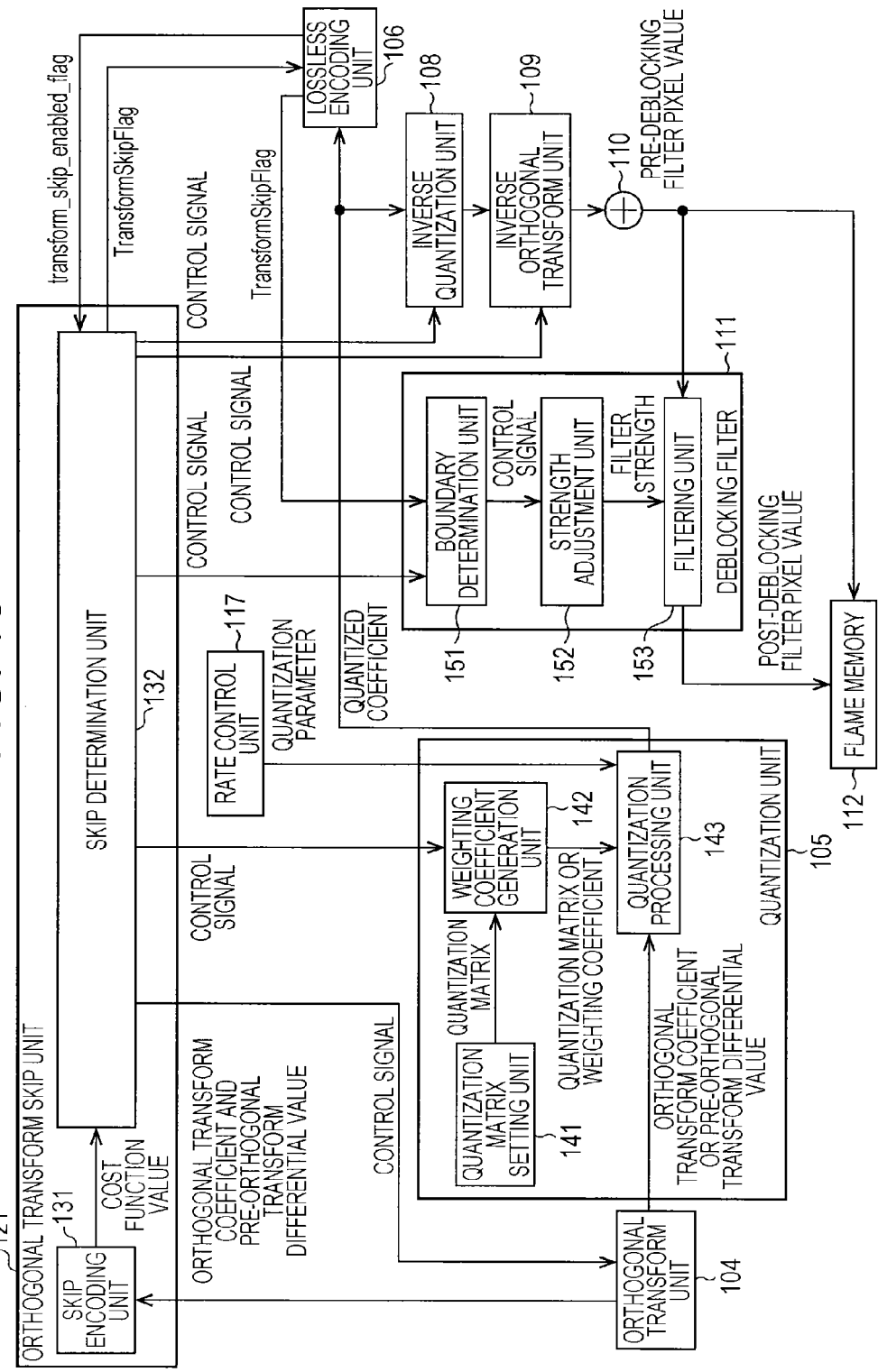

FIG. 13 is a block diagram illustrating an example of a main configuration of the orthogonal transform skip unit 121 and the like.

As illustrated in FIG. 12, the orthogonal transform skip unit 121 is configured to include a skip encoding unit 131 and a skip determination unit 132.

The skip encoding unit 131 acquires the orthogonal transform coefficient and the pre-orthogonal transform differential value of the current block from the orthogonal transform unit 104 when the current block is 4×4 block. The skip encoding unit 131 performs the encoding process in the case where the orthogonal transform skip is not applied, using the supplied orthogonal transform coefficient, and generates a cost function value thereof. In addition, the skip encoding unit 131 performs the encoding process in the case where the orthogonal transform skip is applied, using the supplied pre-orthogonal transform differential value and generates a cost function value thereof. The skip encoding unit 131 supplies the cost function values to the skip determination unit 132.

Further, when the current block is larger than the 4×4 block, the skip encoding unit 131 omits such processing. In this case, the skip determination unit 132 supplies a control signal which issues an instruction for performing the orthogonal transform, to the orthogonal transform unit 104. The orthogonal transform unit 104 performs the orthogonal transform of the current block based on the control.

The skip determination unit 132 acquires the skip enable information (transform_skip_enabled_flag) indicating whether or not to enable the skip of the orthogonal transform processing, from the lossless encoding unit 106. This skip enable information (transform_skip_enabled_flag) is set in advance by, for example, a user or the like and is stored in the lossless encoding unit 106. The skip determination unit 132 supplies a control signal for instructing whether or not to enable the orthogonal transform skip corresponding to the skip enable information (transform_skip_enabled_flag) to the orthogonal transform unit 104.

For example, when the skip enable information (transform_skip_enabled_flag) indicates that the orthogonal transform skip (for example, the value is 1) is enabled, the skip determination unit 132 supplies the control signal for enabling the orthogonal transform skip to the orthogonal transform unit 104. In addition, when the skip enable information (transform_skip_enabled_flag) indicates that the orthogonal transform skip (for example, the value is 0) is disabled, the skip determination unit 132 supplies the control signal for prohibiting the orthogonal transform skip to the orthogonal transform unit 104.

In addition, the skip determination unit 132 determines an optimal mode based on the cost function values supplied from the skip encoding unit 131. That is, it is determined whether or not to apply the orthogonal transform skip (TransformSkip) to the current block. The skip determination unit 132 supplies the determined result (information indicating the determined optimal mode) as the control signal to the orthogonal transform unit 104, the quantization unit 105, the deblocking filter 111, the inverse quantization unit 108, and the inverse orthogonal transform unit 109.

In addition, the skip determination unit 132 generates skip identification information (TransformSkipFlag) for identifying the determined result (whether the orthogonal transform skip is applied to the current block) and supplies and transmits the skip identification information to the lossless encoding unit 106.

With respect to the pre-orthogonal transform differential value acquired from the computation unit 103, the orthogonal transform unit 104 generates the orthogonal transform coefficient and the pre-orthogonal transform differential value of the current block which are not disabled by the control signal supplied from the skip encoding unit 131 in all modes. The orthogonal transform unit 104 supplies the generated the orthogonal transform coefficient and the pre-orthogonal transform differential value of the current block to the skip encoding unit 131. Further, when the orthogonal transform skip is disabled by the control signal, the orthogonal transform unit 104 supplies only the orthogonal transform coefficient of the current block to the skip encoding unit 131.

As described above, when a mode is determined in the orthogonal transform skip unit 121, the orthogonal transform unit 104 acquires the control signal supplied from the skip determination unit 132 and performs processing of the designated mode according to the control. That is, the orthogonal transform unit 104 executes or skips the orthogonal transform processing. In case of executing, the orthogonal transform unit supplies the orthogonal transform coefficient to the quantization unit 105 and in the case of skipping, the pre-orthogonal transform differential value to the quantization unit 105.

In this manner, the orthogonal transform unit 104 can appropriately perform the orthogonal transform as necessary to suppress the reduction of the encoding efficiency, and thus it is possible to suppress the deterioration of the image quality due to encoding/decoding.

Further, the orthogonal transform unit 104 holds the orthogonal transform coefficient and the pre-orthogonal transform differential value of the current block in all modes to be supplied to the skip encoding unit 131 and, from among the coefficients and values, may select an orthogonal transform coefficient and a pre-orthogonal transform differential value in a mode according to the control signal supplied from the skip determination unit 132 to supply it the quantization unit 105. Thus, it is possible to omit the processing and reduce a load.

As illustrated in FIG. 13, the quantization unit 105 is configured to include a quantization matrix setting unit 141, a weighting coefficient generation unit 142, and a quantization processing unit 143.

The quantization matrix setting unit 141 supplies the quantization matrix, which is set by the user or the like, to the weighting coefficient generation unit 142.

The weighting coefficient generation unit 142 acquires the control signal supplied from the skip determination unit 132. The weighting coefficient generation unit 142 supplies the quantization matrix or the weighting coefficient to the quantization processing unit 143 based on the control of the control signal.

For example, when the orthogonal transform skip is not applied, the weighting coefficient generation unit 142 supplies the quantization matrix, which is supplied from the quantization matrix setting unit 141 in the mode designated by the control signal, to the quantization processing unit 143.

In addition, for example, when the orthogonal transform skip is applied, the weighting coefficient generation unit 142 generates the weighting coefficient and supplies the generated weighting coefficient to the quantization processing unit 143. As described above, a method of generating the weighting coefficient is arbitrary. For example, a DC component extracted from the quantization matrix supplied from the quantization matrix setting unit 141 may be set as the weighting coefficient, apart from the quantization matrix supplied from the quantization matrix setting unit 141, another weighting coefficient may be set, and the weighting coefficient may be calculated from the DC component of the quantization matrix of the peripheral block.

The quantization processing unit 143 quantizes the orthogonal transform coefficient or the pre-orthogonal transform differential value supplied from the orthogonal transform unit 104 using the quantization matrix or the weighting coefficient supplied from the weighting coefficient generation unit 142 and the quantization parameter or the like supplied from the rate control unit 117.

That is, the quantization processing unit 143 quantizes the orthogonal transform coefficient of the current block using the quantization matrix, the quantization parameter or the like when the orthogonal transform coefficient is supplied from the orthogonal transform unit 104. In addition, the quantization processing unit 143 quantizes the pre-orthogonal transform differential value of the current block using the weighting coefficient, the quantization parameter or the like when the pre-orthogonal transform differential value is supplied from the orthogonal transform unit 104.

The quantization processing unit 143 supplies the quantized coefficient to the lossless encoding unit 106 and the inverse quantization unit 108. In addition, the quantization processing unit 143 supplies and transmits a parameter regarding the quantization of, for example, the weighting coefficient or the like to the lossless encoding unit 106, when necessary.

Thus, the quantization processing unit 143 can appropriately perform the quantization so as to suppress the deterioration of the image quality. Accordingly, the image encoding device 100 can suppress the deterioration of the image quality due to the encoding/decoding. In other words, the image encoding device 100 can improve the encoding efficiency.

Further, the quantization processing unit 143 may supply the quantization matrix or the weighting coefficient applied to the quantization processing together with, for example, the quantized coefficient to the inverse quantization unit 108.

Further, since a processing unit similar to the inverse quantization unit 108 and the inverse orthogonal transform unit 109 is also formed in an image decoding device to be described below, the description thereof is also applied to the inverse quantization unit 108 and the inverse orthogonal transform unit 109, and thus the detailed description of the inverse quantization unit 108 and the inverse orthogonal transform unit 109 will be not presented.

As illustrated in FIG. 13, the deblocking filter 111 is configured to include a boundary determination unit 151, a strength adjustment unit 152, and a filtering unit 153.

The boundary determination unit 151 acquires the control signal supplied from the skip determination unit 132, with respect to the current block. Further, the boundary determination unit 151 acquires skip identification information (TransformSkipFlag) for identifying whether the orthogonal transform skip is applied to the peripheral block of the current block (TransformSkipFlag). The boundary determination unit 151 determines whether a current block boundary is the boundary between the orthogonal transform skip block and the non-orthogonal transform skip block, based on such information, and supplies a control signal indicating the determined result to the strength adjustment unit 152.

The strength adjustment unit 152 generates various parameters such as Bs value, $\alpha$, $\beta$, and tc and determines strength of the deblocking filter based on these values and the control signal supplied from the boundary determination unit 151. That is, the strength adjustment unit 152 determines the strength of the deblocking filter based on values of various parameters such as the generated Bs value, $\alpha$, $\beta$, and tc when the current block boundary is not the boundary between the orthogonal transform skip block and the non-orthogonal transform skip block. In addition, when the current block boundary is the boundary between the orthogonal transform skip block and the non-orthogonal transform skip block, the strength adjustment unit 152 further makes filter strength strong based on the control signal in any manner as described above, for example.

In this manner, the strength adjustment unit 152 notifies the filtering unit 153 of the set filter strength.

The filtering unit 153 performs the deblocking filter processing on a pre-deblocking filter pixel value of the block boundary supplied from the computation unit 110 with the filter strength supplied from the strength adjustment unit 152. The filtering unit 153 supplies a post-deblocking filter pixel value to the frame memory 112 to store it therein. This information is used intra or inter prediction processing.

Thus, the deblocking filter 111 can perform the filter processing on the boundary between the orthogonal transform skip block and the non-orthogonal transform skip block such that the stronger deblocking filter is applied. Accordingly, the deterioration of the image quality is further suppressed. That is, the image encoding device 100 can suppress the deterioration of the image quality due to the encoding/decoding. In other words, the image encoding device 100 can improve the encoding efficiency.

[Flow of Encoding Process]

Next, a flow of individual processing operations to be executed by the image encoding device 100 as described above will be described. First, an example of a flow of an encoding process will be described with reference to a flowchart of FIG. 14.

In step S101, the lossless encoding unit 106 generates the skip enable information (transform_skip_enabled_flag) indicating whether or not to enable the skip of the orthogonal transform processing, based on the user's instruction or the like, for example. For example, the skip enable information (transform_skip_enabled_flag) is transmitted to the SPS.

In step S102, the A/D converter 101 performs A/D conversion on an input image. In step S103, the screen rearrangement buffer 102 stores the image obtained by the A/D conversion and rearranges respective pictures from a display order to an encoding order. In step S104, the intra prediction unit 114 performs intra prediction processing in the intra prediction mode.

In step S105, the motion prediction/compensation unit 115 performs inter motion prediction processing, in which the motion prediction or the motion compensation is performed in the inter prediction mode.

In step S106, the predicted image selection unit 116 determines an optimal mode based on each of the cost function values output from the intra prediction unit 114 and the motion prediction/compensation unit 115. That is, the predicted image selection unit 116 selects either one of a predicted image generated by the intra prediction unit 114 and a predicted image generated by the motion prediction/compensation unit 115.

In step S107, the computation unit 103 computes a difference between the rearranged image obtained by the processing in step S103 and the predicted image selected by the processing in step S106. The difference data is reduced in the data amount as compared to original image data. Accordingly, the data amount can be compressed as compared to a case in which images are directly encoded.

In step S108, the orthogonal transform skip unit 121 performs orthogonal transform skip control processing.

In step S109, the orthogonal transform unit 104 performs orthogonal transform processing on the difference information generated by the processing in step S107 according to the processing result in step S108.

In step S110, the quantization unit 105 quantizes the orthogonal transform coefficient or the pre-orthogonal transform differential value obtained by the processing in step S109, using the quantization parameter supplied from the rate control unit 117, according to the processing result in step S108.

The difference information quantized by the processing in step S110 is locally decoded as follows. That is, in step S111, the inverse quantization unit 108 performs inverse quantization on the quantized coefficient (also referred to as a quantization coefficient) generated by the processing in step S111 with characteristics corresponding to those of the quantization unit 105, according to the processing result in step S108. In step S112, the inverse orthogonal transform unit 109 performs inverse orthogonal transform on the orthogonal transform coefficient or the pre-orthogonal transform differential value obtained by the processing in step S111 according to the processing result in step S108.

Since the description of each processing operation in step S111 and step S112 corresponds to that of a similar processing operation to be executed in the decoding process, the detailed description thereof will be not presented.

In step S113, the computation unit 110 adds the predicted image to the locally decoded difference information to generate a locally decoded image (an image corresponding to that input to the computation unit 103).

In step S114, the deblocking filter 111 appropriately performs the deblocking filter processing on the locally decoded image obtained by the processing in step S113, according to the processing result in step S108.

In step S115, the frame memory 112 stores the decoded image subjected to the deblocking filter processing by the processing in step S114. Further, images that are not subjected to the filtering by the deblocking filter 111 are also supplied from the computation unit 110 and stored in the frame memory 112.

In step S116, the lossless encoding unit 106 encodes the quantized coefficient by the processing in step S110. That is, lossless encoding such as variable-length encoding or computation encoding is performed on data corresponding to the difference image.

In addition, at this time, the lossless encoding unit 106 encodes information on a prediction mode of the predicted image selected by the processing in step S106 and adds the encoded information to the coded data obtained by encoding the difference image. That is, the lossless encoding unit 106 also encodes information such as optimal intra prediction mode information supplied from the intra prediction unit 114 or information according to the optimal inter prediction mode supplied from the motion prediction/compensation unit 115 and adds the encoded information to the coded data.

Further, the lossless encoding unit 106 appropriately further encodes information on the orthogonal transform or the quantization and the encoded information to the coded data.

In step S117, the accumulation buffer 107 accumulates the coded data obtained by the processing in step S116. The coded data accumulated in the accumulation buffer 107 is appropriately read out and transmitted to a decoding side through a transmission path or a recording medium.

In step S118, the rate control unit 117 controls the rate of quantization operation of the quantization unit 105 so as not to cause overflow or underflow based on the encode amount (generated encode amount) of the coded data accumulated in the accumulation buffer 107 by the processing in step S117. In addition, the rate control unit 117 supplies information on the quantization parameter to the quantization unit 105.

The encoding process is completed when the processing in step S118 is ended.

[Flow of Orthogonal Transform Skip Control Processing]

Next, an example of a flow of the orthogonal transform skip control processing to be executed in step S108 of FIG. 14 will be described with reference to a flowchart of FIG. 15.

When the orthogonal transform skip control processing is started, the skip determination unit 132 determines in step S131 whether or not to enable a TransformSkip mode in which the orthogonal transform skip is performed, based on the skip enable information (transform_skip_enabled_flag).

When it is determined that the TransformSkip mode is enabled, the processing proceeds to step S132. In step S132, the skip determination unit 132 allows the TransformSkip mode to be included in a candidate mode. When the processing in step S132 is ended, the processing proceeds to step S134.

Further, when it is determined in step S132 that the TransformSkip mode is not enabled, the processing proceeds to step S133. In step S133, the skip determination unit 132 eliminates the TransformSkip mode from the candidate mode. When the processing in step S133 is ended, the processing proceeds to step S134.

In step S134, the skip encoding unit 131 selects an unprocessed candidate mode. In step S135, the skip encoding unit 131 determines whether the selected mode is the orthogonal transform (TransformSkip) mode.

When it is determined to be the orthogonal transform (TransformSkip) mode, the processing proceeds to step S136. In step S136, the skip encoding unit 131 generates a weighting coefficient. When the processing in step S136 is ended, the processing proceeds to step S139.

When it is determined that the selected mode is not the orthogonal transform (TransformSkip) mode in step S135, the processing proceeds to step S137. In step S137, the skip encoding unit 131 performs the orthogonal transform on the current block.

In step S138, the skip encoding unit 131 acquires a quantization matrix.

In step S139, the skip encoding unit 131 performs an encoding operation using the orthogonal transform coefficient obtained by the orthogonal transform unit 104 or the pre-orthogonal transform differential value and generates a cost function value with respect to the current mode.

In step S140, the skip encoding unit 131 determines whether all of the candidate modes are processed. When an unprocessed candidate mode exists, the processing returns to step S134 and subsequent processing operations are repeatedly executed. That is, each processing operation in step S134 to step S140 is repeatedly executed until the cost function value is generated with respect to all of the modes.

When it is determined in step S140 that all of the candidate modes are processed, the processing proceeds to step S141. In step S141, the skip determination unit 132 determines the optimal mode based on the cost function value.

In step S142, the skip determination unit 132 generates skip identification information (TransformSkipFlag) based on the optimal mode.

Figure 14:
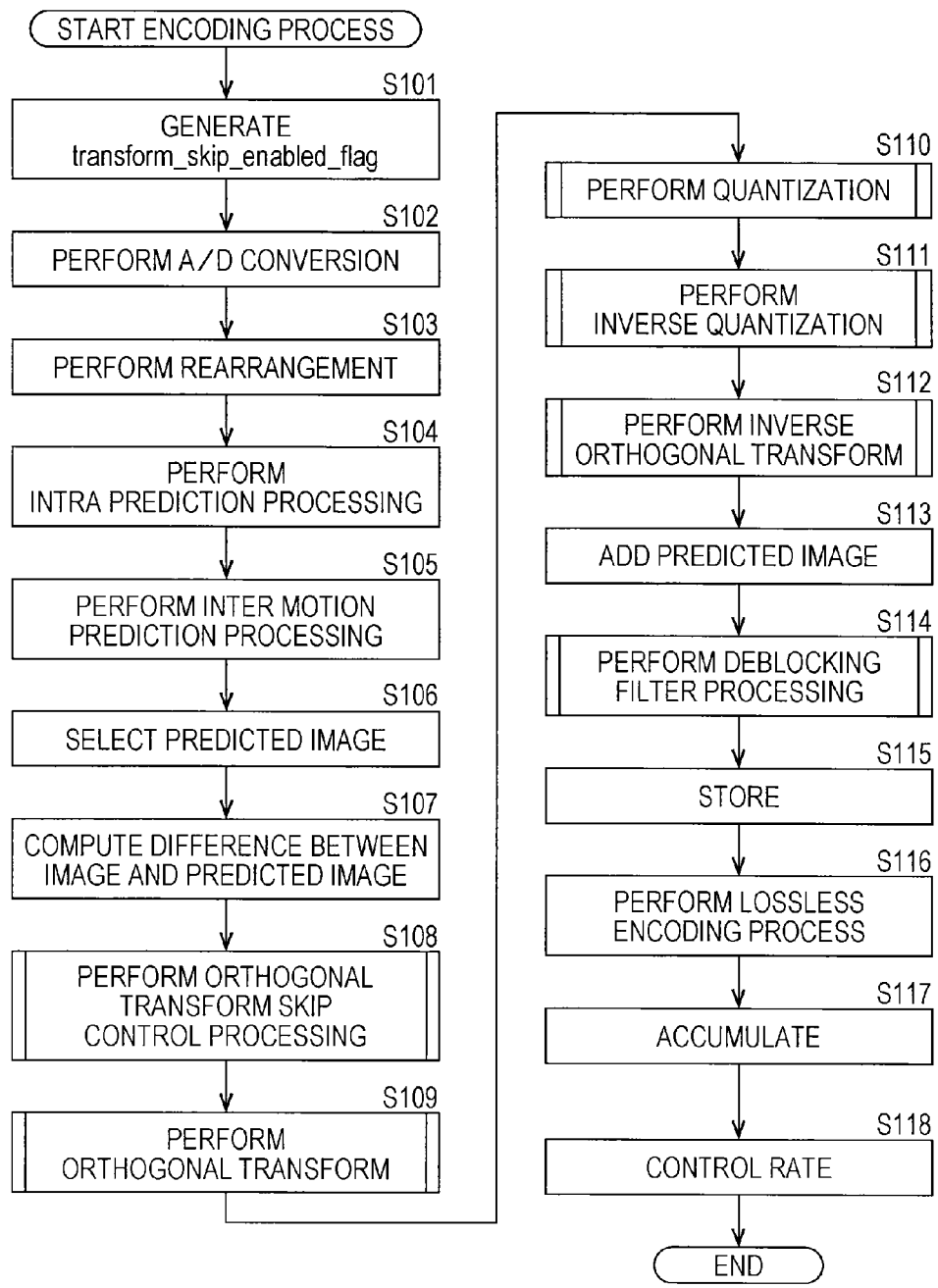
FIG. 14 is a flowchart for describing an example of a flow of an encoding process.
Figure 15:
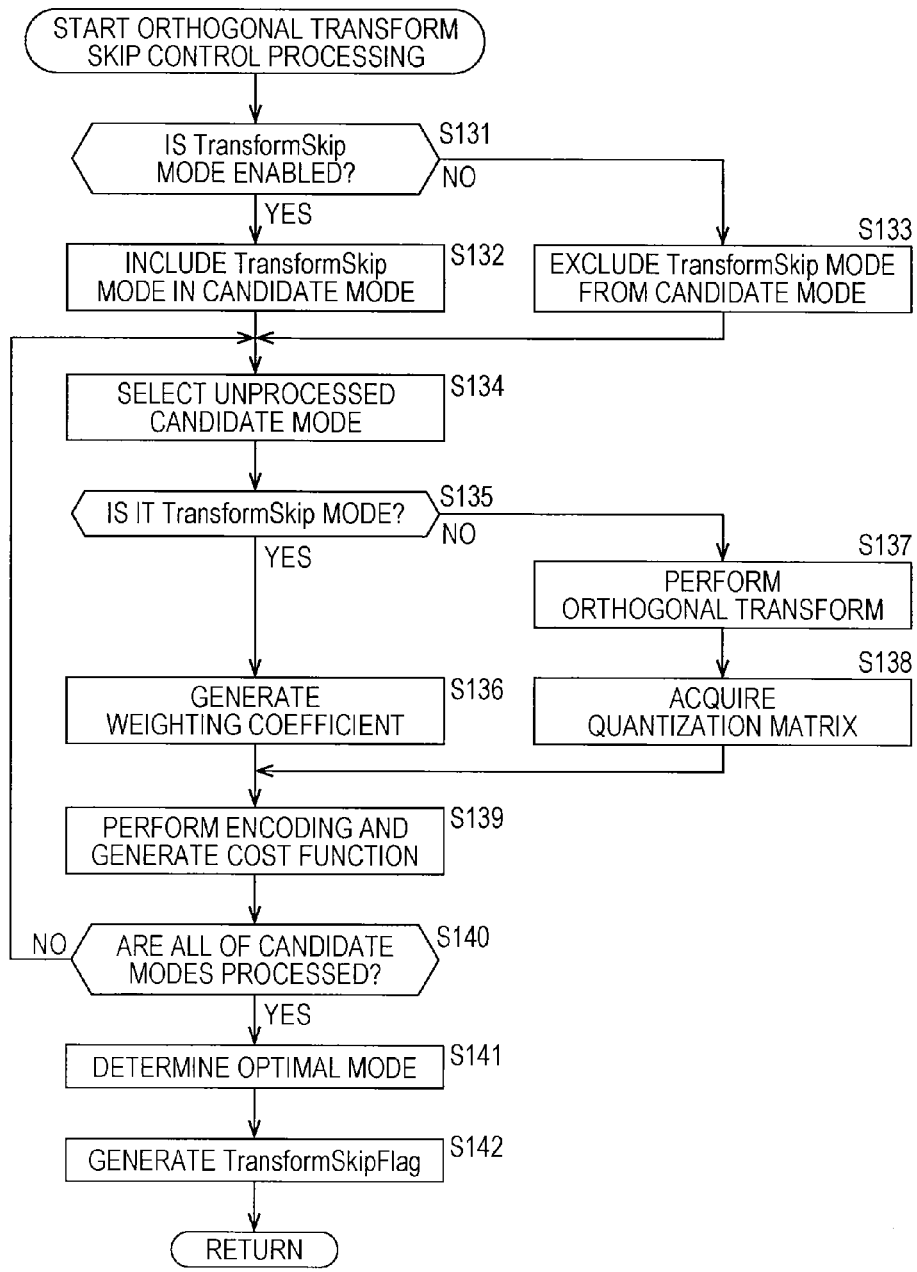
FIG. 15 is a flowchart for describing an example of a flow of orthogonal transform skip control processing.

When the processing in step S142 is ended, the orthogonal transform skip control processing is completed, and the processing returns to the processing operation illustrated in FIG. 14.

[Flow of Orthogonal Transform Processing]

Next, an example of a flow of orthogonal transform processing to be executed in step S108 of FIG. 14 will be described with reference to a flowchart of FIG. 16.

When the orthogonal transform processing is started, the orthogonal transform unit 104 determines in step S151 whether the optimal mode selected by the skip determination unit 132 is the orthogonal transform skip (TransformSkip mode). When it is determined to be the orthogonal transform skip (TransformSkip mode), the processing proceeds to step S152.

In step S152, the orthogonal transform unit 104 skips the orthogonal transform processing and outputs the pre-orthogonal transform differential value of the current block. When the processing in step S152 is ended, the processing returns to the process illustrated in FIG. 14.

Figure 16:
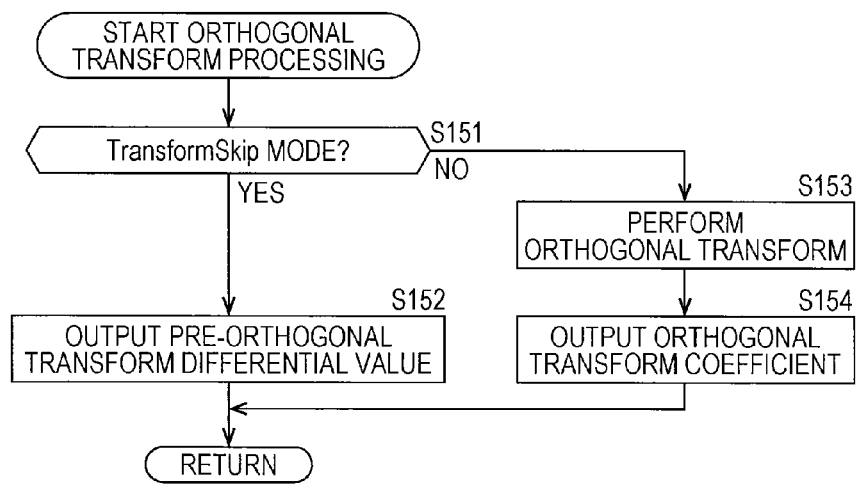
FIG. 16 is a flowchart for describing an example of a flow of orthogonal transform processing.

Further, in step S151 of FIG. 16, when it is determined not to be the orthogonal transform skip (TransformSkip mode), the processing proceeds to step S153.

In step S153, the orthogonal transform unit 104 performs the orthogonal transform on the pre-orthogonal transform differential value of the current block. In step S154, the orthogonal transform unit 104 outputs the obtained orthogonal transform coefficient. When the processing in step S154 is ended, the processing returns to the process illustrated in FIG. 14.

[Flow of Quantization Processing]

Figure 17:
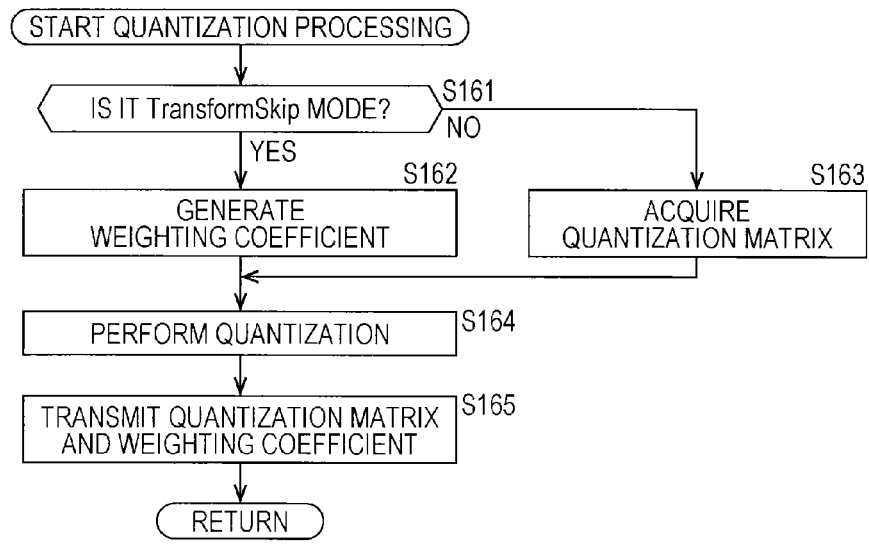
FIG. 17 is a flowchart for describing an example of a flow of quantization processing.

Next, an example of a flow of the quantization processing to be executed in step S110 of FIG. 14 will be described with reference to a flowchart of FIG. 17.

When the quantization processing is started, the weighting coefficient generation unit 142 determines, in step S161, whether the optimal mode selected by the skip determination unit 132 is the orthogonal transform skip (TransformSkip mode). When it is determined to be the orthogonal transform skip (TransformSkip mode), the processing proceeds to step S162.

In step S162, the weighting coefficient generation unit 142 generates a weighting coefficient. When the processing in step S162 is ended, the processing proceeds to step S164.

Further, when it is determined not to be the orthogonal transform skip (TransformSkip mode) in step S161, the processing proceeds to step S163.

In step S163, the weighting coefficient generation unit 142 acquires a quantization matrix. When the processing in step S163 is ended, the processing proceeds to step S164.

In step S164, the quantization processing unit 143 performs the quantization of the orthogonal transform coefficient of the current block or the pre-orthogonal transform coefficient differential value using the weighting coefficient generated in step S162 and the quantization matrix acquired in step S163. In step S165, the quantization processing unit 143 supplies and transmits the quantization matrix and the applied weighting coefficient to the lossless encoding unit 106. When the processing in step S165 is ended, the quantization processing is completed, and the processing returns to the process illustrated in FIG. 14.

[Flow of Deblocking Filter Processing]

Figure 18:
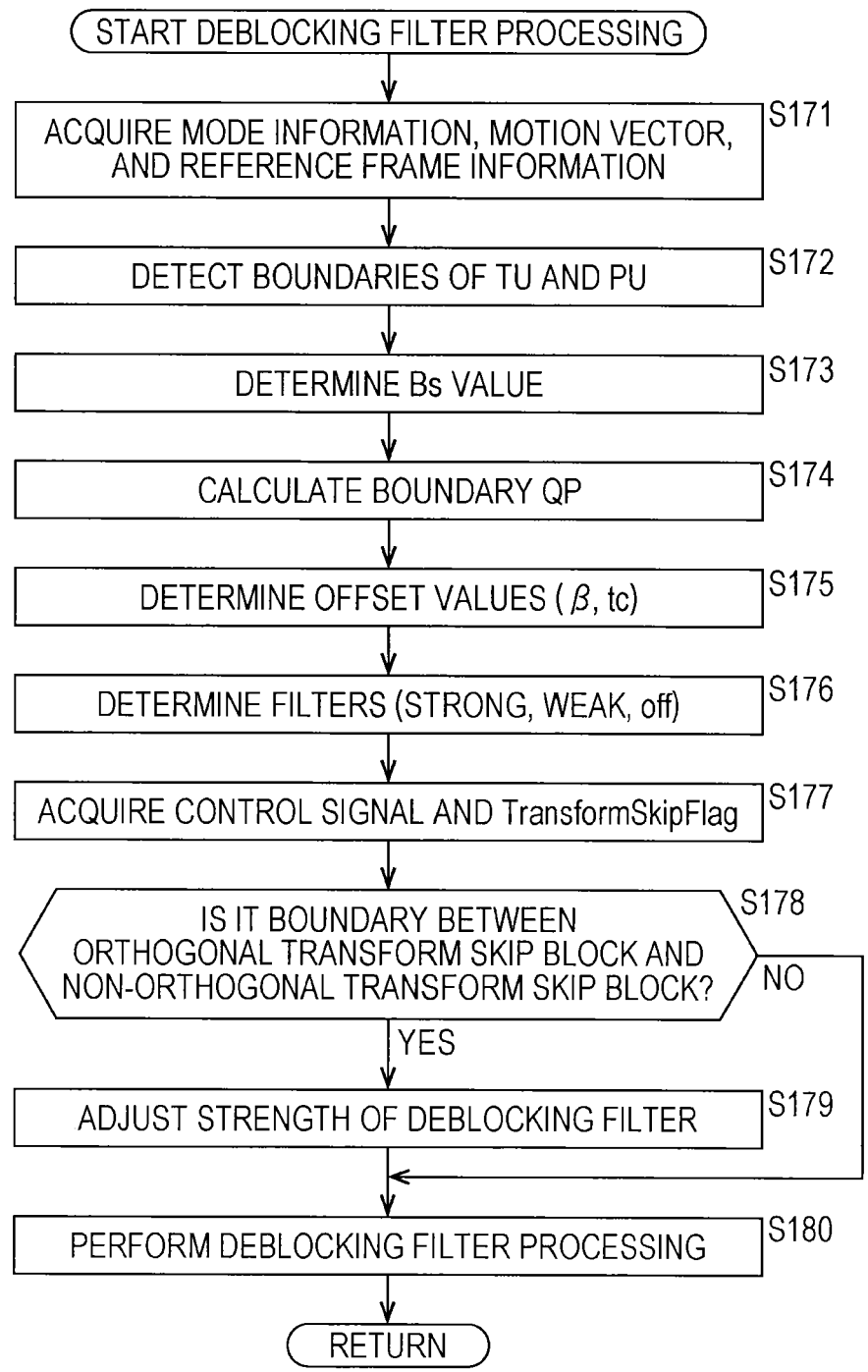
FIG. 18 is a flowchart for describing an example of a flow of deblocking filter processing.

Next, an example of a flow of the deblocking filter processing to be executed in step S114 of FIG. 14 will be described with reference to a flowchart of FIG. 18.

When the deblocking filter processing is started, the strength adjustment unit 152 acquires mode information, motion vector, reference frame information or the like in step S171.

In step S172, the strength adjustment unit 152 detects block boundaries of the TU, PU or the like. In step S173, the strength adjustment unit 152 determines a Bs value based on such information. In step S174, the strength adjustment unit 152 calculates a quantization parameter (boundary QP) in the block boundary by defining quantization parameters of both blocks as QP_P and QP_Q, as in Formula (3) below.

$$QP=(QP\_P+QP\_Q+1)>>1 \tag{3}$$

In step S175, the strength adjustment unit 152 determines a β offset value and a tc offset value using the boundary QP calculated as described above. In step S176, the strength adjustment unit 152 determines filters (strong, weak, and off) by processing the calculated offset values.

In step S177, the boundary determination unit 151 acquires a control signal of the current block from the skip determination unit 132 and acquires skip identification information (TransformSkipFlag) of the peripheral block from the lossless encoding unit 106.

In step S178, the boundary determination unit 151 determines whether the current block boundary is the boundary between the orthogonal transform skip block and the non-orthogonal transform skip block.

When it is determined that the current block boundary is the boundary between the orthogonal transform skip block and the non-orthogonal transform skip block, the processing proceeds to step S179. In step S179, the strength adjustment unit 152 adjusts the strength of the deblocking filter. When the processing in step S179 is ended, the processing proceeds to step S180.

Further, when it is determined in step S178 that the current block boundary is not the boundary between the orthogonal transform skip block and the non-orthogonal transform skip block, the processing proceeds to step S180.

In step S180, the filtering unit 153 performs the deblocking filter processing. When the processing in step S180 is ended, the deblocking filter processing is completed, and the processing returns to the process illustrated in FIG. 14.

By executing each processing operation as described above, the image encoding device 100 can suppress the reduction of the encoding efficiency and suppress the deterioration of the image quality due to the encoding/decoding.

<2. Second Embodiment>

[Image Decoding Device]

Figure 19:
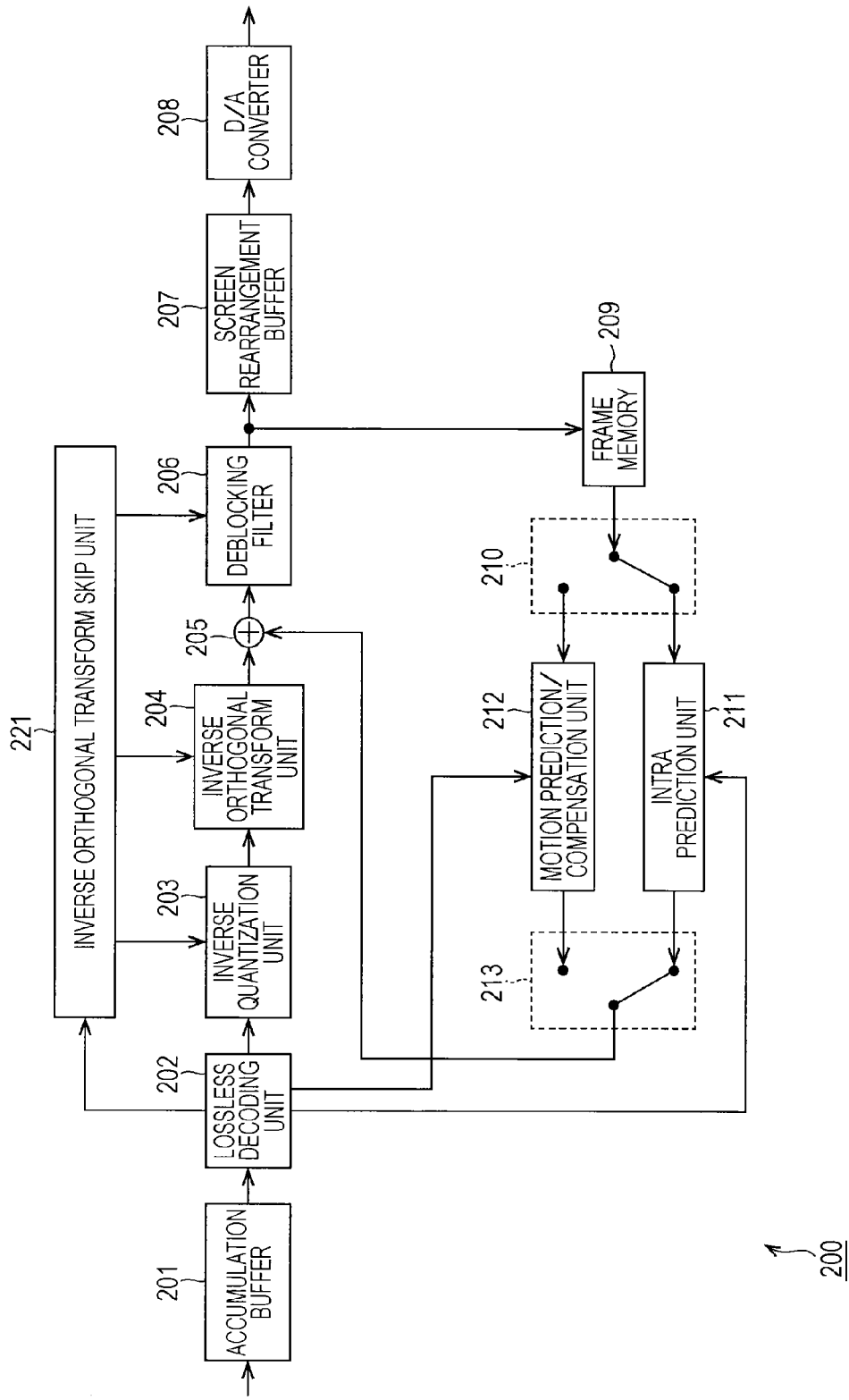
FIG. 19 is a block diagram illustrating an example of a main configuration of an image decoding device.

Next, decoding of the coded data (a coded stream) which is encoded as described above will be described. FIG. 19 is a block diagram illustrating an example of a main configuration of an image decoding device corresponding to the image encoding device 100 in FIG. 1.

An image decoding device 200 illustrated in FIG. 19 decodes the coded data generated by the image encoding device 100, using a decoding method corresponding to the coding system thereof.

As illustrated in FIG. 19, the image decoding device 200 includes an accumulation buffer 201, a lossless decoding unit 202, an inverse quantization unit 203, an inverse orthogonal transform unit 204, a computation unit 205, a deblocking filter 206, a screen rearrangement buffer 207, and a D/A converter 208. In addition, the image decoding device 200 includes a frame memory 209, a selection unit 210, an intra prediction unit 211, a motion prediction/compensation unit 212, and a selection unit 213.

Furthermore, the image decoding device 200 includes an inverse orthogonal transform skip unit 221.

The accumulation buffer 201 is also a reception unit for receiving the coded data transmitted thereto. The accumulation buffer 201 receives and accumulates the coded data transmitted therein, and supplies the coded data to the lossless decoding unit 202 at a predetermining timing. Pieces of information necessary for decoding, such as the prediction mode information, are added to the coded data. The lossless decoding unit 202 decodes the information, which is supplied from the accumulation buffer 201 and encoded by the lossless encoding unit 106 in FIG. 1, using a method corresponding to the coding system of the lossless encoding unit 106. The lossless decoding unit 202 supplies the quantized coefficient data of a difference image obtained by decoding to the inverse quantization unit 203.

In addition, the lossless decoding unit 202 determines whether the intra prediction mode is selected or the inter prediction mode is selected, as the optimal prediction mode, and supplies information relating to the optimal prediction mode to one of the intra prediction unit 211 and the motion prediction/compensation unit 212, which is a mode determined to be selected. In other words, for example, in the case where the inter prediction mode is selected as the optimal prediction mode in the image encoding device 100, the information relating to the optimal prediction mode is supplied to the intra prediction unit 211. In addition, for example, when the inter prediction mode is selected as an optimal prediction mode in the image encoding device 100, the information regarding the optimal prediction mode is supplied to the motion prediction/compensation unit 212.

Further, the lossless decoding unit 202 supplies information such as, for example, a quantization matrix or a quantization parameter, which is required for inverse quantization, to the inverse quantization unit 203. Further, the lossless decoding unit 202 supplies information such as, for example, skip enable information (transform_skip_enabled_flag) or skip identification information (TransformSkipFlag), which is required for an inverse orthogonal transform, to the inverse orthogonal transform skip unit 221.

The inverse quantization unit 203 performs inverse quantization on the quantized coefficient data obtained by decoding of the lossless decoding unit 202 based on the control of the inverse orthogonal transform skip unit 221, using a method corresponding to the quantization method of the quantization unit 105 in FIG. 1. Further, the inverse quantization unit 203 is a processing unit similar to the inverse quantization unit 108 of the image encoding device 100 in FIG. 1. That is, the description of the inverse quantization unit 203 can be also applied to that of the inverse quantization unit 108. However, it is necessary to read input/output destination of data by appropriately varying it depending on devices.

The inverse quantization unit 203 supplies the obtained coefficient data to the inverse orthogonal transform unit 204.

Based on the control of the inverse orthogonal transform skip unit 221, the inverse orthogonal transform unit 204 performs inverse orthogonal transform of the coefficient data (orthogonal transform coefficient or pre-orthogonal transform differential value) to be supplied from the inverse quantization unit 203 using a method corresponding to the orthogonal transform method of the orthogonal transform unit 104 in FIG. 1, as necessary. Further, the inverse orthogonal transform unit 204 is a processing unit similar to the inverse orthogonal transform unit 109 of the image encoding device 100 in FIG. 1. That is, the description of the inverse orthogonal transform unit 204 can be also applied to that of the inverse orthogonal transform unit 109. However, it is necessary to read input/output destination of data by appropriately varying it depending on devices.

The inverse orthogonal transform unit 204 obtains decoded residual data corresponding to the residual data before the orthogonal transform by the inverse orthogonal transform processing in the image encoding device 100. The decoded residual data obtained by the inverse orthogonal transform is supplied to the computation unit 205. Further, a predicted image is supplied to the computation unit 205 through the selection unit 213 from the intra prediction unit 211 or the motion prediction/compensation unit 212.

The computation unit 205 adds the decoded residual data and the predicted image and obtains decoded image data corresponding to image data before the predicted image is subtracted by the computation unit 103 of the image encoding device 100. The computation unit 205 supplies the decoded image data to the deblocking filter 206.

The deblocking filter 206 appropriately performs deblocking filter processing on the supplied decoded image and supplies it to the screen rearrangement buffer 207. By performing the deblocking filter processing on the decoded image, the deblocking filter 206 removes the block distortion of the decoded image. Further, the deblocking filter 206 is a processing unit similar to the deblocking filter 111 of the image encoding device 100 in FIG. 1.

The deblocking filter 206 supplies a filter processing result (a decoded image after filter processing) to the screen rearrangement buffer 207 and the frame memory 209. In addition, the decoded image output from the computation unit 205 may be supplied to the screen rearrangement buffer 207 or the frame memory 209 without passing through the deblocking filter 206. In other words, the filter processing performed by the deblocking filter 206 may be omitted.

The screen rearrangement buffer 207 rearranges images. In other words, the order of the frames rearranged for the encoding order by the screen rearrangement buffer 102 in FIG. 1 is rearranged in the original display order. The D/A converter 208 D/A-converts the image supplied from the screen rearrangement buffer 207 and outputs the image to a display not illustrated in the drawing to display the image thereon.

The frame memory 209 stores therein the supplied decoded image and supplies the stored decoded image, as a reference image, to the selection unit 210, at a predetermined timing or on the basis of a request from the outside, such as the intra prediction unit 211 or the motion prediction/compensation unit 212.

The selection unit 210 selects the supply destination of the reference image supplied from the frame memory 209. In the case of decoding an intra encoded image, the selection unit 210 supplies the reference image supplied from the frame memory 209 to the intra prediction unit 211. In addition, in the case of decoding an inter encoded image, the selection unit 210 supplies the reference image supplied from the frame memory 209 to the motion prediction/compensation unit 212.

To the intra prediction unit 211 is supplied information or the like indicating the intra prediction mode, which is obtained by decoding header information, appropriately from the lossless decoding unit 202. The intra prediction unit 211 performs intra prediction using the reference image acquired from the frame memory 209, in the intra prediction mode used in the intra prediction unit 114 in FIG. 1, and generates a predicted image. The intra prediction unit 211 supplies the generated predicted image to the selection unit 213.

The motion prediction/compensation unit 212 acquires information (the optimal prediction mode information, the reference image information, and so forth), which is obtained by decoding the header information, from the lossless decoding unit 202.

The motion prediction/compensation unit 212 performs inter prediction using the reference image acquired from the frame memory 209, in the inter prediction mode indicated by the optimal prediction mode information acquired from the lossless decoding unit 202, and generates a predicted image.

The selection unit 213 supplies the predicted image from the intra prediction unit 211 or the predicted image from the motion prediction/compensation unit 212 to the computation unit 205. In addition, in the computation unit 205, the predicted image generated using the motion vector and the decoded residual data (difference image information) from the inverse orthogonal transform unit 204 are added, and an original image is decoded. In other words, the motion prediction/compensation unit 212, the lossless decoding unit 202, the inverse quantization unit 203, the inverse orthogonal transform unit 204, and the computation unit 205 are also a decoding unit for decoding the coded data using the motion vector and generating the original image.

The inverse orthogonal transform skip unit 221 acquires the information supplied from the coding side through the lossless decoding unit 202 and controls execution of the inverse orthogonal transform processing in the inverse orthogonal transform unit 204 based on the information. In addition, the inverse orthogonal transform skip unit 221 controls the inverse quantization processing by the inverse quantization unit 203 and the deblocking filter processing by the deblocking filter 206.

Thus, the image decoding device 200 can appropriately decode the coded data. Accordingly, the image decoding device 200 can realize the suppression of the reduction in the encoding efficiency and can realize the suppression of the deterioration of the image quality dude to the encoding/decoding.

[Example of Configuration of Inverse Orthogonal Transform Skip Unit or the Like]

Figure 20:
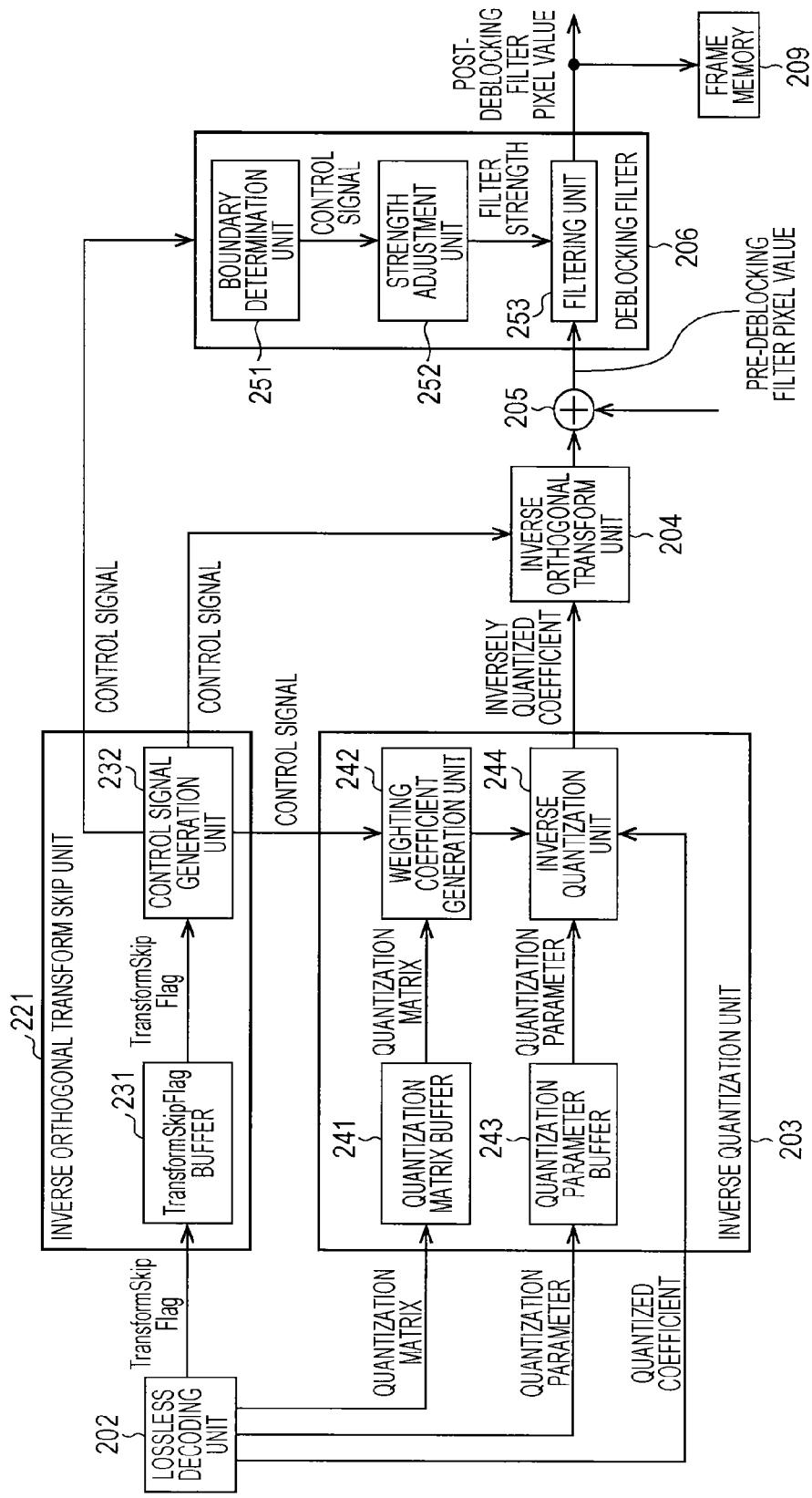

FIG. 20 is a block diagram illustrating an example of a main configuration of the inverse orthogonal transform skip unit 221 or the like.

As illustrated in FIG. 20, the inverse orthogonal transform skip unit 221 is configured to include a TransfomSkipFlag buffer 231 and a control signal generation unit 232.

The TransfomSkipFlag buffer 231 acquires and holds the skip enable information (transform_skip_enabled_flag) or the skip identification information (TransformSkipFlag) extracted from the coded data (bit stream) in the lossless decoding unit 202. The TransfomSkipFlag buffer 231 supplies the held the skip enable information (transform_skip_enabled_flag) or the skip identification information (TransfomSkipFlag) to the control signal generation unit 232 at predetermined timing or based on a demand.

The control signal generation unit 232 generates a control signal depending on the skip enable information (transform_skip_enabled_flag) or the skip identification information (TransformSkipFlag) supplied from the TransfomSkipFlag buffer 231 and supplies the control signal to the inverse quantization unit 203, the inverse orthogonal transform unit 204, and the deblocking filter 206.

For example, when the orthogonal transform skip is disabled by the skip enable information (transform_skip_enabled_flag), the control signal generation unit 232 supplies a control signal as follows. That is, the control signal generation unit 232 supplies a control signal for instructing the inverse quantization unit 203 to perform the inverse quantization using the quantization matrix. In addition, the control signal generation unit 232 supplies a control signal for instructing the inverse orthogonal transform unit 204 to perform the inverse orthogonal transform. Further, the control signal generation unit 232 supplies a control signal for notifying the deblocking filter 206 that the current block is not the orthogonal transform skip block.

In addition, for example, when the orthogonal transform skip is enabled by the skip enable information (transform_skip_enabled_flag) and it is identified by the skip identification information (TransfomSkipFlag) that the orthogonal transform skip is not applied at the time of encoding of the current block, the control signal generation unit 232 supplies the control signal in following manners. That is, the control signal generation unit 232 supplies the control signal for instructing the inverse quantization unit 203 to perform the inverse quantization using the quantization matrix. In addition, the control signal generation unit 232 supplies the control signal instructing the inverse orthogonal transform unit 204 to perform the inverse orthogonal transform. Further, the control signal generation unit 232 supplies the control signal for notifying the deblocking filter 206 that the current block is not the orthogonal transform skip block. That is, the control signal generation unit 232 may supply the skip identification information (TransfomSkipFlag) as the control signal to the deblocking filter 206.

In addition, for example, when the orthogonal transform skip is enabled by the skip enable information (transform_skip_enabled_flag) and it is identified by the skip identification information (TransfomSkipFlag) that the orthogonal transform skip is applied at the time of encoding of the current block, the control signal generation unit 232 supplies the control signal in the following manners. That is, the control signal generation unit 232 supplies a control signal for instructing the inverse quantization unit 203 to perform the inverse quantization using the weighting coefficient. In addition, the control signal generation unit 232 supplies a control signal instructing for the inverse orthogonal transform unit 204 not to perform the inverse orthogonal transform. Further, the control signal generation unit 232 supplies a control signal for notifying the deblocking filter 206 that the current block is the orthogonal transform skip block. That is, the control signal generation unit 232 may supply the skip identification information (TransfomSkipFlag) as the control signal to the deblocking filter 206.

As illustrated in FIG. 20, the inverse quantization unit 203 is configured to include a quantization matrix buffer 241, a weighting coefficient generation unit 242, a quantization parameter buffer 243, and an inverse quantization unit 244.

The quantization matrix buffer 241 acquires and holds the quantization matrix, which is extracted from the SPS or the like of the coded data, by the lossless decoding unit 202. The quantization matrix is transmitted from the coding side and is used at the time of encoding. The quantization matrix buffer 241 supplies the held quantization matrix to the weighting coefficient generation unit 242 at predetermined timing or on demand. Further, when the weighting coefficient applied at the time of encoding is transmitted from the coding side, the quantization matrix buffer 241 acquires the weighting coefficient and supplies it to the weighting coefficient generation unit 242 as in the quantization matrix.

The weighting coefficient generation unit 242 acquires the control signal supplied from the control signal generation unit 232. The weighting coefficient generation unit 242 grasps whether the orthogonal transform skip is applied to the current block at the time of encoding, based on the control of the control signal and supplies the quantization matrix or the weighting coefficient to the inverse quantization unit 244 based on the grasped information.

For example, when the orthogonal transform skip is not applied to the current block at the time of encoding, the weighting coefficient generation unit 242 supplies the quantization matrix, which is supplied from the quantization matrix buffer 241, of a mode designated by the control signal to the inverse quantization unit 244.

In addition, for example, when the orthogonal transform skip is applied to the current block at the time of encoding, the weighting coefficient generation unit 242 generates a weighting coefficient and supplies the generated weighting coefficient to the inverse quantization unit 244.

Further, a method of generating the weighting coefficient is arbitrary as long as the method is the same as a method in the coding side. That is, for example, in the image encoding device 100, when the weighting coefficient generation unit 142 extracts the DC component of the quantization matrix supplied from the quantization matrix setting unit 141 and sets the extracted DC component as a weighting coefficient, the weighting coefficient generation unit 242, similarly, also extracts the DC component of the quantization matrix supplied from the quantization matrix buffer 241 and also sets the extracted DC component as a weighting coefficient.

Further, in the image encoding device 100, when the weighting coefficient generation unit 142 sets a weighting coefficient separated from the quantization matrix supplied from the quantization matrix setting unit 141, the weighting coefficient generation unit 242 also sets a weighting coefficient separated from the quantization matrix supplied from the quantization matrix buffer 241 in the same way. At this time, when the weighting coefficient applied at the time of encoding is supplied from the coding side, the weighting coefficient is applied.

Further, in the image encoding device 100, when the weighting coefficient generation unit 142 calculates the weighting coefficient from the DC component of the quantization matrix of the peripheral block, the weighting coefficient generation unit 242 also calculates the weighting coefficient from the DC component of the quantization matrix of the peripheral block in the same way.

The quantization parameter buffer 243 acquires and holds the quantization parameter extracted from the SPS or the like of the coded data by the lossless decoding unit 202. The quantization parameter is supplied from the coding side and is used at the time of encoding. The quantization parameter buffer 243 supplies the held quantization parameter to the inverse quantization unit 244 at predetermined timing or on demand.

The inverse quantization unit 244 acquires the quantized coefficient extracted from the coded data by the lossless decoding unit 202. The inverse quantization unit 244 also acquires the quantization parameter from the quantization parameter buffer 243 and acquires the quantization matrix or the weighting coefficient from the weighting coefficient generation unit 242. The inverse quantization unit 244 inversely quantizes the quantized coefficient using them. This method of inverse quantization corresponds to the method of quantization by the quantization processing unit 143 of the image encoding device 100.

That is, for example, when the orthogonal transform skip is not applied to the current block at the time of encoding, the inverse quantization unit inversely quantizes the quantized coefficient using the quantization matrix and the quantization parameter and supplies the obtained orthogonal transform coefficient to the inverse orthogonal transform unit 204.

In addition, for example, when the orthogonal transform skip is applied to the current block at the time of encoding, the inverse quantization unit inversely quantizes the quantized coefficient using the weighting coefficient and the quantization parameter and supplies the obtained pre-orthogonal transform differential value to the inverse orthogonal transform unit 204.

Thus, the inverse quantization unit 203 can appropriately perform the inverse quantization using a method corresponding to the quantization at the time of encoding. That is, the inverse quantization unit 203 can appropriately quantize the quantized coefficient by the quantization unit 105 of the image encoding device 100. Accordingly, the inverse quantization unit 203 can appropriately perform the inverse quantization so as to suppress the deterioration of the image quality. Therefore, the image decoding device 200 can realize the suppression of the deterioration of the image quality due to the encoding/decoding. In other words, the image decoding device 200 can improve the encoding efficiency.

The inverse orthogonal transform unit 204 appropriately performs the inverse orthogonal transform on the inversely quantized coefficient supplied from the inverse quantization unit 244 based on the control signal supplied from the control signal generation unit 232.

For example, when the current block is the block to which the orthogonal transform skip is not applied at the time of encoding, the inverse orthogonal transform unit 204 grasps based on the control signal that the inversely quantized coefficient supplied from the inverse quantization unit 244 is the orthogonal transform coefficient. That is, the inverse orthogonal transform unit 204 performs the inverse orthogonal transform on the orthogonal transform coefficient in a method that corresponds to the orthogonal transform of the orthogonal transform unit 104 in the image encoding device 100. Thus, the inversely quantized coefficient serving as a value of the frequency domain is converted into the pre-orthogonal transform differential value (decoded residual data) serving as a value of the spatial domain. The inverse orthogonal transform unit 204 supplies the decoded residual data to the computation unit 205.

In addition, for example, when the current block is the block to which the orthogonal transform skip is applied at the time of encoding, the inverse orthogonal transform unit 204 grasps based on the control signal that the inversely quantized coefficient supplied from the inverse quantization unit 244 is the pre-orthogonal transform differential value. The inverse orthogonal transform unit 204 supplies the pre-orthogonal transform differential value serving as the value of the spatial domain to the computation unit 205, as the decoded residual data.

Thus, the inverse orthogonal transform unit 204 can appropriately perform the inverse orthogonal transform in the method that corresponds to the orthogonal transform at the time of encoding. That is, for example, the inverse orthogonal transform unit 204 can perform appropriate processing on the coefficient generated by the orthogonal transform unit 104 of the image encoding device 100. Accordingly, the inverse orthogonal transform unit 204 can appropriately perform the inverse orthogonal transform so as to suppress the deterioration of the image quality. Therefore, the image decoding device 200 can realize the suppression of the deterioration of the image quality due to the encoding/ decoding. In other words, the image decoding device 200 can improve the encoding efficiency.

As illustrated in FIG. 20, the deblocking filter 206 is configured to include a boundary determination unit 251, a strength adjustment unit 252, and a filtering unit 253.

The boundary determination unit 251 is a processing unit similar to the boundary determination unit 151 of the image encoding device 100. The control signal (for example, skip identification information (TransformSkipFlag)) indicating whether the orthogonal transform skip is applied to the current block at the time of encoding is supplied to the boundary determination unit 251. The boundary determination unit 251 holds such information, determines whether the current block boundary is the boundary between the orthogonal transform skip block and the non-orthogonal transform skip block, and supplies the control signal indicating the determined result to the strength adjustment unit 252.

The strength adjustment unit 252 is a processing unit similar to the strength adjustment unit 152 of the image encoding device 100. The strength adjustment unit 252 generates various parameters such as a Bs value, α, β, and tc and determines the strength of the deblocking filter based on such values and the control signal supplied from the boundary determination unit 251. That is, the strength adjustment unit 252 determines the strength of the deblocking filter based on various parameters such as the generated Bs value, α, β, and tc when the current block boundary is not the boundary between the orthogonal transform skip block and the non-orthogonal transform skip block. In addition, the strength adjustment unit 252 additionally strengthens the filter strength based on the control signal, for example, in any manner similar to the above manner when the current block boundary is the boundary between the orthogonal transform skip block and the non-orthogonal transform skip block. The same method as in the strength adjustment unit 152 is used for the determination and adjustment of the filter strength. That is, the filter strength applied at the time of encoding is reproduced.

The strength adjustment unit 252 notifies the filtering unit 253 of the filter strength which is set in this manner.

The filtering unit 253 is a processing unit similar to the filtering unit 253 of the image encoding device 100. The filtering unit 253 performs the deblocking filter processing on the decoded residual data (pre-deblocking filter pixel value) of the block boundary which is supplied from the computation unit 205, using the filter strength supplied from the strength adjustment unit 252. The filtering unit 253 supplies a post-deblocking filter pixel value, which is obtained by performing the deblocking filter processing, to the screen rearrangement buffer 207 or the frame memory 209.

Thus, the deblocking filter 206 can perform the filter processing on the boundary between the orthogonal transform skip block and the non-orthogonal transform skip block such that the stronger deblocking filter is applied. Accordingly, the deterioration of the image quality is further suppressed. That is, the image decoding device 200 can achieve the suppression of the deterioration of the image quality due to the encoding/decoding. In other words, the image decoding device 200 can achieve the improvement of the encoding efficiency.

[Flow of Decoding Process]

Next, the flow in each processing operation to be executed by the above-described image decoding device 200 will be described. First, an example of the flow of a decoding process will be described with reference to a flowchart illustrated in FIG. 21.

When the decoding operation is started, the accumulation buffer 201 accumulates the transmitted coded data in step S201. In step S202, the lossless decoding unit 202 decodes the bit stream (encoded differential image information) supplied from the accumulation buffer 201. That is, I-pictures, P-pictures, and B-pictures which are encoded by the lossless encoding unit 106 illustrated in FIG. 1 are decoded.

At this time, various types of information such as header information other than the differential image information which are included in the bit stream are also decoded. In step S203, the TransformSkipFlag buffer 231 of the inverse orthogonal transform skip unit 221 acquires the skip identification information (TransformSkipFlag) extracted in the lossless decoding unit 202. The control signal generation unit 232 of the inverse orthogonal transform skip unit 221 generates a control signal based on the skip identification information (TransformSkipFlag) and supplies the control signal to the weighting coefficient generation unit 242, the inverse orthogonal transform unit 204, and the boundary determination unit 251.

In step S204, the inverse quantization unit 203 inversely quantizes a quantized coefficient obtained by the processing operation of step S202. In step S205, the inverse orthogonal transform unit 204 performs an inverse orthogonal transform on the inversely-quantized coefficient obtained in step S204 as necessary.

In step S206, the intra prediction unit 211 or the motion prediction/compensation unit 212 performs a prediction processing operation and generates a predicted image. That is, the prediction processing operation is performed in the prediction mode which is determined by lossless decoding unit 202 and applied at the time of encoding. More specifically, for example, when the intra prediction is applied at the time of encoding, the intra prediction unit 211 generates the predicted image in the intra prediction mode which is regarded as an optimal mode at the time of encoding. In addition, for example, when the inter prediction is applied at the time of encoding, the motion prediction/compensation unit 212 generates the predicted image in the inter prediction mode which is regarded as an optimal mode at the time of encoding.

In step S207, the computation unit 205 adds the predicted image generated in step S206 to the differential image information obtained by the inverse orthogonal transform in step S205. In this manner, an original image is decoded.

In step S208, the deblocking filter 206 appropriately performs the deblocking filter processing operation on the decoded image obtained in step S205. Further, the deblocking filter processing operation is performed in the same manner as the deblocking filter processing operation at the time of encoding. That is, since the operation is performed in the same manner as in the case where the operation is described with reference to the flowchart illustrated in FIG. 18, the detailed description of the deblocking filter processing is not presented. In other words, the above-description with reference to the flowchart illustrated in FIG. 18 can be applied as the description of the deblocking filter processing.

In step S209, the screen rearrangement buffer 207 rearranges the image subjected to the filter processing in step S208. That is, the order of frames rearranged for encoding by the screen rearrangement buffer 102 of the image encoding device 100 is rearranged in the original displaying order.

In step S210, the D/A converter 208 performs a D/A conversion on the image in which the order of frames is rearranged in step S209. The image is output to a display (not illustrated) and the image is displayed.

In step S211, the frame memory 209 stores the image subjected to the filter processing in step S209.

When the processing operation in step S211 is ended, the decoding process is completed.

[Flow of Inverse Quantization Processing]

Next, an example of the flow of an inverse quantization processing to be executed in step S204 of FIG. 21 will be described with reference to a flowchart illustrated in FIG. 22.

When the inverse quantization processing is started, the weighting coefficient generation unit 242 determines in step S231 whether the current block is an orthogonal transform skip (TransformSkip) mode.

When it is determined that the current block is the orthogonal transform skip (TransformSkip) mode, the processing proceeds to step S232. In step S232, the weighting coefficient generation unit 242 generates a weighting coefficient. When the processing in step S232 is ended, the processing proceeds to step S234.

Further, when it is determined in step S231 that the current block is not the orthogonal transform skip (TransformSkip) mode, the processing proceeds to step S233. In step S233, the weighting coefficient generation unit 242 acquires a quantization matrix through the TransformSkip-Flag buffer 231. When the processing in step S233 is ended, the processing proceeds to step S234.

In step S234, the inverse quantization unit 244 performs an inverse quantization using the weighting coefficient generated in step S232 or the quantization matrix generated in step S233.

Figure 21:
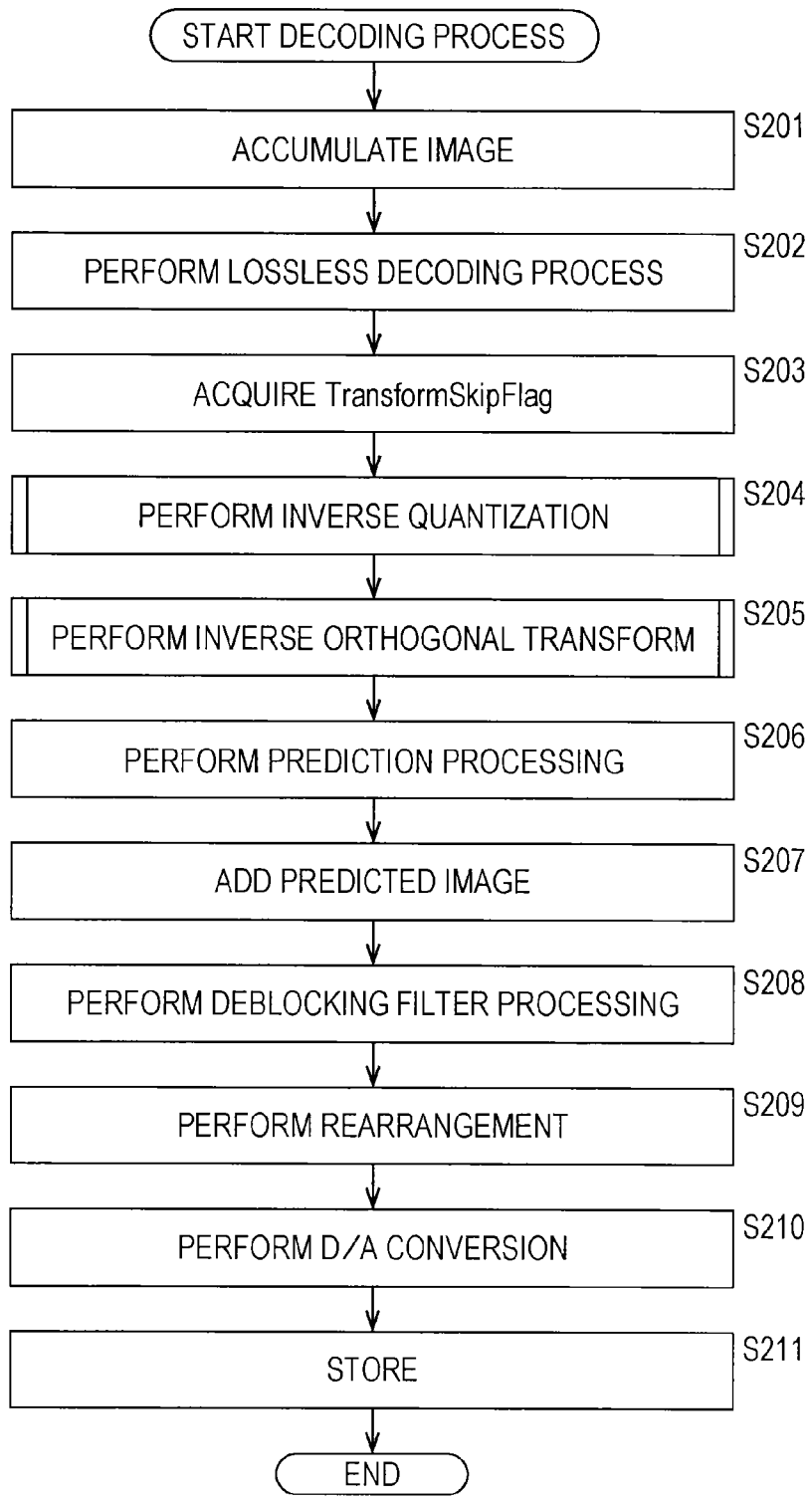
FIG. 21 is a flowchart for describing an example of a flow of a decoding process.
Figure 22:
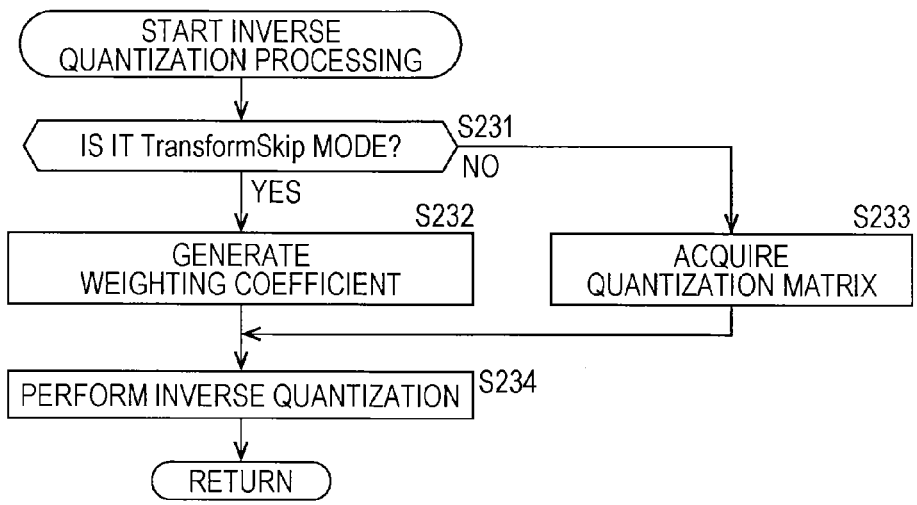
FIG. 22 is a flowchart for describing an example of a flow of inverse quantization processing.

When the processing in step S234 is ended, the inverse quantization processing is completed, and the processing returns to the processing operation illustrated in FIG. 21.

[Flow of Inverse Orthogonal Transform Processing]

Next, an example of the flow of an inverse orthogonal transform processing to be executed in step S205 of FIG. 21 will be described with reference to a flowchart illustrated in FIG. 23.

When the inverse orthogonal transform processing is started, the inverse orthogonal transform unit 204 determines in step S251 whether the current block is an orthogonal transform orthogonal transform skip (TransformSkip) mode.

When it is determined that the current block is the orthogonal transform skip (TransformSkip) mode, the inverse orthogonal transform processing is ended, and the processing returns to the processing operation illustrated in FIG. 21.

Figure 23:
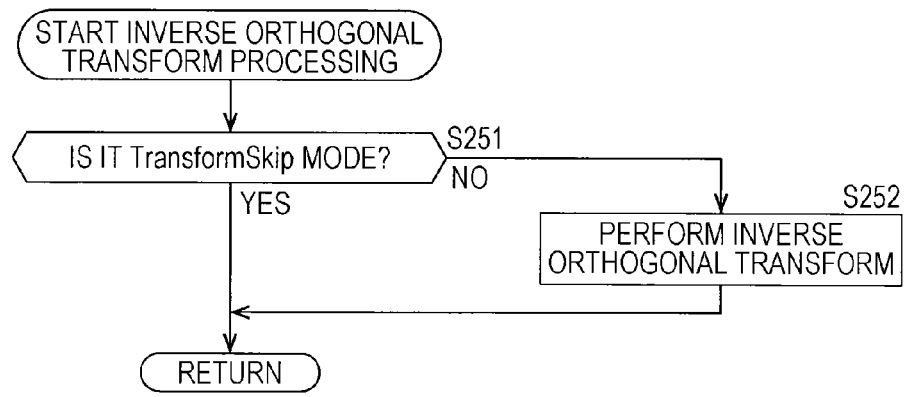
FIG. 23 is a flowchart for describing an example of a flow of inverse orthogonal transform processing.

Further, when it is determined in step S251 of FIG. 23 that the current block is not the orthogonal transform skip (TransformSkip) mode, the processing proceeds to step S252. In step S252, the inverse orthogonal transform unit 204 performs the inverse orthogonal transform on the inversely-quantized coefficient.

When the processing in step S252 is ended, the inverse orthogonal transform processing is completed, the processing returns to the processing operation illustrated in FIG. 21.

By executing each processing operation as described above, the image decoding device 200 can correctly decode the coded data, thereby achieving the suppression of the reduction of the encoding efficiency and the suppression of the deterioration of the image quality due to the encoding/decoding.

Further, in the above, it is described that the skip enable information (transform_skip_enabled_flag) is transmitted to the SPS, but a method of transmitting the skip enable information is not limited thereto.

For example, when a picture such as, for example, a natural image, in which the orthogonal transform skip (TransformSkip) is not valid and a picture such as an image including captions which contain a block to which the orthogonal transform skip (TransformSkip) is applied are present in one sequence, if the orthogonal transform skip is enabled in sequence unit, the skip identification information (TransformSkipFlag) has to be transmitted to all of the blocks of all the pictures in the sequence, and thus it is inefficient. If the orthogonal transform skip is disabled, there is no need to transmit the skip identification information (TransformSkipFlag). For this reason, particularly, as the ratio of the picture containing the block, to which the orthogonal transform skip (TransformSkip) is applied, becomes smaller, there is a concern to unnecessarily reduced encoding efficiency.

Thus, the orthogonal transform skip is not limited to be enabled in sequence units but is preferably enabled in unit smaller than the sequence unit. For this reason, the skip enable information may be transmitted to any position of bit stream such as, for example, PPS or slice header other than the SPS. Naturally, the skip enable information may be transmitted separately from the bit stream.

Further, in the above, it is described that the skip enable information (transform_skip_enabled_flag) is set by the user or the like, but a setting method (control method of enabling/disabling the orthogonal transform skip) of the skip enable information (transform_skip_enabled_flag) is arbitrary. For example, the skip enable information may be set according to the content of the image to be encoded.

For example, when the orthogonal transform skip is disabled in an initial state and a genre of a program is detected in an electronic program guide (EPG) or the like, if the detected genre is an animation, it is preferable to set the skip enable information (transform_skip_enabled_flag) so as to enable the orthogonal transform skip. Thus, the control of the enabling/disabling of the orthogonal transform skip may be performed based on information other than a moving image.

Furthermore, for example, a detection of an CM (commercial broadcasting) is performed in a state (for example, in the case where the program is an animation) where the orthogonal transform skip is enabled, the orthogonal transform skip may be disabled during the CM broadcasting, and the orthogonal transform skip may be enabled during the program broadcasting. Thus, the control of the enabling/disabling of the orthogonal transform skip may be performed based on analysis results obtained by analyzing the content of the moving image.

Naturally, the content (moving image) subjected to such control processing is not limited to the broadcasting content. For example, it may be a content which is recorded in a recording medium such as, for example, a hard disk or a Blu-ray (registered trademark) disk and a content which is downloaded (or streaming-reproduced) from the outside through an electric communication line such as an Internet.

<3. Third Embodiment>

[Transmission Control of Skip Enable Information]

However, as described above, the orthogonal transform skip can be applied to 4×4 luminance orthogonal transform block (TU of luminance component) or 4×4 chrominance orthogonal transform block (TU of chrominance component).

On the contrary, for example, a minimum size of the TU is designated by syntax which is referred to as log 2_min_ transform_block_size_minus2 in the HEVC or the like. For example, in the sequence parameter set (SPS) illustrated in FIG. 4, the minimum size of the TU is designated by the log 2_min_transform_block_size_minus2 indicated in the sixth row from the bottom.

When the minimum size designated by the log 2_min_transform_block_size_minus2 is larger than 4×4, the 4×4 orthogonal transform block (TU) is not present. That is, in this case, there is no possibility that the orthogonal transform skip (TransformSkip) is applied. Accordingly, there is no need to transmit the skip enable information (transform_skip_enabled_flag) indicating whether or not to enable/disable the orthogonal transform skip (TransformSkip). In other words, when the skip enable information is transmitted despite the minimum size of the TU is larger than 4×4, the amount of information unnecessarily increases, and thus the encoding efficiency may be unnecessarily reduced.

Here, as described above, when the minimum size of the TU is larger than 4×4, the transmission of the skip enable information may be omitted. In other words, the skip enable information may be transmitted only in the case where the minimum size of the TU is 4×4 (or less) (only in the case where the TU having the size of 4×4 is present).

[Transmission in Sequence Parameter Set]

A transmission method of the skip enable information (transform_skip_enabled_flag) is arbitrary. For example, the skip enable information may be transmitted to the sequence parameter set (SPS). Some example of the syntax of the SPS in such a case is illustrated in FIG. 24.

As illustrated in FIG. 24, a log 2_min_transform_block_size_minus2 indicating the minimum size of the orthogonal transform block (TU) is set in the fifth row from the top in FIG. 24. The log 2_min_transform_block_size_minus2 is a syntax indicating the minimum size of the orthogonal transform block (TU) in the sequence corresponding to the SPS.

On the contrary, as indicated in the fifth row from the bottom in FIG. 24, it is confirmed whether the minimum size of the TU is 4×4 (if (log 2_min_transform_block_size_minus2==0)), and the skip enable information (transform_skip_enabled_flag) is set only in the case where the minimum size of the TU is 4×4, as indicated in the fourth row from the bottom in FIG. 24. That is, the skip enable information is transmitted only in the case where the minimum size of the TU is 4×4; otherwise, it is controlled so as not to be transmitted. Further, in this case, the skip enable information (transform_skip_enabled_flag) is transmitted only in the SPS. In addition, when skip enable information (transform_skip_enabled_flag) is set, the value is set based on any information such as, for example, a user's instruction.

Furthermore, the transmission control of the skip enable information is performed by the lossless encoding unit 106. Consequently, the image encoding device 100 can transmit the skip enable information only when necessary, thereby suppressing the reduction of the encoding efficiency and suppressing the deterioration of the image quality due to the encoding/decoding.

[Transmission to Picture Parameter Set]

In addition, the skip enable information (transform_skip_enabled_flag) may be transmitted to, for example, the picture parameter set (PPS). Some example of the syntax of the PPS in such a case is illustrated in FIG. 25.

As illustrated in FIG. 25, a pps_log 2_min_transform_block_size_minus2 indicating the minimum size of the orthogonal transform block (TU) is set in the third row from the top in FIG. 25. The pps_log 2_min_transform_block_size_minus2 is a syntax indicating the minimum size of the orthogonal transform block (TU) in the picture corresponding to the PPS. That is, even when the above-described log 2_min_transform_block_size_minus2 is set in the SPS, the pps_log 2_min_transform_block_size_minus2 can be set in the PPS. However, in this case, the skip enable information (transform_skip_enabled_flag) is transmitted only in the PPS.

On the contrary, as indicated in the fourth row form the top in FIG. 25, it is confirmed whether the minimum size of the TU is 4×4 (if (pps_log 2_min_transform_block_size_minus2==0)), and the skip enable information (transform_skip_enabled_flag) is set only in the case where the minimum size of the TU is 4×4, as indicated in the fifth row from the top in FIG. 25. That is, even in this case, the skip enable information is transmitted only in the case where the minimum size of the TU is 4×4; otherwise, it is controlled so as not to be transmitted. When the skip enable information (transform_skip_enabled_flag) is set, the value is set based on any information such as, for example, a user's instruction.

Even in this case, the transmission control of the skip enable information is performed by the lossless encoding unit 106. Consequently, the image encoding device 100 can transmit the skip enable information only when necessary, thereby suppressing the reduction of the encoding efficiency and suppressing the deterioration of the image quality due to the encoding/decoding.

Further, the position of the syntax of the pps_log 2_min_transform_block_size_minus2 in the PPS is not limited to the example in FIG. 25. The pps_log 2_min_transform_block_size_minus2 may be set at the position prior to that of the skip enable information (transform_skip_enabled_flag). Thus, it enables the SPS and PPS to be independent in terms of parsing, and both of them can be independently decoded.

[Transmission to Slice Header]

Further, even though not illustrated, the skip enable information (transform_skip_enabled_flag) may be transmitted to, for example, a slice header.

In the slice header, the log 2_min_transform_block_size_minus2 is not set. In the slice, a picture to which the slice belongs is set. That is, the pps_log 2_min_transform_block_size_minus2 of the PPS is referenced.

In the slice header, the skip enable information is set as follows.

```
if(pps_log2_min_transform_block_size_minus2 == 0) {
    transcorm_skip_enabled_flag
}
```

That is, in this case, skip enable information (transform_skip_enabled_flag) is set in the same manner as in the case of the PPS. However, in this case, the skip enable information (transform_skip_enabled_flag) is transmitted only in the slice header.

Even in this case, the skip enable information is transmitted only in the case where the minimum size of the TU is 4×4; otherwise, it is controlled so as not to be transmitted. In addition, when the skip enable information (transform_skip_enabled_flag) is set, the value is set based on any information such as, for example, a user's instruction. Further, the transmission control of the skip enable information is performed by the lossless encoding unit 106.

Consequently, the image encoding device 100 can transmit the skip enable information only when necessary, thereby suppressing the reduction of the encoding efficiency and suppressing the deterioration of the image quality due to the encoding/decoding.

As described above, the transmission control of the skip enable information can be performed in an arbitrary unit. Naturally, it may be a unit other than the example described above.

[Flow of Skip-enable-information Generation Processing]

Next, an example of a flow of a skip-enable-information generation processing will be described with reference to a flowchart in FIG. 26, which controls the transmission of the skip enable information as described above.

This processing operation can be performed in any timing if it is performed before the orthogonal transform processing, but for example, it may be performed in step S101 of the encoding process in FIG. 14.

When the skip-enable-information generation processing is started, the lossless encoding unit 106 sets the log 2_min_transform_block_size_minus2 in step S301.

In step S302, the lossless encoding unit 106 determines whether the minimum size of the orthogonal transform block (TU) is 4×4 (or less).

If "0" is set to the value of the log 2_min_transform_block_size_minus2 by the processing in step S301 and it is determined that the minimum size of the orthogonal transform block (TU) is 4×4 (or less), the processing proceeds to step S303.

In step S303, the lossless encoding unit 106 sets the skip enable information (transform_skip_enabled_flag). When the processing in step S303 is ended, the skip-enable-information generation processing is completed, and the processing operation returns to, for example, the encoding process in FIG. 14.

Figure 26:
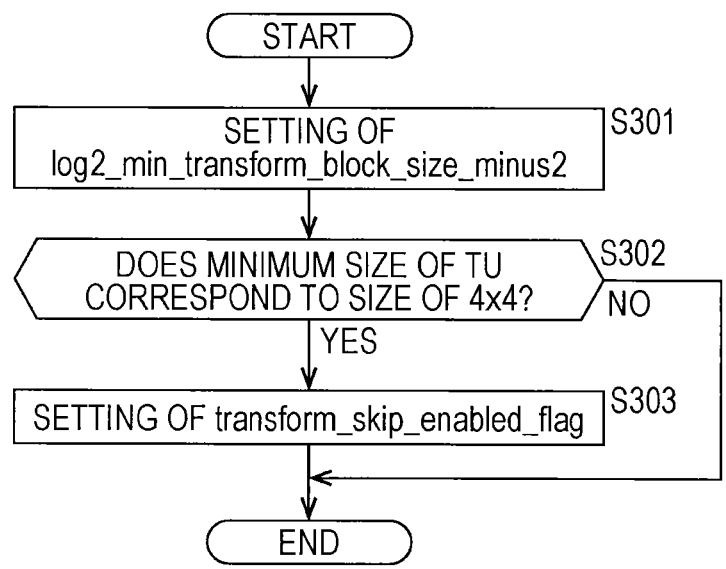
FIG. 26 is a flowchart for describing an example of a flow of skip enable information generation processing.

Further, if "1" or more is set to the value of the log 2_min_transform_block_ size_ minus2 by the processing of S301 in step S302 of FIG. 26 and it is determined that the minimum size of the orthogonal transform block (TU) is larger than 4×4, the processing (setting of the skip enable information (transform_skip_enabled_flag)) in step S303 is omitted, the skip-enable-information generation processing is completed, and the processing operation returns to, for example, the encoding process in FIG. 14.

As described above, by the skip-enable-information generation processing, the image encoding device 100 can suppress the reduction of the encoding efficiency and suppress the deterioration of the image quality due to the encoding/decoding.

Further, FIG. 26 illustrates the description of the flow of the skip-enable-information generation processing when the skip enable information is transmitted to the SPS, but may be applied even when the skip enable information is transmitted to the PPS or the slice header. In the case where the skip enable information is transmitted to the PPS or the slice header, since the flow of the processing operation is basically similar to the flow of the processing operation which is described with reference to FIG. 26 except that the syntax set in step S301 is pps_log 2_min_transform_block_size_minus2 of PPS, the description thereof will be not presented.

[Reception of Skip Enable Information in Image Decoding Device]

When the transmission of the skip enable information is controlled as described above in the image encoding device 100, there are a case where the skip enable information is transmitted and a case where the skip enable information is not transmitted. Therefore, in the similar manner, the image decoding device 200 may control whether or not to accept (whether or not to receive) the skip enable information from the setting of the minimum size of the orthogonal transform block (TU). Thus, the image decoding device 200 can suppress the increase in unnecessary waiting time, for example, time waiting for the skip enable information which is not transmitted.

That is, as in the image encoding device 100, the image decoding device 200 controls whether or not to receive the skip enable information based on the values (depending on whether the minimum size of the TU is 4×4) with reference to the log 2_min_transform_block_size_minus2 transmitted to the SPS and the pps_log 2_min_transform_block_size_minus2 transmitted to the PPS. For example, such control is performed by the lossless decoding unit 202 of the image decoding device 200.

[Flow of Skip-enable-information Reception Processing]

Next, an example of a flow of the skip-enable-information generation processing will be described with reference to a flowchart in FIG. 27, which controls the transmission of the skip enable information as described above. This processing operation may be performed prior to acquiring the skip identification information (TransfomSkipFlag) (for example, prior to step S203 in FIG. 21).

When the skip-enable-information reception processing is started, the lossless decoding unit 202 receives the log 2_min_transform_block_size_minus2 in step S321. In step S322, the lossless decoding unit 202 determines whether the minimum size of the TU is 4×4 (or less), based on the received value.

If the value of the log 2_min_transform_block_size_minus2 is "0" and it is determined that the minimum size of the TU is 4×4 (or less), the processing proceeds to step S323. In step S323, the lossless decoding unit 202 performs the reception of the skip enable information (transform_skip_enabled_flag). When the processing in step S323 is ended, the skip-enable-information reception processing is completed, and the processing operation returns to, for example, the decoding process in FIG. 21.

Figure 27:
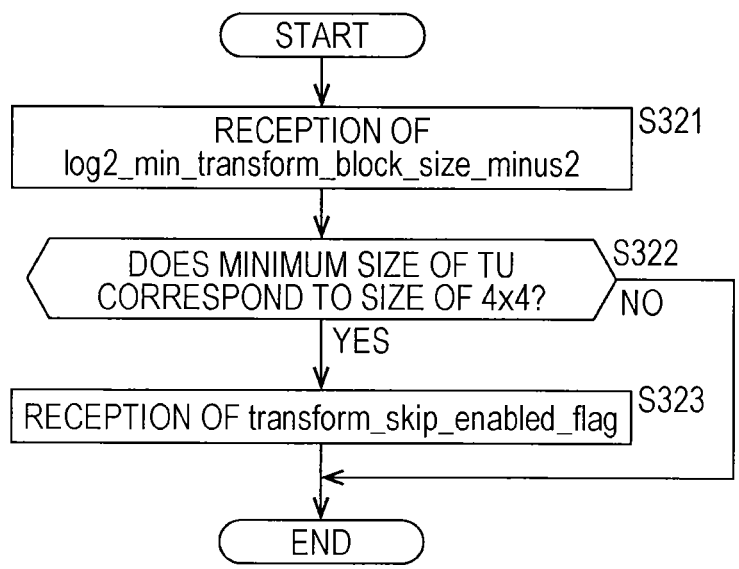
FIG. 27 is a flowchart for describing an example of a flow of skip enable information reception processing.

Further, if the value of the log 2_min_transform_block_size_minus2 is "1" or more in step S322 of FIG. 27 and it is determined that the minimum size of the TU is larger than 4×4, the skip-enable-information reception processing is completed, and the processing operation returns to, for example, the decoding process in FIG. 21.

As described above, by the skip-enable-information reception processing, the image decoding device 200 can suppress the reduction of the encoding efficiency and suppress the deterioration of the image quality due to the encoding/decoding.

Further, FIG. 27 illustrates the description of the flow of the skip-enable-information generation processing when the skip enable information is transmitted to the SPS, and the description may be applied even when the skip enable information is transmitted to the PPS or the slice header since the flow of the processing operation is basically similar to the flow of the processing operation which is described with reference to FIG. 27 except that the syntax received in step S321 is pps_log 2_min_transform_block_size_minus2 of PPS, thus the description thereof will be not presented.

The above description has been made based on the HEVC coding system, but the scope of the present technology is not limited thereto and the present technology can be applied to all of the image information encoding device and decoding device based on the coding system using the orthogonal transform skip (TransformSkip) as proposed in Non-Patent Document 2.

<4. Fourth Embodiment>

[Application to Multi-image Point Encoding/Multiple Viewpoint Image Decoding]

Figure 28:
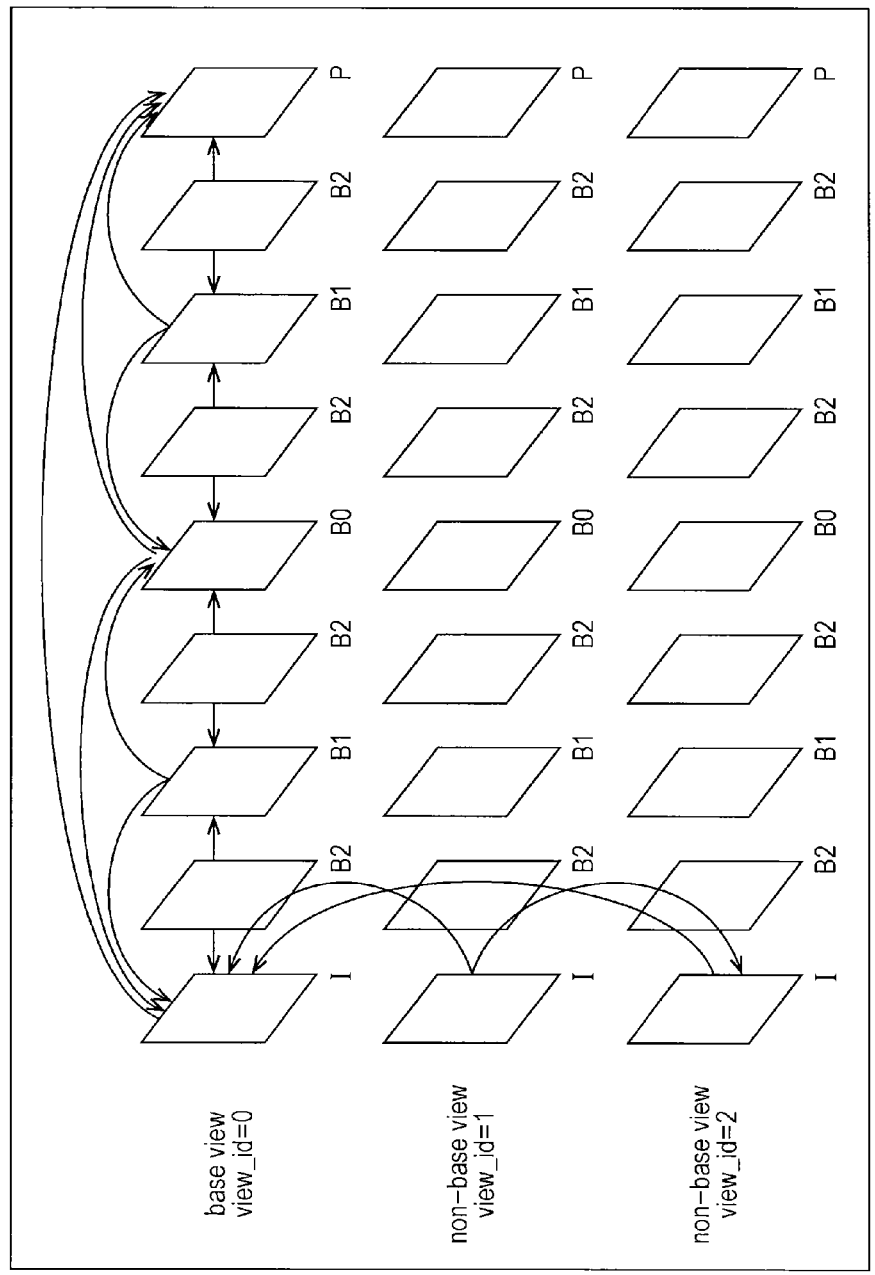
FIG. 28 is a diagram illustrating an example of a multiple viewpoint image coding system.

The series of processing operations described above may be applied to multiple viewpoint image encoding/multiple viewpoint image decoding. FIG. 28 illustrates an example of a multiple viewpoint image coding system.

As illustrated in FIG. 28, a multiple viewpoint image includes images from a plurality of viewpoints and an image from a predetermined viewpoint out of the plural viewpoints is designated as a base view image. An image from each viewpoint other than the base view image is treated as a non-base view image.

In the case of performing such multiple viewpoint image encoding as in FIG. 28, a difference in quantization parameter may be taken in individual views (the same view).

(1) base-view:
(1-1) dQP(base view)=Current_CU_QP(base view)−LCU_QP(base view)
(1-2) dQP(base view)=Current_CU_QP(base view)−Previsous_CU_QP(base view)
(1-3) dQP(base view)=Current_CU_QP(base view)−Slice_QP(base view)

(2) non-base-view:
(2-1) dQP(non-base view)=Current_CU_QP(non-base view)−LCU_QP(non-base view)
(2-2) dQP(non-base view)=CurrentQP(non-base view)−PrevisousQP(non-base view)
(2-3) dQP(non-base view)=Current_CU_QP(non-base view)−Slice_QP(non-base view)

In the case of performing the multiple viewpoint image encoding, a difference in quantization parameter may be taken in individual views (different views).

(3) base-view/non-base view:
(3-1) dQP(inter-view)=Slice_QP(base view)−Slice_QP(non-base view)
(3-2) dQP(inter-view)=LCU_QP(base view)−LCU_QP(non-base view)

(4) non-base view/non-base view:
(4-1) dQP(inter-view)=Slice_QP(non-base view i)−Slice_QP(non-base view j)
(4-2) dQP(inter-view)=LCU_QP(non-base view i)−LCU_QP(non-base view j)

In this case, the items (1) to (4) described above may be used in combination. For example, in the non-base views, a technique (using 3-1 and 2-3 in combination) for taking a difference in quantization parameter between a base view and a non-base view on a slice level basis and a technique (using 3-2 and 2-1 in combination) for taking a difference in quantization parameter between a base view and a non-base view on an LCU level basis may be considered. Accordingly, it is possible to improve the encoding efficiency by repeatedly applying the difference even in the case of performing the multiple viewpoint encoding.

Similarly to the techniques described above, it is also possible to set a flag identifying whether a dQP whose value is not 0 is present with respect to each dQP described above.

[Multiple Viewpoint Image Encoding Device]

Figure 29:
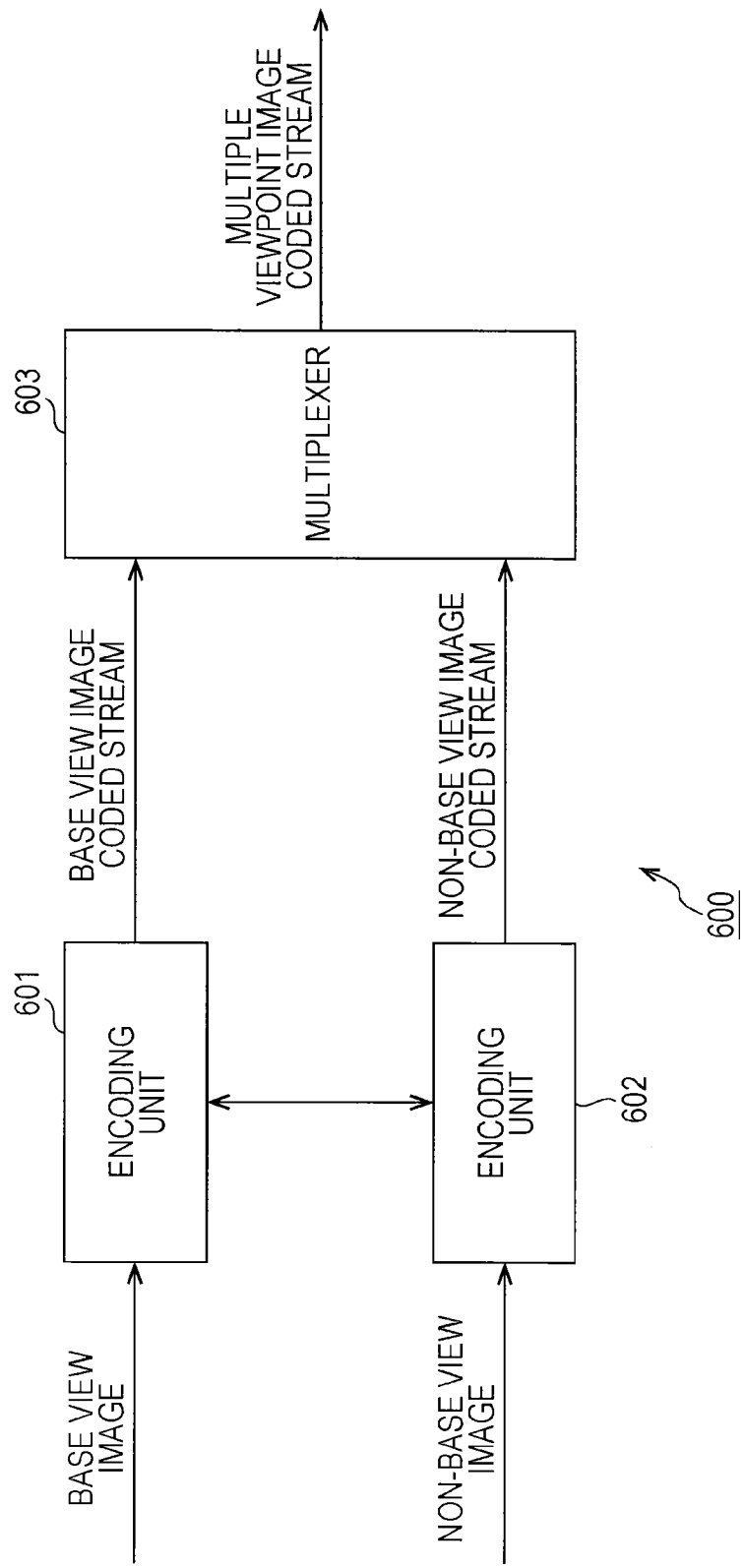
FIG. 29 is a diagram illustrating an example of a main configuration of a multiple viewpoint image encoding device to which the present technology is applied.

FIG. 29 is a diagram illustrating a multiple viewpoint image encoding device performing the above-described multiple viewpoint image encoding. As illustrated in FIG. 29, a multiple viewpoint image encoding device 600 includes an encoding unit 601, an encoding unit 602, and a multiplexer 603.

The encoding unit 601 encodes a base view image and generates a base view image coded stream. The encoding unit 602 encodes a non-base view image and generates a non-base view image coded stream. The multiplexer 603 multiplexes the base view image coded stream generated in the encoding unit 601 and the non-base view image coded stream generated in the encoding unit 602 and generates a multiple viewpoint image coded stream.

The image encoding device 100 (FIG. 1) may be applied to the encoding unit 601 and the encoding unit 602 of the multiple viewpoint image encoding device 600. In this case, the multiple viewpoint image encoding device 600 sets a difference value between a quantization parameter set by the encoding unit 601 and a quantization parameter set by the encoding unit 602 and transmits the difference value.

In addition, the orthogonal transform skip processing may be independently performed on each view in each of the encoding unit 601 and the encoding unit 602. In addition, the quantization processing, the deblocking filter processing or the like may be also independently performed on each view in each of the encoding unit 601 and the encoding unit 602. In this case, the information such as the quantization matrix, various flags, and the weighting coefficient is included in, for example, the coded stream for each view, and thus the information is supplied to the multiplexer 603 from the encoding unit 601 and the encoding unit 602. The supplied information is multiplexed in the multiplexer 603 and is then transmitted to the decoding side in a state of being included in the multiple viewpoint image coded stream.

Further, with respect to some or the entire orthogonal transform skip processing, the quantization processing, and the deblocking filter processing, the processing in one of the encoding unit 601 and the encoding unit 602 may be reflected in that in the other of them. Further, some or the entire information, such as the information on the skip of the orthogonal transform processing including the skip enable information or the skip identification information, the information on the quantization, and the information on the deblocking filter may be shared in the encoding unit 601 and the encoding unit 602. For example, some or all of processed results (or obtained information or the like) obtained by performing the orthogonal transform skip processing, the quantization processing, and the deblocking filter processing on the base view image in the encoding unit 601 may be supplied to the encoding unit 602 and be reflected in such processing operations for the non-base view image performed in the encoding unit 602. Naturally, on the contrary, processed results (or obtained information or the like) obtained by performing the orthogonal transform skip processing, the quantization processing, and the deblocking filter processing on the non-base view image in the encoding unit 602 may be supplied to the encoding unit 601 and be reflected in such processing operations for the base view image performed in the encoding unit 601.

[Multiple Viewpoint Image Decoding Device]

Figure 30:
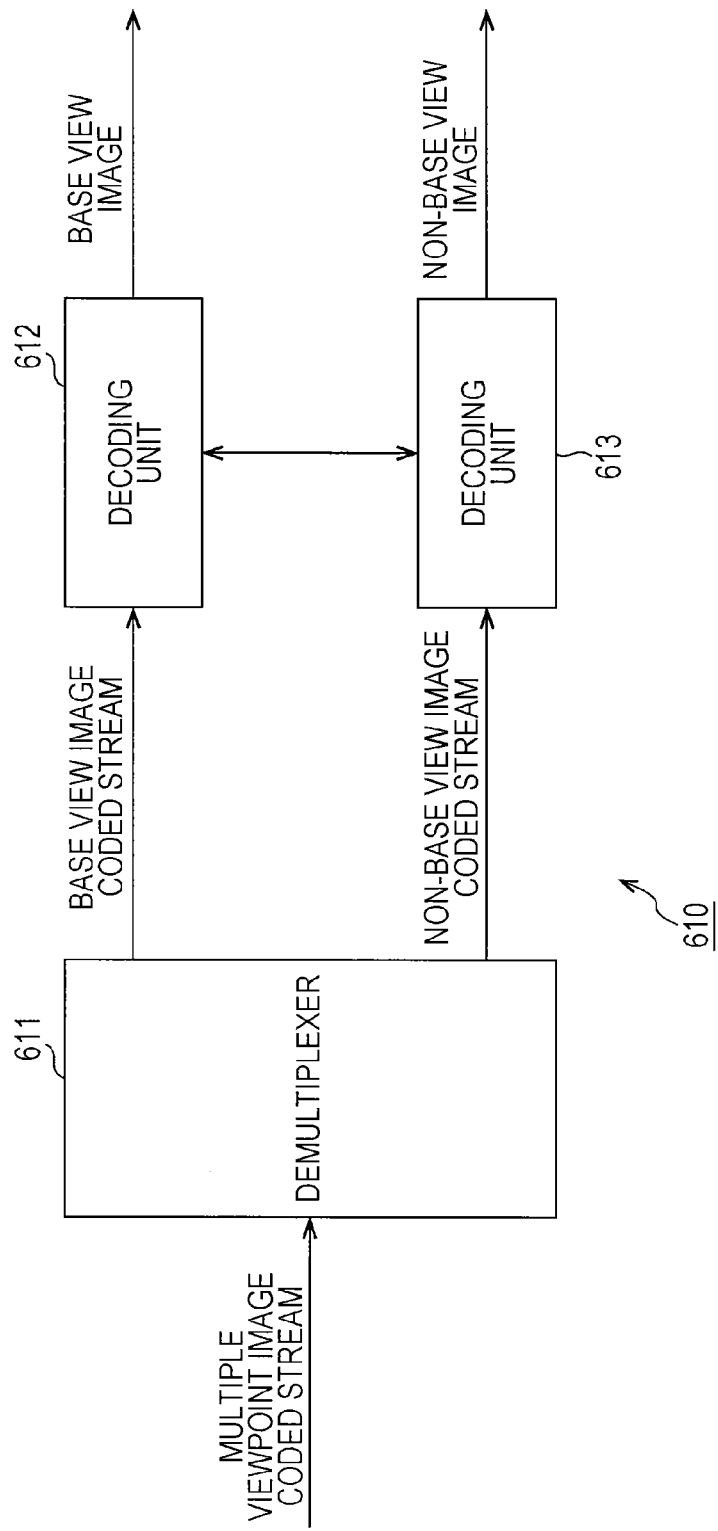
FIG. 30 is a diagram illustrating an example of a main configuration of a multiple viewpoint image decoding device to which the present technology is applied.

FIG. 30 is a diagram illustrating a multiple viewpoint image decoding device for performing the above-described multiple viewpoint image decoding. As illustrated in FIG. 30, a multiple viewpoint image decoding device 610 includes a demultiplexer 611, a decoding unit 612, and a decoding unit 613.

The demultiplexer 611 demultiplexes the multiple viewpoint image coded stream in which the base view image coded stream and the non-base view image coded stream are multiplexed, and extracts the base view image coded stream and the non-base view image coded stream. The decoding unit 612 decodes the base view image coded stream extracted by the demultiplexer 611 and obtains a base view image. The decoding unit 613 decodes the non-base view image coded stream extracted by the demultiplexer 611 and obtains a non-base view image.

The image decoding device 200 (FIG. 19) may be applied to the decoding unit 612 and the decoding unit 613 of the multiple viewpoint image decoding device 610. In this case, the decoding unit 612 and the decoding unit 613 of the multiple viewpoint image decoding device 610 set a quantization parameter using a difference value between a quantization parameter set by the encoding unit 601 of the multiple viewpoint image encoding device 600 and a quantization parameter set by the encoding unit 602 and perform an inverse quantization.

In addition, the orthogonal transform skip processing may be independently performed on each view in each of the decoding unit 612 and the decoding unit 613. In addition, the inverse quantization processing, the deblocking filter processing or the like may be also independently performed in each of the decoding unit 612 and the decoding unit 613. In this case, the information such as the quantization matrix, various flags, and the weighting coefficient included in the multiple viewpoint image coded stream and transmitted from the coding side is separated in the demultiplexer 611 for each view and is then supplied to the decoding unit 612 and the decoding unit 613 in a state of being included in the coded stream for each view.

Further, with respect to some or the entire inverse orthogonal transform skip processing, the inverse quantization processing, and the deblocking filter processing, the processing, the decoding unit 612 and the decoding unit 613 may be reflected one another. Further, some or the entire information, such as the information on the skip of the inverse orthogonal transform processing including the skip enable information or the skip identification information, the information on the inverse quantization, and the information on the inverse deblocking filter may be shared in the decoding unit 612 and the decoding unit 613. For example, some or all of processed results (or obtained information or the like) obtained by performing the inverse orthogonal transform skip processing, the inverse quantization processing, and the deblocking filter processing on the base view image coded stream in the decoding unit 612 may be supplied to the decoding unit 613 and be reflected in such processing operations for the non-base view image coded stream performed in the decoding unit 613 (for example, omission of duplicated processing). Naturally, on the contrary, processed results (or obtained information) obtained by performing the inverse orthogonal transform skip processing, the inverse quantization processing, and the deblocking filter processing on the non-base view image coded stream in the decoding unit 613 may be supplied to the decoding unit 612 and be reflected in such processing operations for the base view image coded stream performed in the decoding unit 612 (for example, omission of duplicated processing).

<5. Fifth Embodiment>

[Application to Hierarchical Image Point Encoding/Hierarchical Image Decoding]

Figure 31:
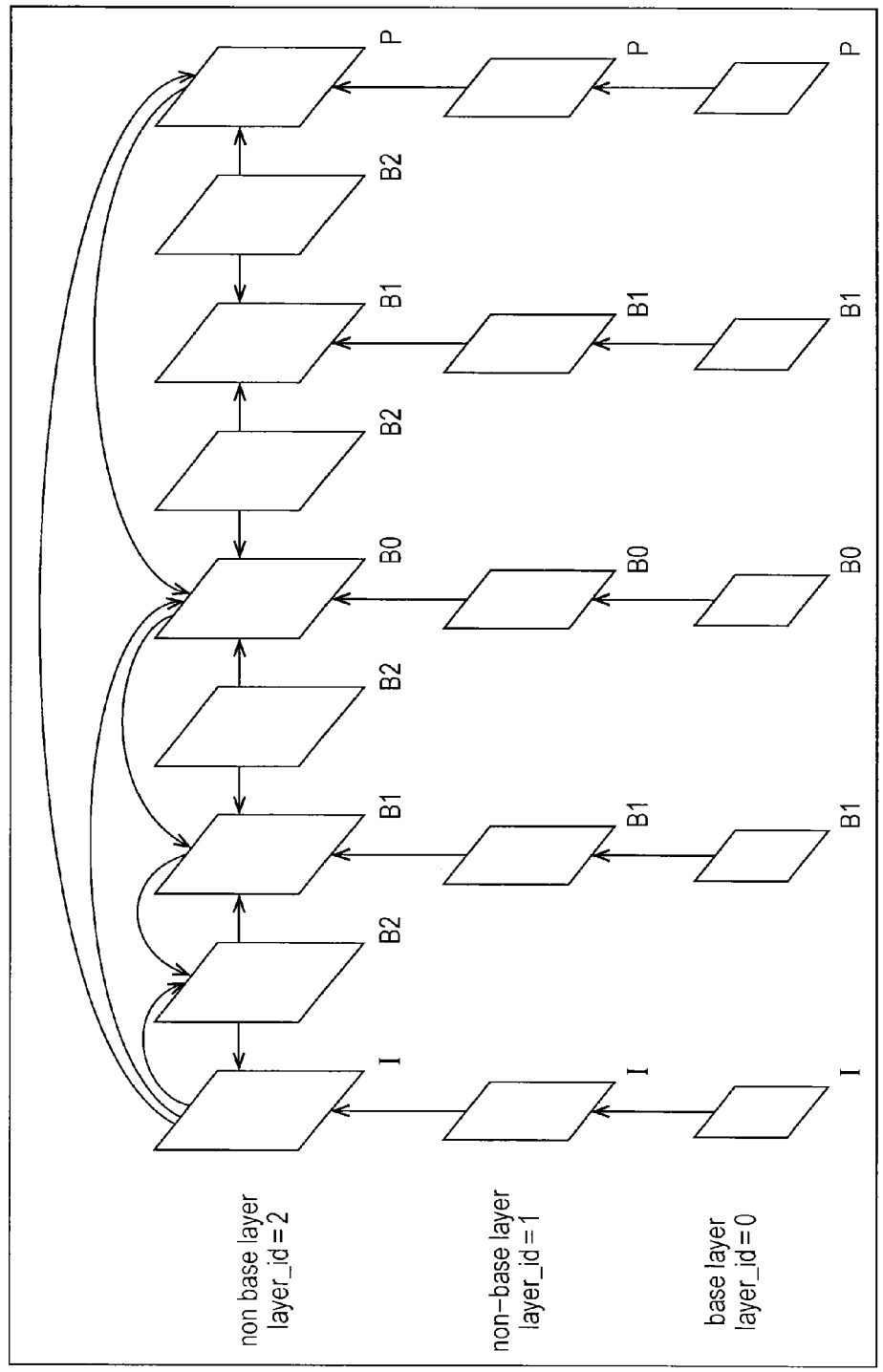
FIG. 31 is a diagram illustrating an example of a hierarchical image coding system.

The series of processing operations described above may be applied to hierarchical image encoding/hierarchical image decoding. FIG. 31 illustrates an example of a multiple viewpoint image coding system.

As illustrated in FIG. 31, a hierarchical image includes images in a plurality of layers (resolutions), and an image of a predetermined layer out of the plural resolutions is designated as a base layer image. An image of each layer other than the base layer image is treated as a non-base layer image.

In the case of performing the hierarchical image encoding (spatial scalability) illustrated in FIG. 31, a difference in quantization parameter may be taken in each layer (the same layer).

(1) base-layer:
(1-1) dQP(base layer)=Current_CU_QP(base layer)−LCU_QP(base layer)
(1-2) dQP(base layer)=Current_CU_QP(base layer)−Previsous_CU_QP(base layer) (1-3) dQP(base layer)=Current_CU_QP(base layer)−Slice_QP(base layer)

(2) non-base-layer:
(2-1) dQP(non-base layer)=Current_CU_QP(non-base layer)−LCU_QP(non-base layer)
(2-2) dQP(non-base layer)=CurrentQP(non-base layer)−PrevisousQP(non-base layer)
(2-3) dQP(non-base layer)=Current_CU_QP(non-base layer)−Slice_QP(non-base layer)

In the case of the hierarchical encoding, a difference in quantization parameter may be taken in each layer (different layers).

(3) base-layer/non-base layer:
(3-1) dQP(inter-layer)=Slice_QP(base layer)−Slice_QP(non-base layer)
(3-2) dQP(inter-layer)=LCU_QP(base layer)−LCU_QP(non-base layer)

(4) non-base layer/non-base layer:
(4-1) dQP(inter-layer)=Slice_QP(non-base layer i)−Slice_QP(non-base layer j)
(4-2) dQP(inter-layer)=LCU_QP(non-base layer i)−LCU_QP(non-base layer j)

In this case, the items (1) to (4) described above may be used in combination. For example, in the non-base layers, a technique (using 3-1 and 2-3 in combination) for taking a difference in quantization parameter between a base layer and a non-base layer on a slice level basis and a technique (using 3-2 and 2-1 in combination) for taking a difference in quantization parameter between a base layer and a non-base layer on an LCU level basis may be considered. Accordingly, it is possible to improve the encoding efficiency by repeatedly applying the difference even in the case of performing the hierarchical encoding.

Similarly to the techniques described above, it is also possible to set a flag identifying whether a dQP whose value is not 0 is present with respect to each dQP described above.

[Hierarchical Image Encoding Device]

Figure 32:
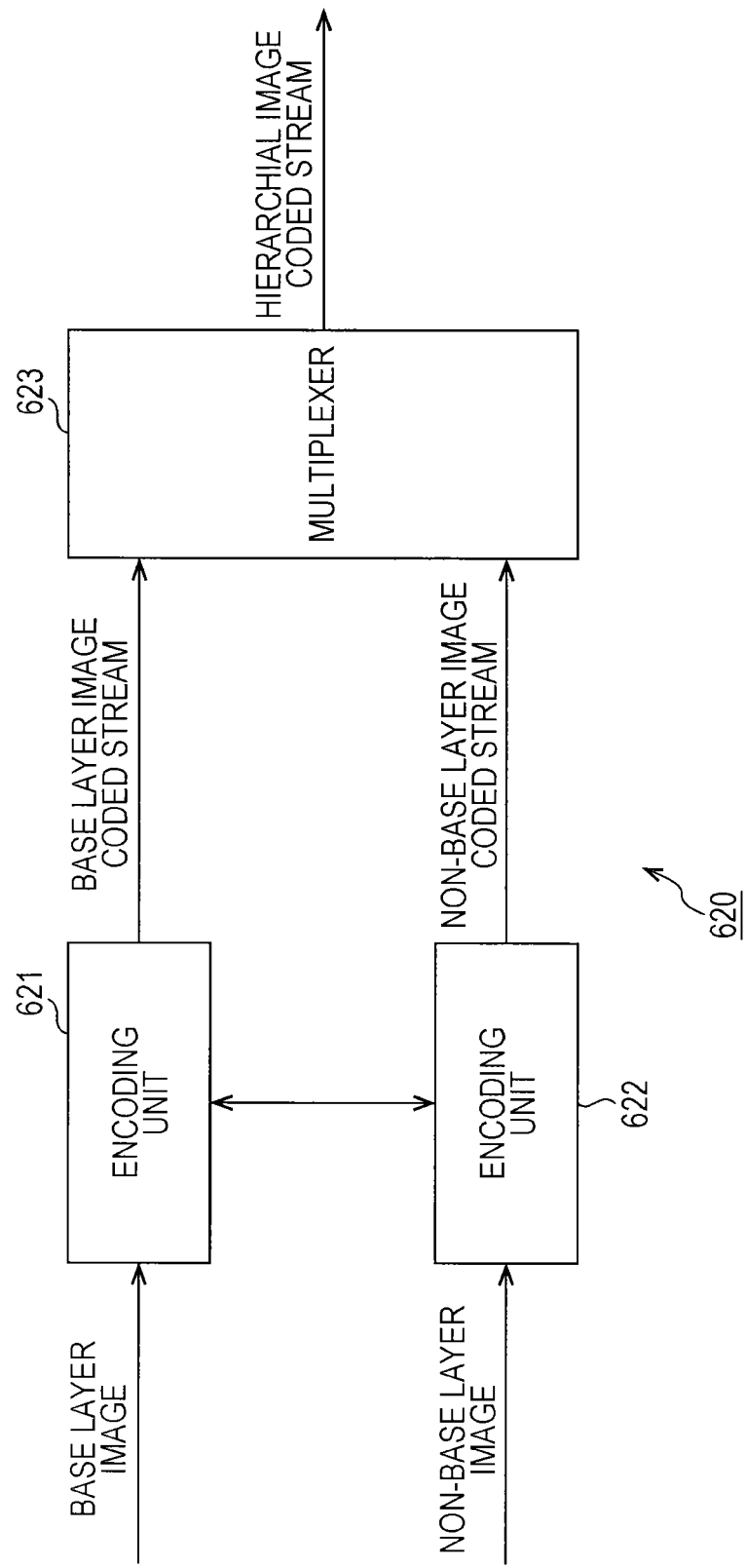
FIG. 32 is a diagram illustrating an example of a main configuration of a hierarchical image encoding device to which the present technology is applied.

FIG. 32 is a diagram illustrating a hierarchical image encoding device for performing the above-described hierarchical image encoding. As illustrated in FIG. 32, a hierarchical image encoding device 620 includes an encoding unit 621, an encoding unit 622, and a multiplexer 623.

The encoding unit 621 encodes a base layer image and generates a base layer image coded stream. The encoding unit 622 encodes a non-base layer image and generates a non-base layer image coded stream. The multiplexer 623 multiplexes the base layer image coded stream generated in the encoding unit 621 and the non-base layer image coded stream generated in the encoding unit 622 and generates a hierarchical image coded stream.

The image encoding device 100 (FIG. 1) may be applied to the encoding unit 621 and the encoding unit 622 of the hierarchical image encoding device 620. In this case, the hierarchical image encoding device 620 sets a difference value between a quantization parameter set by the encoding unit 621 and a quantization parameter set by the encoding unit 622 and transmits the difference value.

In addition, the orthogonal transform skip processing may be independently performed on each layer in each of the encoding unit 621 and the encoding unit 622. In addition, the quantization processing, the deblocking filter processing or the like may be also independently performed on each layer in each of the encoding unit 621 and the encoding unit 622. In this case, the information such as the quantization matrix, various flags, and the weighting coefficient is included in, for example, the coded stream for each layer, and thus the information is supplied to the multiplexer 623 from the encoding unit 621 and the encoding unit 622. The supplied information is multiplexed in the multiplexer 623 and is then transmitted to the decoding side in a state of being included in the hierarchical image coded stream.

Further, with respect to some or the entire orthogonal transform skip processing, the quantization processing, and the deblocking filter processing, the processing of the encoding unit 621 and the encoding unit 622 may be reflected one another. Further, some or the entire information, such as the information on the skip of the orthogonal transform processing including the skip enable information or the skip identification information, the information on the quantization, and the information on the deblocking filter may be shared in the encoding unit 621 and the encoding unit 622. For example, some or all of processed results (or obtained information) obtained by performing the orthogonal transform skip processing, the quantization processing, and the deblocking filter processing on the base layer image in the encoding unit 621 may be supplied to the encoding unit 622 and may be reflected on such processing operations for the non-base layer image performed in the encoding unit 622 (for example, omission of duplicated processing). Naturally, on the contrary, processed results (or obtained information) obtained by performing the orthogonal transform skip processing, the quantization processing, and the deblocking filter processing on the non-base layer image in the encoding unit 622 may be supplied to the encoding unit 621 and may be reflected on such processing operations for the base layer image performed in the encoding unit 621 (for example, omission of duplicated processing).

[Hierarchical Image Decoding Device]

Figure 33:
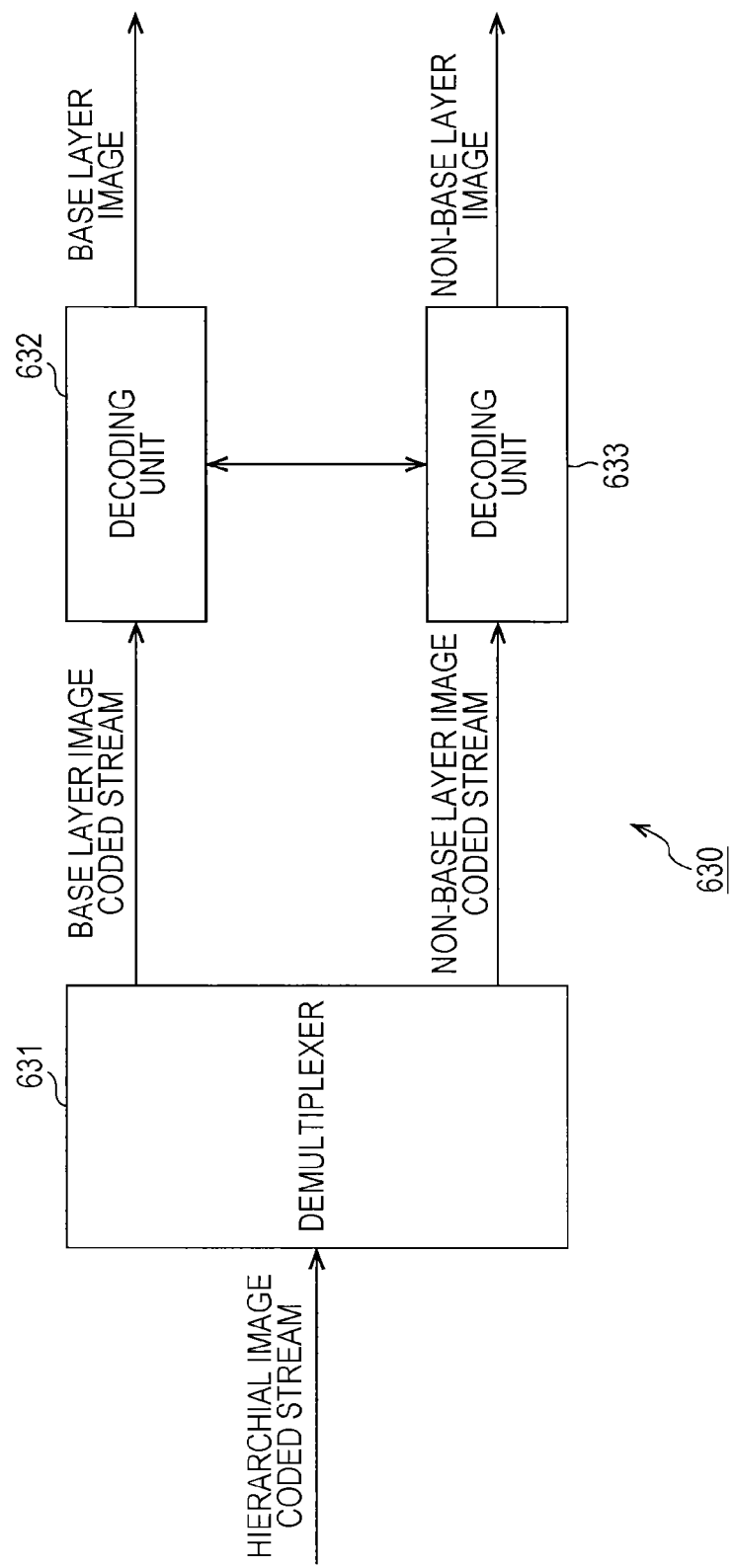
FIG. 33 a diagram illustrating an example of a main configuration of a hierarchical image decoding device to which the present technology is applied.

FIG. 33 is a diagram illustrating a hierarchical image decoding device for performing the above-described hierarchical image decoding. As illustrated in FIG. 33, a hierarchical image decoding device 630 includes a demultiplexer 631, a decoding unit 632, and a decoding unit 633.

The demultiplexer 631 demultiplexes a hierarchical image coded stream to which the base layer image coded stream and the non-base layer image coded stream are multiplexed and extracts the base layer image coded stream and the non-base layer image coded stream. The decoding unit 632 decodes the base layer image coded stream extracted by the demultiplexer 631 and obtains a base layer image. The decoding unit 633 decodes the non-base layer image coded stream extracted by the demultiplexer 631 and obtains a non-base layer image.

The image decoding device 200 (FIG. 19) may be applied to the decoding unit 632 and the decoding unit 633 of the hierarchical image decoding device 630. In this case, the decoding unit 632 and the decoding unit 633 of the hierarchical image decoding device 630 set a quantization parameter using a difference value between a quantization parameter set by the encoding unit 621 of the hierarchical image encoding device 620 and a quantization parameter set by the encoding unit 622 and perform an inverse quantization.

In addition, the orthogonal transform skip processing may be independently performed on each view in each of the decoding unit 632 and the decoding unit 633. In addition, the inverse quantization processing, the deblocking filter processing or the like may be also independently performed in the decoding unit 632 and the decoding unit 633. In this case, the information such as the quantization matrix, various flags, and the weighting coefficient included in the hierarchical image coded stream and transmitted from the coding side is separated in the demultiplexer 631 for each layer and is then supplied to the decoding unit 632 and the decoding unit 633 in a state of being included in the coded stream for each layer.

Further, with respect to some or the entire inverse orthogonal transform skip processing, the inverse quantization processing, and the deblocking filter processing, the processing, the decoding unit 632 and the decoding unit 633 may be reflected one another. Further, some or the entire information, such as the information on the skip of the inverse orthogonal transform processing including the skip enable information or the skip identification information, the information on the inverse quantization, and the information on the inverse deblocking filter may be shared in the decoding unit 632 and the decoding unit 633. For example, some or all of processed results (or obtained information or the like) obtained by performing the inverse orthogonal transform skip processing, the inverse quantization processing, and the deblocking filter processing on the base layer image coded stream in the decoding unit 632 may be supplied to the decoding unit 633 and may be reflected in such processing operations for the non-base layer image coded stream performed in the decoding unit 633 (for example, omission of duplicated processing). Naturally, on the contrary, processed results (or obtained information) obtained by performing the inverse orthogonal transform skip processing, the inverse quantization processing, and the deblocking filter processing on the non-base layer image coded stream in the decoding unit 633 may be supplied to the decoding unit 632 and may be reflected in such processing operations for the base view image coded stream performed in the decoding unit 632 (for example, omission of duplicated processing).

In addition, the present technology can be applied to image encoding devices and image decoding devices that are used for receiving image information (bit streams) compressed through orthogonal transforms such as discrete cosine transforms and motion compensation as in MPEG, H.26x or the like, for example, through a network media such as satellite broadcasting, cable TV, the Internet, or a mobile phone. Further, the present technology can also be applied to image encoding devices and image decoding devices that are used when the compressed image information is processed on a storage medium such as an optical or magnetic disk and a flash memory. Further, the present technology can also be applied to a quantization device or an inverse quantization device included in the image encoding device, the image decoding device and the like.

<6. Sixth Embodiment>

[Computer]

The above-described series of processing operations may be executed by hardware or executed by software. In a case where the series of processing operations are executed by the software, programs constituting the software are installed into a computer. Here, examples of the computer include a computer incorporated into dedicated hardware, a general-purpose personal computer capable of executing various functions by installing various kinds of programs, and so forth.

Figure 34:
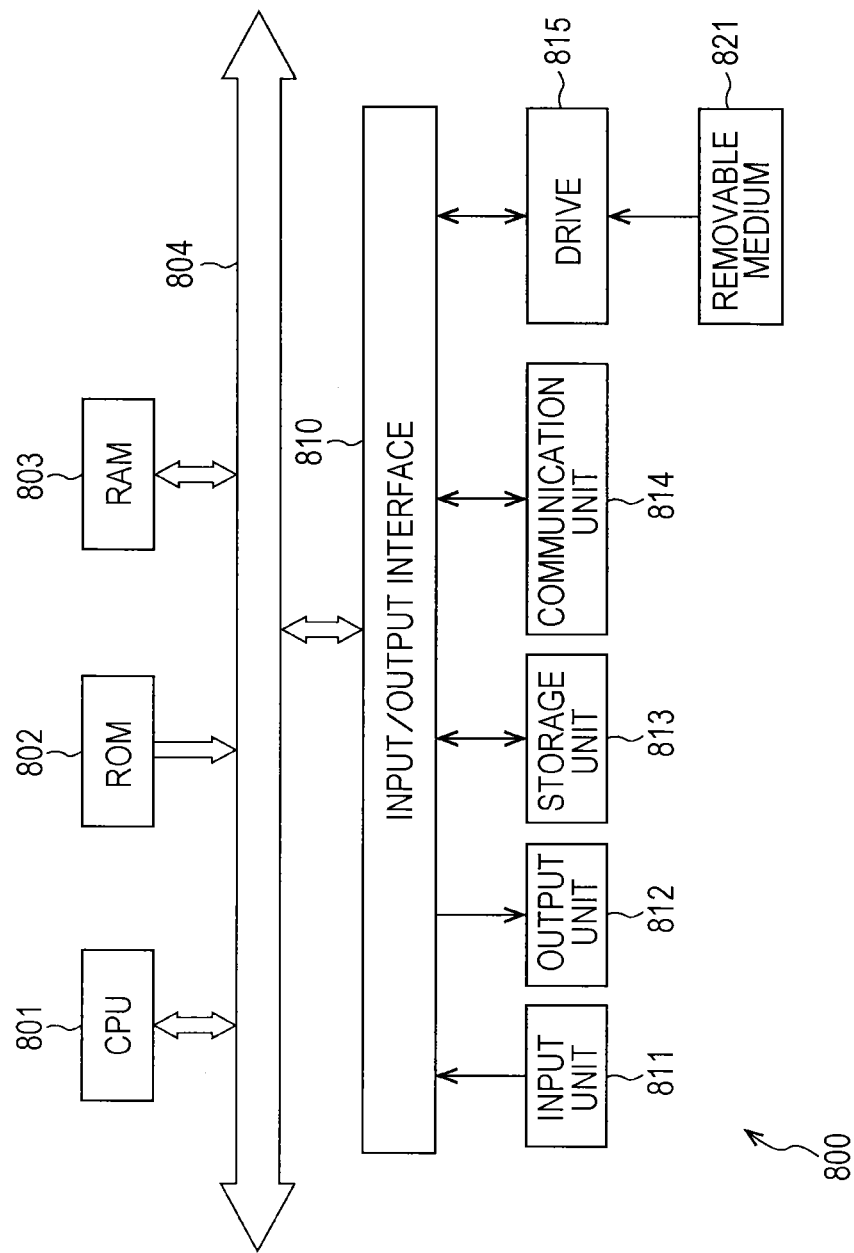
FIG. 34 is a block diagram illustrating an example of a main configuration of a computer.

FIG. 34 is a block diagram illustrating an example of a configuration of the hardware of the computer in which the above-described series of processing operations are executed by the programs.

In a computer 800 illustrated in FIG. 34, a central processing unit (CPU) 801, a read only memory (ROM) 802, and a random access memory (RAM) 803 are connected to one another through a bus 804.

An input/output interface 810 is also connected to the bus 804. The input/output interface 810 is connected to an input unit 811, an output unit 812, a storage unit 813, a communication unit 814, and a drive 815.

The input unit 811 includes a keyboard, a mouse, a microphone, a touch panel, an input terminal and the like. The output unit 812 includes, for example, a display, a speaker, an output terminal and the like. The storage unit 813 includes, for example, a hard disk, a RAM disk, a non-volatile memory and the like. The communication unit 814 includes, for example, a network interface. The drive 815 drives a removable medium 821 such as a magnetic disk, an optical disk, a magneto-optical disk, or a semiconductor memory.

In the computer having the configuration described above, the CPU 801 may load and execute, for example, the programs stored in the storage unit 813 into the RAM 803 through the input/output interface 810 and the bus 804, thereby performing the series of processing operations described above. Necessary data and the like for the CPU 801 to execute various kinds of processing operations are also appropriately stored in the RAM 803.

The programs executed by the computer (or CPU 801) may be applied by being recorded in, for example, the removable medium 821, which may be used as a package medium or the like. In addition, the programs may be provided through a wired or wireless transmission medium such as a local area network, the Internet, or digital satellite broadcasting.

In the computer, the programs may be installed into the storage unit 813 through the input/output interface 810 in response to the attaching of the removable medium 821 to the drive 815. The programs may also be received by the communication unit 814 through the wired or wireless transmission medium and may be installed into the storage unit 813. Alternatively, the programs may be installed into the ROM 802 or the storage unit 813 in advance.

Further, the programs to be executed by the computer may be processed in chronological order explained herein, or in a parallel manner, or on demand such as when they are called.

Further, in this specification, the steps for describing the programs to be recorded in the recoding medium include not only processing operations which are performed in chronological order disclosed herein, but also processing operations which are executed in a parallel manner or individually if it is not necessarily performed over time.

In addition, in this specification, a system represents a collection of a plurality of component elements (devices, modules (components), and like), and all component elements need not be arranged in the same housing. Therefore, a plurality of devices accommodated in different housings and interconnected through a network is a system; and one device in which a plurality of modules is accommodated in a single housing is a system as well.

Also, in the above described examples, any configuration described as one device (or one processing unit) may be divided into a plurality of devices (or processing units). Conversely, any configuration described as a plurality of devices (or processing units) may be combined to form one device (or one processing unit). Moreover, any configuration other than the configuration described above may be naturally added to the configuration of each of the devices (or each of the processing units). Further, a part of the configuration of one device (or one processing unit) may be included in a configuration of other device (or other processing unit) as long as the configuration or operation as the entire system is substantially the same.

The preferred embodiments of the present disclosure has been described in detail with reference to the appended drawings, but the technical scope of the present disclosure is not limited to the above examples. It should be understood by those skilled in the art that various modifications or alterations may occur within the scope of the technical spirit described in claims and they are within the technical scope of the present invention.

For example, the present technology can adopt a configuration of cloud computing in which one function is cooperatively processed in a sharing fashion by a plurality of devices through a network.

Further, each step described in the above-described flowcharts can be executed not only by one device but also by a plurality of devices in a sharing fashion.

In addition, if one step includes a plurality of processing operations, the plurality of processing operations included in the one step can be executed not only by one device but also by a plurality of devices in a sharing fashion.

The image encoding device and the image decoding device according to the above embodiments can be applicable to various electronic devices such as a transmitter or a receiver for satellite broadcasting, wired broadcasting such as a cable TV, distribution through the Internet and distribution to a terminal by way of cellular communication, a recording device which records images in a medium such as an optical disk, a magnetic disk and flash memory, and a reproducing device which reproduces images from these storage media. Four application examples will be described below.

<7. Seventh Embodiment>

[First Application Example: Television Receiver]

Figure 35:
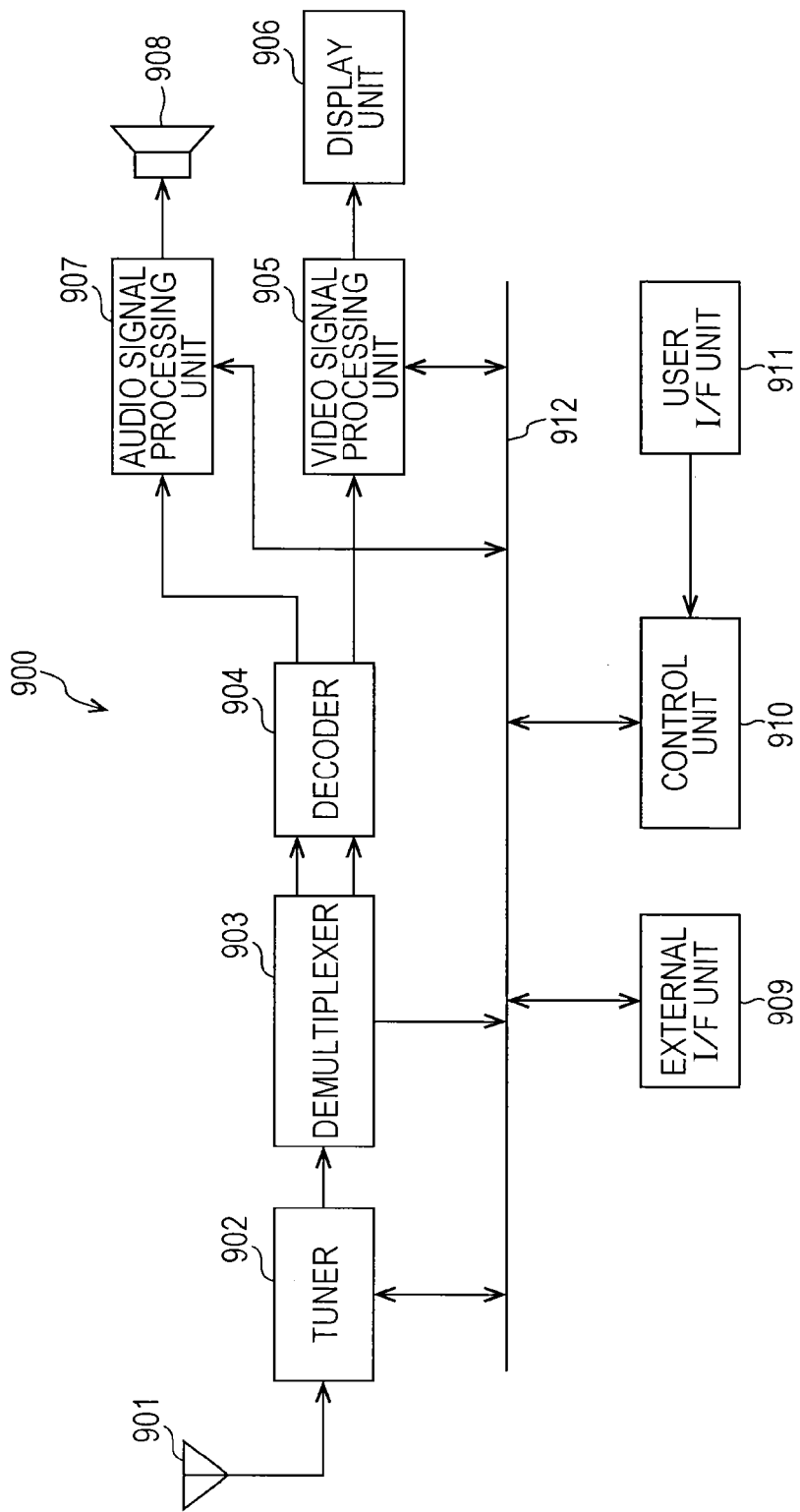
FIG. 35 is a block diagram illustrating an example a schematic configuration of a television apparatus.

FIG. 35 illustrates an example of a schematic configuration of a television apparatus to which the above-described embodiment is applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a desired channel signal from broadcast signals received through the antenna 901, and demodulates the extracted signal. The tuner 902 outputs the encoded bit stream obtained by demodulation to the demultiplexer 903. That is, the tuner 902 plays a role of a transmission unit of the television apparatus 900 which receives a coded stream obtained by encoding an image.

The demultiplexer 903 separates a video stream and an audio stream of a viewing target program from the encoded bit stream, and outputs each of the separated streams to the decoder 904. Further, the demultiplexer 903 extracts auxiliary data such as an electronic program guide (EPG) from the encoded bit stream, and supplies the extracted data to the control unit 910. In addition, the demultiplexer 903 may perform descrambling when the encoded bit stream is scrambled.

The decoder 904 decodes the video stream and the audio stream input from the demultiplexer 903. Further, the decoder 904 outputs video data, which is generated by a decoding process, to the video signal processing unit 905. Furthermore, the decoder 904 outputs audio data, which is generated by a decoding process, to the audio signal processing unit 907.

The video signal processing unit 905 reproduces the video data input from the decoder 904, and displays a video image on the display unit 906. Further, the video signal processing unit 905 may display on the display unit 906 an application screen supplied through a network. Furthermore, the video signal processing unit 905 may perform an additional processing operation such as, for example, noise removal on the video data according to the setting. Further, the video signal processing unit 905 may generate an image of a graphical user interface (GUI) image such as, for example, a menu, buttons, a cursor, and superimpose the generated image on an output image.

The display unit 906 is driven by a drive signal supplied from the video signal processing unit 905, and displays a video image or an image on a video displaying surface of a display device (for example, a liquid crystal display, a plasma display, or an organic electroluminescence display (GELD) (organic EL display)).

The audio signal processing unit 907 performs a reproducing operation such as a D/A conversion and amplification on the audio data input from the decoder 904, and outputs an audio from the speaker 908. Further, the audio signal processing unit 907 may perform an additional processing operation such as noise removal on the audio data.

The external interface 909 is an interface which is configured to connect the television apparatus 900 and an external device or the network to each other. For example, a video stream or an audio stream received through the external interface 909 may be decoded by the decoder 904. That is, the external interface 909 also plays a role of a transmission unit in the television apparatus 900 which receives coded streams of encoded images.

The control unit 910 has a processor such as a CPU and a memory such as RAM and ROM. The memory stores programs to be executed by the CPU, program data, EPG data, and data acquired through the network. The program stored in the memory is read and executed by the CPU at the time of activation of the television apparatus 900. By executing the program, the CPU controls the operation of the television apparatus 900 according to, for example, an operation signal input from the user interface 911.

The user interface 911 is connected to the control unit 910. The user interface 911 has, for example, buttons and switches which a user uses to operate the television apparatus 900, and a reception unit which receives a remote control signal. The user interface 911 detects a user's operation through these components, generates an operation signal, and outputs the generated operation signal to the control unit 910.

The bus 912 is configured to connect the tuner 902, the demultiplexer 903, the decoder 904, the video signal processing unit 905, the audio signal processing unit 907, the external interface 909, and the control unit 910 to each other.

In the television apparatus 900 having this configuration, the decoder 904 has a function of the image decoding device according to the above embodiments. Consequently, when decoding of an image in the television apparatus 900, it is possible to achieve the suppression of the reduction of the encoding efficiency and to achieve the suppression of the deterioration of the image quality due to the encoding/decoding.

[Second Application Example: Mobile Phone]

Figure 36:
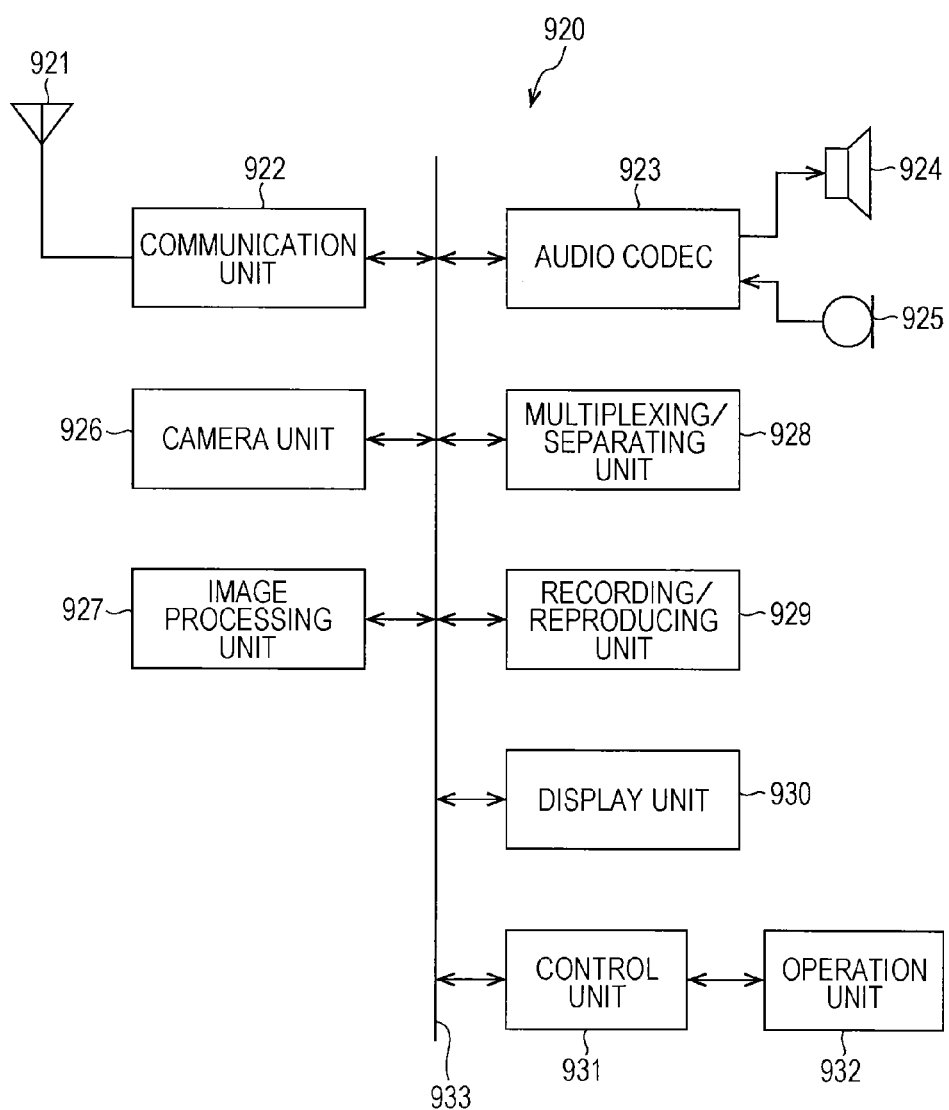
FIG. 36 is a block diagram illustrating an example of a schematic configuration of a mobile phone.

FIG. 36 illustrates an example of a schematic configuration of a cellular phone to which above embodiments are applied. A mobile phone 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 is configured to connect the communication unit 922, the audio codec 923, the camera unit 926, the image processing unit 927, the multiplexing/separating unit 928, the recording/reproducing unit 929, the display unit 930, and the control unit 931 to each other.

The mobile phone 920 performs various operations such as transmission and reception of audio signals, transmission and reception of electronic mail and image data, image capturing, and data recording, in various kinds of modes such as an audio communication mode, a data communication mode, a photographing mode, and a video phone mode.

In the audio communication mode, an analog audio signal generated at the microphone 925 is supplied to the audio codec 923. The audio codec 923 converts an analog audio signal into audio data, and performs an A/D conversion on and compresses the converted audio data. Further, the audio codec 923 outputs the compressed audio data to the communication unit 922. The communication unit 922 encodes and modulates the audio data and generates a transmission signal. Further, the communication unit 922 transmits the generated transmission signal to a base station (not illustrated) through the antenna 921. Furthermore, the communication unit 922 amplifies and performs a frequency conversion on a radio signal received through the antenna 921, and obtains the received signal. Still further, the communication unit 922 demodulates and decodes the received signal, generates audio data, and outputs the generated audio data to the audio codec 923. The audio codec 923 decompresses the audio data and performs a D/A conversion on the audio data, and generates an analog audio signal. Further, the audio codec 923 supplies the generated audio signal to the speaker 924 and outputs an audio.

Furthermore, in the data communication mode, for example, the control unit 931 generates text data which constitutes an electronic mail according to a user's operation through the operation unit 932. Further, the control unit 931 displays a text on the display unit 930. Moreover, the control unit 931 generates electronic mail data according to transmission instruction from the user through the operation unit 932, and outputs the generated electronic mail data to the communication unit 922. The communication unit 922 encodes and modulates the electronic mail data and generates a transmission signal. Further, the communication unit 922 transmits the generated transmission signal to a base station (not illustrated) through the antenna 921. Furthermore, the communication unit 922 amplifies and performs a frequency conversion on a radio signal received through the antenna 921, and acquires the received signal. Still further, the communication unit 922 demodulates and decodes the received signal, restores electronic mail data, and outputs the restored electronic mail data to the control unit 931. The control unit 931 displays the content of the electronic mail on the display unit 930, and supplies the electronic mail data to recording/reproducing unit 929 to allow the data to be written it in the storage medium.

The recording/reproducing unit 929 has an arbitrary readable/writable storage medium. For example, the storage medium may be a built-in storage medium such as RAM or flash memory, and may be a storage medium which is an externally attaching type such as a hard disk, a magnetic disk, a magneto-optical disk, an optical disk, an unallocated space bitmap (USB) memory, or a memory card.

Further, in the photographing mode, for example, the camera unit 926 captures an image of an object, generates image data, and outputs the generated image data to the image processing unit 927. The image processing unit 927 encodes the image data input from the camera unit 926, and supplies the coded stream to recording/reproducing unit 929 to allow the stream to be written it in the storage medium. Moreover, in an image display mode, the recording/reproducing unit 929 reads the coded stream stored in the storage medium and outputs it to the image processing unit 927. The image processing unit 927 decodes the coded stream input from the recording/reproducing unit 929 and supplies the image data to the display unit 930 to display the image thereon.

Further, in the video phone mode, for example, the multiplexing/separating unit 928 multiplexes the video stream encoded by the image processing unit 927 and the audio stream input from the audio codec 923, and outputs the multiplexed stream to the communication unit 922. The communication unit 922 encodes and modulates the stream, and generates a transmission signal. Further, the communication unit 922 transmits the generated transmission signal to a base station (not illustrated) through the antenna 921. Furthermore, the communication unit 922 amplifies and performs a frequency conversion on a radio signal received through the antenna 921, and acquires the received signal. These transmission signal and received signal may include encoded bit streams. Further, the communication unit 922 demodulates and decodes the received signal, restores the stream, and outputs the restored stream to the multiplexing/separating unit 928. The multiplexing/separating unit 928 separates the video stream and the audio stream from the input stream, and outputs the video stream to the image processing unit 927 and the audio stream to the audio codec 923. The image processing unit 927 decodes the video stream and generates the video data. The video data is supplied to the display unit 930, and the display unit 930 displays a series of images. The audio codec 923 decompresses and performs a D/A conversion on the audio stream, and generates an analog audio signal. Further, the audio codec 923 supplies the generated audio signal to the speaker 924 and outputs an audio.

In the mobile phone 920 having the above configuration, the image processing unit 927 has functions of the image encoding device and the image decoding device according to the above embodiments. Consequently, when encoding and decoding of an image in the mobile phone 920, it is possible to suppress the reduction of the encoding efficiency and to suppress the deterioration of the image quality due to the encoding/decoding.

[Third Application Example: Recording and Reproducing Device]

Figure 37:
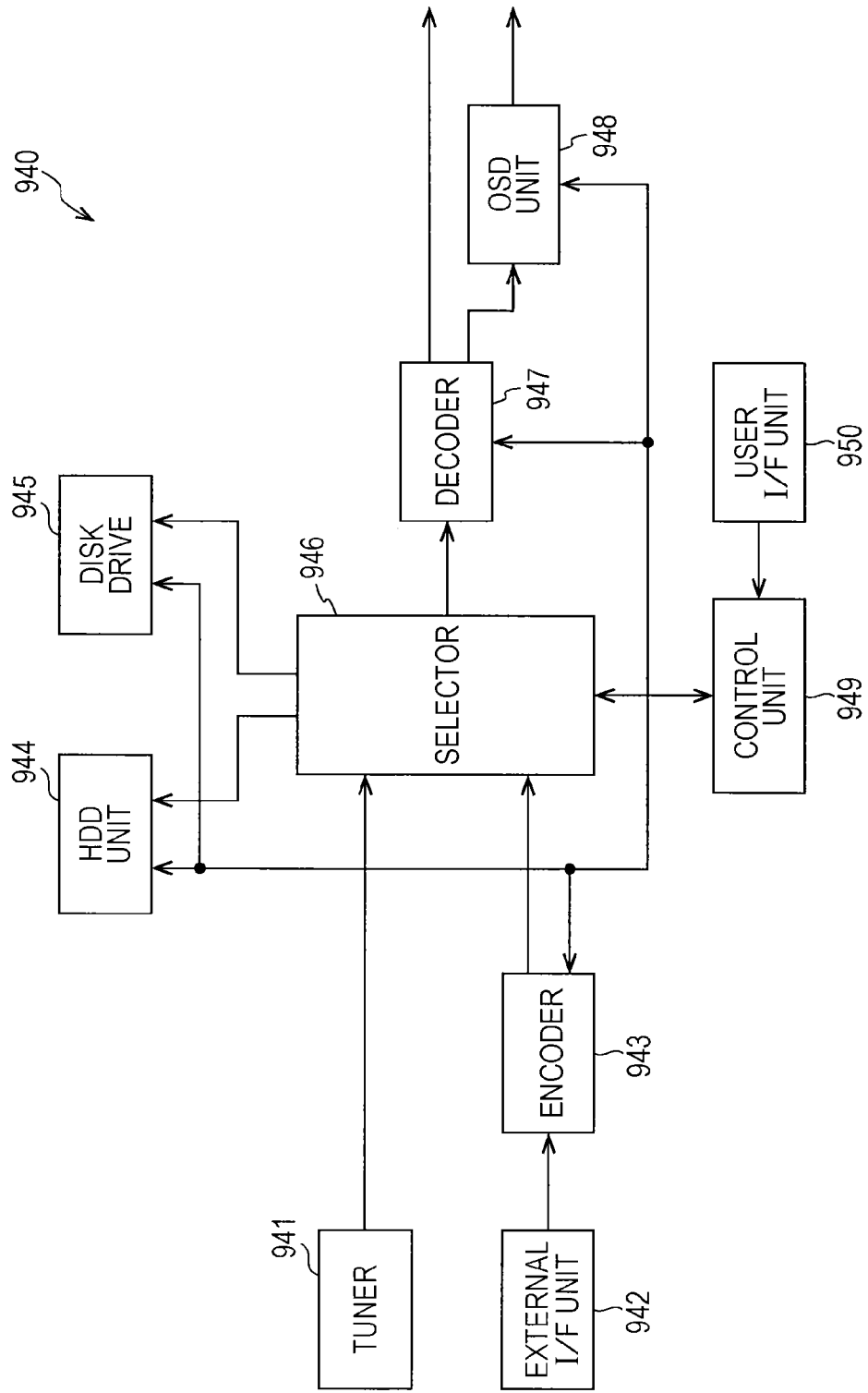
FIG. 37 is a block diagram illustrating an example of a schematic configuration of a recording and reproducing device.

FIG. 37 illustrates an example of a schematic configuration of a recording and reproducing device to which above embodiments are applied. A recording and reproducing device 940 encodes, for example, audio data and video data of the received broadcast program and records the data in the recording medium. Further, the recording and reproducing device 940 may encode, for example, audio data and video data acquired from another device and record the data in the recording medium. Furthermore, the recording and reproducing device 940 reproduces data recorded in the recording medium on a monitor and a speaker according to, for example, user's instruction. At this time, the recording and reproducing device 940 decodes the audio data and the video data.

The recording and reproducing device 940 includes a tuner 941, an external interface 942, an encoder 943, a hard disk drive (HDD) unit 944, a disk drive 945, a selector 946, a decoder 947, an on-screen display (OSD) 948, a control unit 949, and a user interface 950.

The tuner 941 extracts a desired channel signal from broadcast signals received through an antenna (not illustrated), and demodulates the extracted signal. Further, the tuner 941 outputs an encoded bit stream, which is obtained by demodulation, to the selector 946. That is, the tuner 941 plays a role of a transmission unit in the recording and reproducing device 940.

The external interface 942 is an interface which connects the recording and reproducing device 940 and an external device or the network to each other. The external interface 942 may be an IEEE1394 interface, a network interface, an USB interface, flash memory interface, and the like. For example, the video data and the audio data received through the external interface 942 are input to the encoder 943. That is, the external interface 942 plays a role of a transmission unit in the recording and reproducing device 940.

When the video data and the audio data input from the external interface 942 are not encoded, the encoder 943 encodes the video data and the audio data. Further, the encoder 943 outputs an encoded bit stream to the selector 946.

The HDD 944 records encoded bit streams obtained by compressing content data such as video and audio, various programs, and other data in an internal hard disk. Further, the HDD 944 reads out these types of data from the hard disk at the time of reproduction of a video and an audio.

The disk drive 945 records and reads out data in and from an attached recording medium. A recording medium attached to the disk drive 945 may be, for example, a DVD disk (such as DVD-Video, DVD-RAM, DVD-R, DVD-RW, DVD+R, and DVD+RW) or a Blu-ray (registered trademark) disk.

At the time of video and audio recording, the selector 946 selects an encoded bit stream input from the tuner 941 or the encoder 943 and outputs the selected encoded bit stream to the HDD 944 or the disk drive 945. Further, the selector 946 outputs an encoded bit stream input from the HDD 944 or the disk drive 945 to the decoder 947 at the time of video and audio reproduction.

The decoder 947 decodes the encoded bit stream and generates video data and audio data. Further, the decoder 947 outputs the generated video data to the OSD 948. Furthermore, the decoder 904 outputs the generated audio data to an external speaker.

The OSD 948 reproduces video data input from the decoder 947 and displays a video image. Further, the OSD 948 may superimpose a GUI image such as a menu, buttons or a cursor on the video image to be displayed.

The control unit 949 has a processor such as a CPU, and a memory such as RAM and ROM. The memory stores programs to be executed by the CPU, and program data. The program stored in the memory is read and executed by the CPU, for example, at the time of activation of the recording and reproducing device 940. By executing the program, the CPU controls the operation of the recording and reproducing device 940 according to, for example, an operation signal input from the user interface 950.

The user interface 950 is connected to the control unit 949. The user interface 950 has, for example, buttons and switches which are used to operate the recording and reproducing device 940 by a user, and a reception unit which receives a remote control signal. The user interface 950 detects a user's operation through these components, generates an operation signal, and outputs the generated operation signal to the control unit 949.

In the recording and reproducing device 940 having the above configuration, the encoder 943 has a function of the image encoding device according to the above embodiments. Further, the decoder 947 has a function of the image decoding device according to the above embodiments. Consequently, when encoding and decoding of an image in the recording and reproducing device 940, it is possible to suppress the reduction of the encoding efficiency and to suppress the deterioration of the image quality due to the encoding/decoding.

[Fourth Application Example: Imaging Device]

Figure 38:
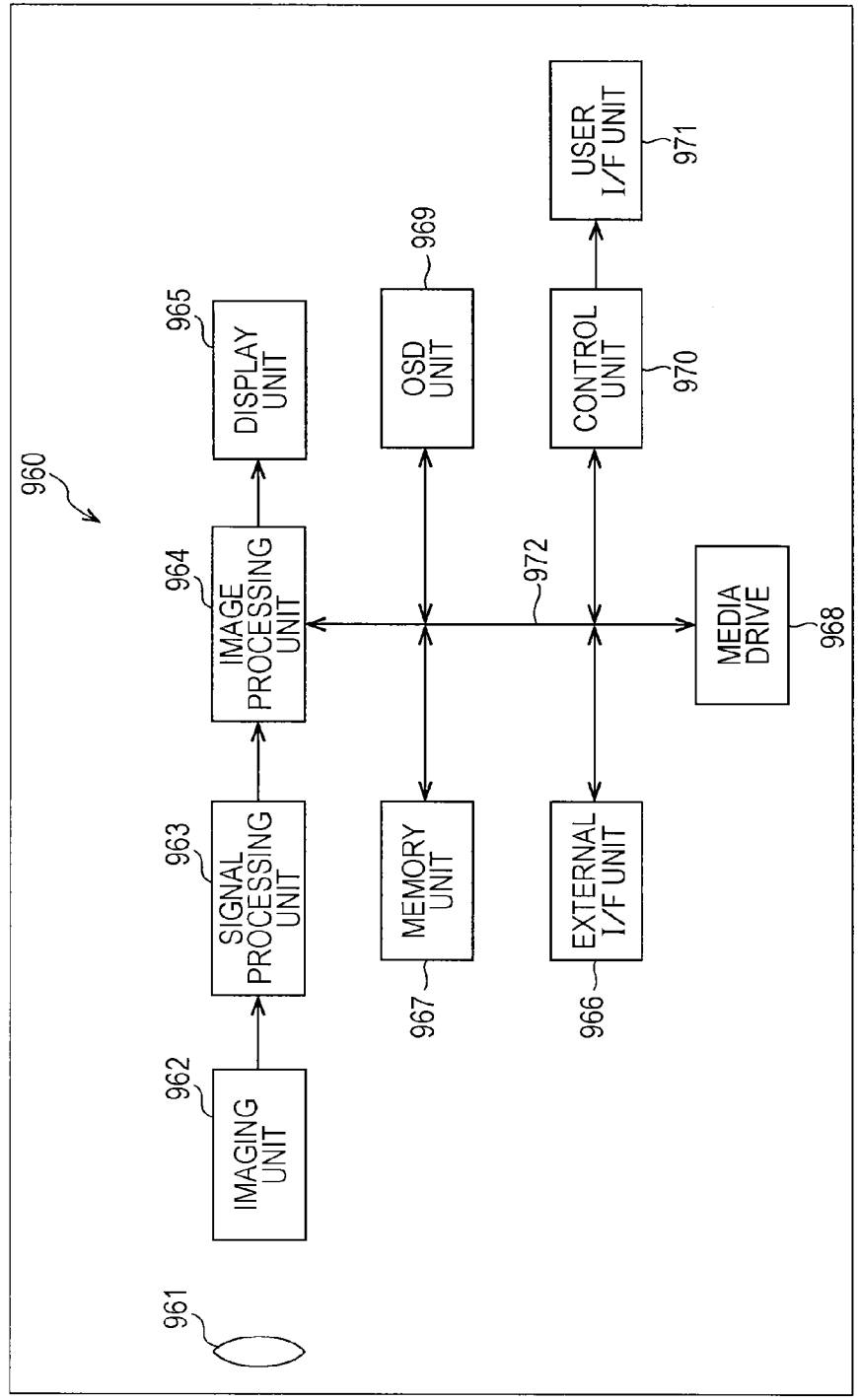
FIG. 38 is a block diagram illustrating an example of a schematic configuration of an imaging device.

FIG. 38 illustrates an example of a schematic configuration of an imaging device to which the above embodiments are applied. An imaging device 960 captures an image of an object, generates an image, encodes image data, and records the image data in a recording medium.

The imaging device 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to an imaging unit 962. The imaging unit 962 is connected to the signal processing unit 963. The display unit 965 is connected to the image processing unit 964. The user interface 971 is connected to the control unit 970. The bus 972 is configured to connect the image processing unit 964, the external interface 966, the memory 967, the media drive 968, the OSD 969, and the control unit 970 to each other.

The optical block 961 has a focus lens, a diaphragm, and the like. The optical block 961 forms an optical image of an object on the imaging surface of the imaging unit 962. The imaging unit 962 has an image sensor such as a charge coupled device (CCD) or a complementary metal oxide semiconductor (CMOS) and converts the optical image formed on the imaging surface into an image signal as an electric signal by photoelectric conversion. Further, the imaging unit 962 outputs the image signal to the signal processing unit 963.

The signal processing unit 963 performs various kinds of camera signal processing operations such as a knee correction, a gamma correction, and a color correction on the image signal input from the imaging unit 962. The signal processing unit 963 outputs image data, in which the camera signal processing operation is performed, to the image processing unit 964.

The image processing unit 964 encodes the image data input from the signal processing unit 963 and generates the coded data. Further, the image processing unit 964 outputs the generated coded data to the external interface 966 or the media drive 968. Furthermore, the image processing unit 964 decodes the coded data input from the external interface 966 or the media drive 968 and generates image data. Still further, the image processing unit 964 outputs the generated image data to the display unit 965. Moreover, the image processing unit 964 may output the image data input from the signal processing unit 963 to the display unit 965 and display an image. Further, the image processing unit 964 may superimpose displaying data acquired from the OSD 969, on the image to be output to the display unit 965.

The OSD 969 generates a GUI image such as a menu, buttons or a cursor, and outputs the generated image to the image processing unit 964.

The external interface 966 is configured as, for example, a USB input/output terminal. The external interface 966 connects the imaging device 960 and a printer to each other, for example, at the time of printing of an image. Further, the external interface 966 is connected with a drive if necessary. The drive is attached with a removable medium such as a magnetic disk or an optical disk, and the program read from the removable medium can be installed in the imaging device 960. Further, the external interface 966 may be configured as a network interface connected to a network such as a LAN or the Internet. That is, the external interface 966 plays a role of a transmission unit in the imaging device 960.

A recording medium attached to the media drive 968 may be a readable/rewritable removable medium such as a magnetic disk, a magneto-optical disk, an optical disk, or a semiconductor memory. Further, a recording medium is fixedly attached to the media drive 968, and, for example, a non-portable storage unit such as a built-in hard disk drive or a solid state drive (SSD) may be configured.

The control unit 970 has a processor such as a CPU, and a memory such as RAM and ROM. The memory stores programs to be executed by the CPU, and program data. The program stored in the memory is read and executed by the CPU, for example, at the time of activation of the imaging device 960. By executing the program, the CPU controls the operation of the imaging device 960 according to, for example, an operation signal input from the user interface 971.

The user interface 971 is connected to the control unit 970. The user interface 971 has, for example, buttons and switches which are used to operate the imaging device 960 by a user. The user interface 971 detects a user's operation through these components, generates an operation signal, and outputs the generated operation signal to the control unit 970.

In the imaging device 960 having the above configuration, the image processing unit 964 has functions of the image encoding device and the image decoding device according to the above embodiments. Consequently, when encoding and decoding of an image in the imaging device 960, it is possible to suppress the reduction of the encoding efficiency and to suppress the deterioration of the image quality due to the encoding/decoding.

<8. Eighth Embodiment>

[Application Example of Scalable Encoding: First System]

Next, a specific example of use of scalable coded data which has been subjected to scalable encoding (or hierarchical (image) encoding) will be described. The scalable encoding may be used for, for example, a selection of data to be transmitted, as in an example illustrated in FIG. 39.

Figure 39:
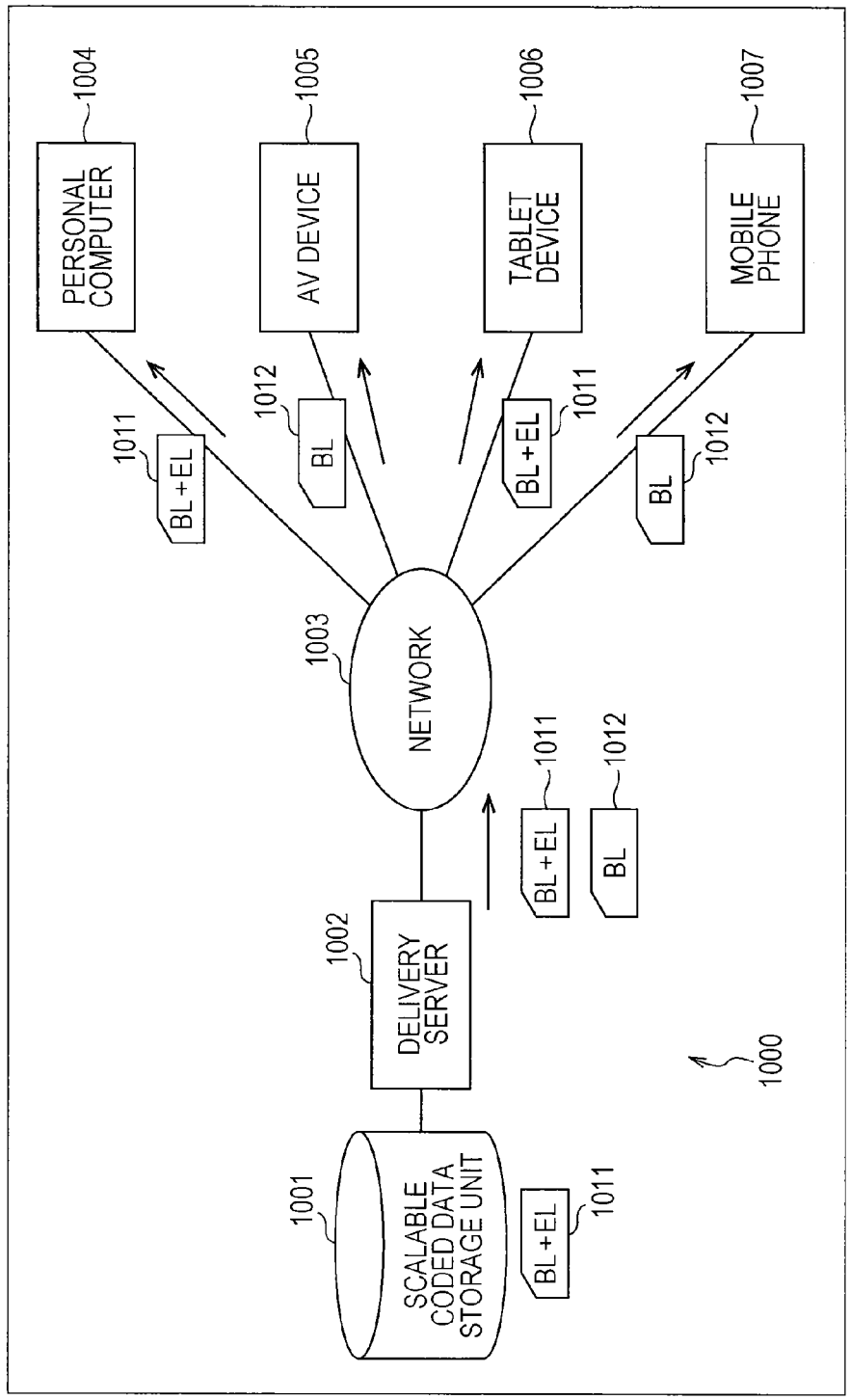
FIG. 39 is a block diagram illustrating an example of scalable encoding utilization.

In a data transmission system 1000 illustrated in FIG. 39, a distribution server 1002 reads out scalable coded data stored in a scalable coded data storage unit 1001 and distributes the scalable coded data to terminal devices, such as a personal computer 1004, an AV device 1005, a tablet device 1006, and a mobile phone 1007, through a network 1003.

At this time, the distribution server 1002 selects coded data having appropriate quality in accordance with the performance of the terminal device and the communication environment, and transmits the selected coded data. Even if the distribution server 1002 transmits data having quality higher than necessary, the terminal device may not necessarily obtain a high-quality image, and may cause delay or overflow. In addition, such data may occupy communication bandwidth more than necessary, or may increase the load on the terminal device more than necessary. Conversely, even if the distribution server 1002 transmits data having quality lower than necessary, the terminal device may not obtain an image with a sufficient quality in the device. Thus, the distribution server 1002 reads out the scalable coded data stored in the scalable coded data storage unit 1001, if necessary, as coded data having quality appropriate for certain conditions such as the performance of the terminal device and communication environment, and transmits the read coded data.

For example, the scalable coded data storage unit 1001 stores scalable coded data (BL+EL) 1011 which has been subjected to scalable encoding. The scalable coded data (BL+EL) 1011 is coded data including both a base layer and an enhancement layer and is data which is decoded to obtain both base layer images and enhancement layer images.

The distribution server 1002 selects an appropriate layer in accordance with the performance of the terminal device which transmits data and the communication environment, and reads out the data of the layer. For example, the distribution server 1002 reads out high-quality scalable coded data (BL+EL) 1011 from the scalable coded data storage unit 1001 and transmits the read scalable coded data as it is to the personal computer 1004 or the tablet device 1006 which has high processing capabilities. In contrast, for example, the distribution server 1002 extracts the data of the base layer from the scalable coded data (BL+EL) 1011 and transmits the extracted data of the base layer to the AV device 1005 or the mobile phone 1007 which has low processing capabilities, as scalable coded data (BL) 1012 having the same content as the scalable coded data (BL+EL) 1011 and having lower quality than the scalable coded data (BL+EL) 1011.

In this manner, the use of scalable coded data can facilitate the adjustment of the amount of data, thereby suppressing the occurrence of delay or overflow and suppressing an unnecessary increase in the load on the terminal device or the communication medium. In addition, since the scalable coded data (BL+EL) 1011 has reduced redundancy between layers, it is possible to reduce the amount of data compared to a case of having individually coded data of the respective layers. Therefore, the storage area of the scalable coded data storage unit 1001 can be more efficiently utilized.

Further, since various devices such as the personal computer 1004 and the mobile phone 1007 may be applied to the terminal device, hardware performance of the terminal device may be device-dependent. In addition, since various applications are also executable by the terminal device, software capabilities of the applications may vary. Furthermore, the network 1003 serving as a communication medium may be adopted as any communication line network which can be wired, wireless, or both, such as the Internet or a local area network (LAN), and have various data transmission capabilities. Moreover, such performance and capabilities may vary with other communication and the like.

Therefore, before the start of transmission of data, the distribution server 1002 may communicate with a terminal device to which the data is to be transmitted, and may obtain information concerning the capabilities of the terminal device, such as the hardware performance of the terminal device or the performance of application (software) executed by the terminal device, and also information concerning the communication environment, such as the available bandwidth of the network 1003. Then, the distribution server 1002 may select an appropriate layer on the basis of the obtained information.

The extraction of a layer may be performed by a terminal device. For example, the personal computer 1004 may decode the transmitted scalable coded data (BL+EL) 1011 and display a base layer image or an enhancement layer image. Alternatively, for example, the personal computer 1004 may extract the scalable coded data (BL) 1012 of the base layer from the transmitted scalable coded data (BL+EL) 1011, store the extracted scalable coded data or transmit the data to another device, or decode the data to display the base layer image.

Naturally, the number of scalable coded data storage units 1001, the number of distribution servers 1002, the number of networks 1003, and the number of terminal devices are arbitrary. In addition, while an example in which the distribution server 1002 transmits data to the terminal device is described above, application examples are not limited thereto. The data transmission system 1000 can be applied to any system as long as the system selects and transmits an appropriate layer, when transmitting coded data which has been subjected to the scalable encoding to the terminal device, in accordance with certain conditions such as the capabilities of the terminal device and the communication environment.

The same effects as those described above with reference to FIGS. 1 to 31 can be obtained by applying the same technology as in the application to the hierarchical encoding/hierarchical decoding described above with reference to FIGS. 1 to 31 in the data transmission system 1000 illustrated in FIG. 39.

[Application Example of Scalable Encoding: Second System]

Figure 40:
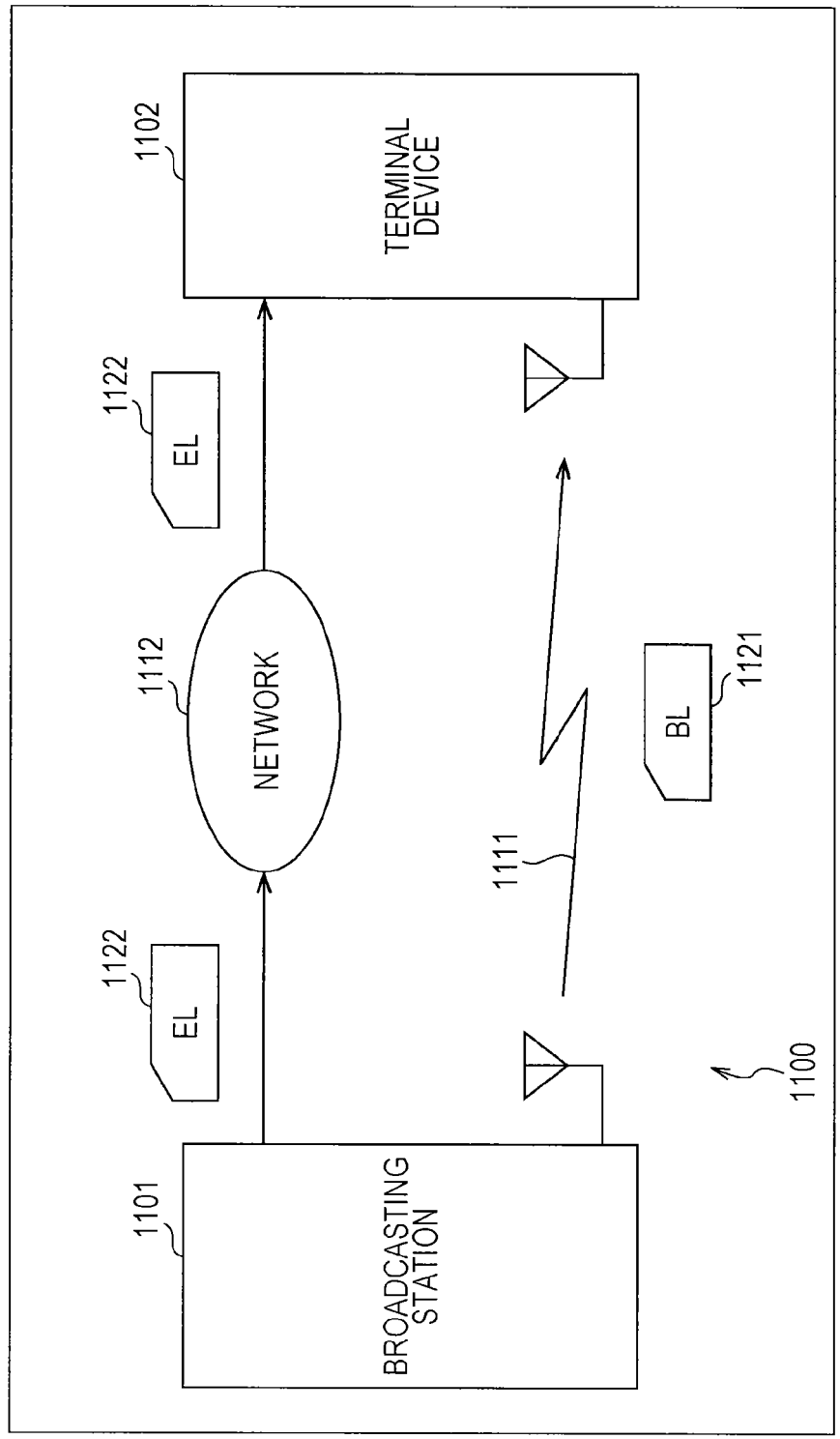
FIG. 40 is a block diagram illustrating another example of the scalable encoding utilization.

Scalable encoding may also be used for transmission through a plurality of communication media, as in an example illustrated in, for example, FIG. 40.

In a data transmission system 1100 illustrated in FIG. 40, a broadcasting station 1101 transmits scalable coded data (BL) 1121 of a base layer through terrestrial broadcasting 1111. In addition, the broadcasting station 1101 transmits scalable coded data (EL) 1122 of the enhancement layer through an arbitrary network 1112, which is configured by a wired communication network, a wireless communication network, or both the wired and wireless communication networks (for example, the data is packetized and transmitted).

A terminal device 1102 has a function of receiving the terrestrial broadcasting 1111 which is broadcasted by the broadcasting station 1101 and receives the scalable coded data (BL) 1121 of the base layer transmitted through the terrestrial broadcasting 1111. The terminal device 1102 further has a communication function for performing communication through the network 1112 and receives the scalable coded data (EL) 1122 of the enhancement layer transmitted through the network 1112.

The terminal device 1102, for example, in accordance with a user's instruction or the like, acquires an image of the base layer by decoding the scalable coded data (BL) 1121 of the base layer that is acquired through the terrestrial broadcasting 1111, stores the acquired scalable coded data, or transmits the acquired data to another device.

In addition, the terminal device 1102, for example, in accordance with a user's instruction, composes the scalable coded data (BL) 1121 of the base layer that is acquired through the terrestrial broadcasting 1111 and the scalable coded data (EL) 1122 of the enhancement layer that is acquired through the network 1112 so as to acquire the scalable coded data (BL+EL), decodes the scalable coded data so as to acquire or store an image of the enhancement layer, or transmits the scalable coded data to another device.

As described above, the scalable coded data may be transmitted through, for example, a communication medium different for each layer. Thus, the load can be distributed, and the occurrence of a delay or an overflow can be suppressed.

In addition, depending on the situation, the communication medium that is used for the transmission may be configured to be selectable for each layer. For example, it may be configured such that the scalable coded data (BL) 1121 of the base layer of which the data amount is relatively large is transmitted through a communication medium having a wide bandwidth, and the scalable coded data (EL) 1122 of the enhancement layer of which the data amount is relatively small is transmitted through a communication medium having a narrow bandwidth. In addition, for example, the communication medium through which the scalable coded data (EL) 1122 of the enhancement layer is transmitted may be configured to be switched between the network 1112 and the terrestrial broadcasting 1111 in accordance with the usable bandwidth of the network 1112. This similarly applies to the data of an arbitrary layer.

By controlling as such, an increase in the load for the data transmission can be further suppressed.

Here, the number of layers is arbitrary, and the number of communication media used for the transmission is also arbitrary. In addition, the number of the terminal devices 1102 that are the data delivery destination is arbitrary as well. Furthermore, while, in the description presented above, the example has been described in which broadcasting is performed from the broadcasting station 1101, the example of the use is not limited thereto. The data transmission system 1100 may be applied to an arbitrary system as long as the system divides coded data which is coded in a scalable coded manner into a plurality of parts in units of layers and transmits the divided data through a plurality of lines.

Then, even in the data transmission system 1100 illustrated in FIG. 40, it is possible to obtain effects similar to those described above with reference to FIGS. 1 to 31 by applying the present technology in the same manner as the application to the hierarchical encode/hierarchical decoding described above with reference to FIGS. 1 to 31.

[Application Example of Scalable Encoding: Third System]

Figure 41:
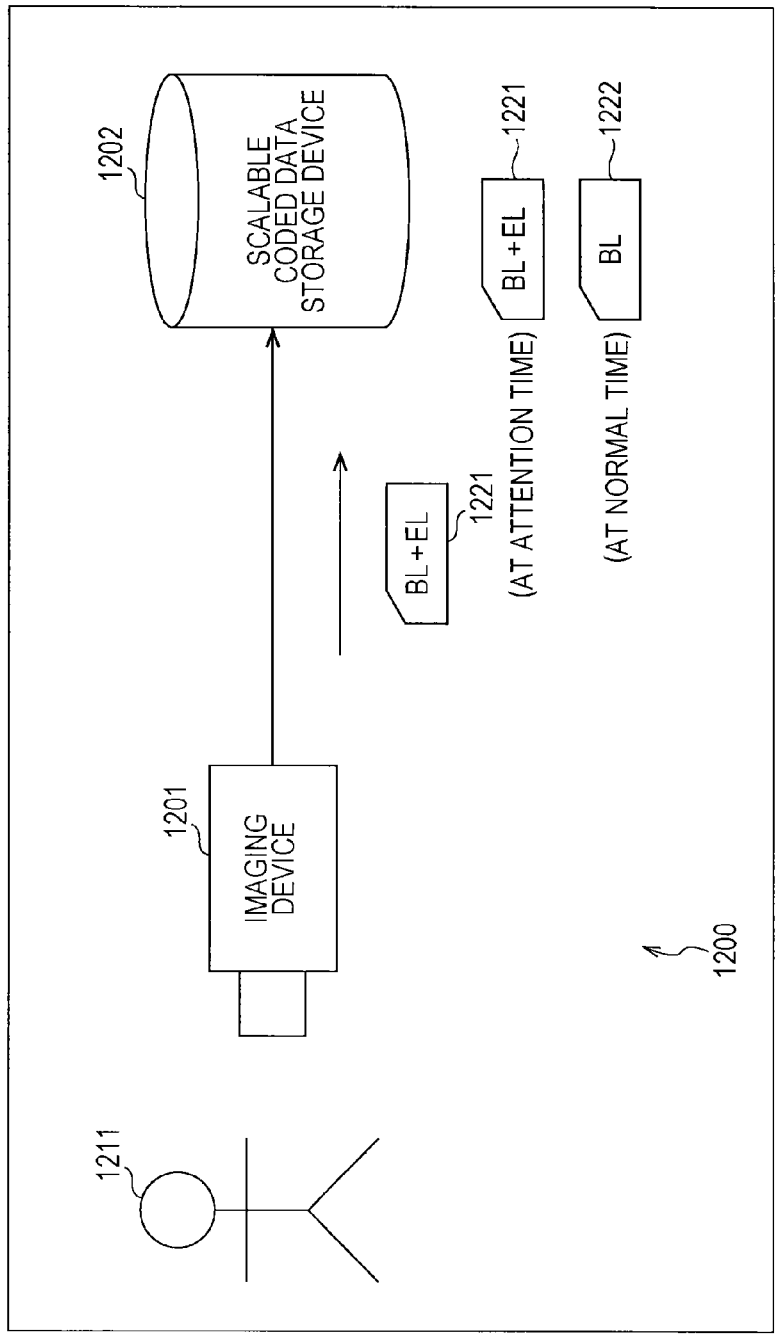
FIG. 41 is a block diagram illustrating further another example of the scalable encoding utilization.

Scalable encoding may also be used for storing coded data, as in an example illustrated in, for example, FIG. 41.

In an imaging system 1200 illustrated in FIG. 41, an imaging device 1201 performs scalable encoding of image data that is acquired by imaging a subject 1211 and supplies resultant image data to a scalable coded data storage device 1202 as scalable coded data (BL+EL) 1221.

The scalable coded data storage device 1202 stores the scalable coded data (BL+EL) 1221 supplied from the imaging device 1201 with quality according to the situation. For example, in the case of a normal time, the scalable coded data storage device 1202 extracts data of the base layer from the scalable coded data (BL+EL) 1221 and stores the extracted data of the base layer as scalable coded data (BL) 1222 of the base layer having low quality and a small amount of data. In contrast, for example, in the case of an attention time, the scalable coded data storage device 1202 stores the scalable coded data (BL+EL) 1221 having a high quality and a large amount of data as it is.

In this way, the scalable coded data storage device 1202 can store an image with high image quality only as necessary. Accordingly, while a decrease in the value of the image due to deterioration of the image quality is suppressed, an increase in the amount of data can be suppressed, whereby the use efficiency of the storage area can be improved.

For example, the imaging device 1201 may be a monitoring camera. When an object to be monitored (for example, an intruder) is not visible in a captured image (in the case of the normal time), it is likely that the content of the captured image is not important. Thus, a decrease in the amount of data is prioritized, and the image data (scalable coded data) of the image is stored with low quality. In contrast, when an object to be monitored is visible as the subject 1211 in a captured image (in the case of the attention time), it is likely that the captured image has important content. Thus, image quality is prioritized, and the image data (scalable coded data) of the image is stored with a high quality.

Either the normal time or the attention time may be determined by, for example, the scalable coded data storage device 1202 by analyzing the image. In addition, the imaging device 1201 may determine the normal time or the attention time and may transmit the determination result to the scalable coded data storage device 1202.

Here, the determination criterion of either the normal time or the attention time may be arbitrary, and the image which is considered to be as the determination criterion may have any content. Naturally, conditions other than the content of the image may be used as the determination criterion. For example, the condition for determination may be changed in accordance with the size, the waveform, or the like of recorded voice, may be changed for every predetermined time, or may be changed in accordance with an instruction which is supplied from the outside such as a user's instruction.

In addition, while the description has been given to an example of changing between two states, namely, normal time and attention time, the number of states is arbitrary, and the state change may be made among three or more states, such as a normal time, a low-attention time, a middle-attention time, and a high-attention time. However, the upper limit number of states to be changed depends on the number of layers of scalable coded data.

Further, the imaging device 1201 may determine the number of layers of scalable encoding in accordance with the states. For example, in the normal time, the imaging device 1201 may generate scalable coded data (BL) 1222 of the base layer having a low quality and a small amount of data and supply the generated scalable coded data (BL) 1222 to the scalable coded data storage device 1202. Further, for example, in the attention time, the imaging device 1201 may generate scalable coded data (BL+EL) 1221 of the base layer having a high quality and a large amount of data and supply the generated scalable coded data (BL+EL) 1221 to the scalable coded data storage device 1202.

In the above description, while the monitoring camera has been described as an example, the imaging system 1200 may be used in any application, and the application is not limited to the monitoring camera.

Then, even in the imaging system 1200 illustrated in FIG. 41, it is possible to obtain effects similar to those described above with reference to FIGS. 1 to 31 by applying the present technology in the same manner as the application to the hierarchical encoding/hierarchical decoding described above with reference to FIGS. 1 to 31.

Further, the present technology is used by selecting appropriate data, in a segment unit, from a plurality kinds of coded data having different resolutions or the like which are prepared in advance and can be also applied to HTTP streaming such as, for example, MPEG/DASH. That is, information on the encoding or decoding can be shared between the plurality kinds of coded data.

<9. Ninth Embodiment>

[Other Examples]

While, in the description presented above, the examples of the devices, the systems, and the like to which the present technology is applied have been described, the present technology is not limited thereto. Thus, the present technology may be applied as all the configurations mounted to such a device or devices configuring such a system, for example, a processor as a system LSI (Large Scale Integration) or the like, a module that uses a plurality of processors or the like, a unit that uses a plurality of modules or the like, or a set or the like (in other words, a part of the configuration of the device) acquired by adding other functions to the unit.

[Video Set]

Figure 42:
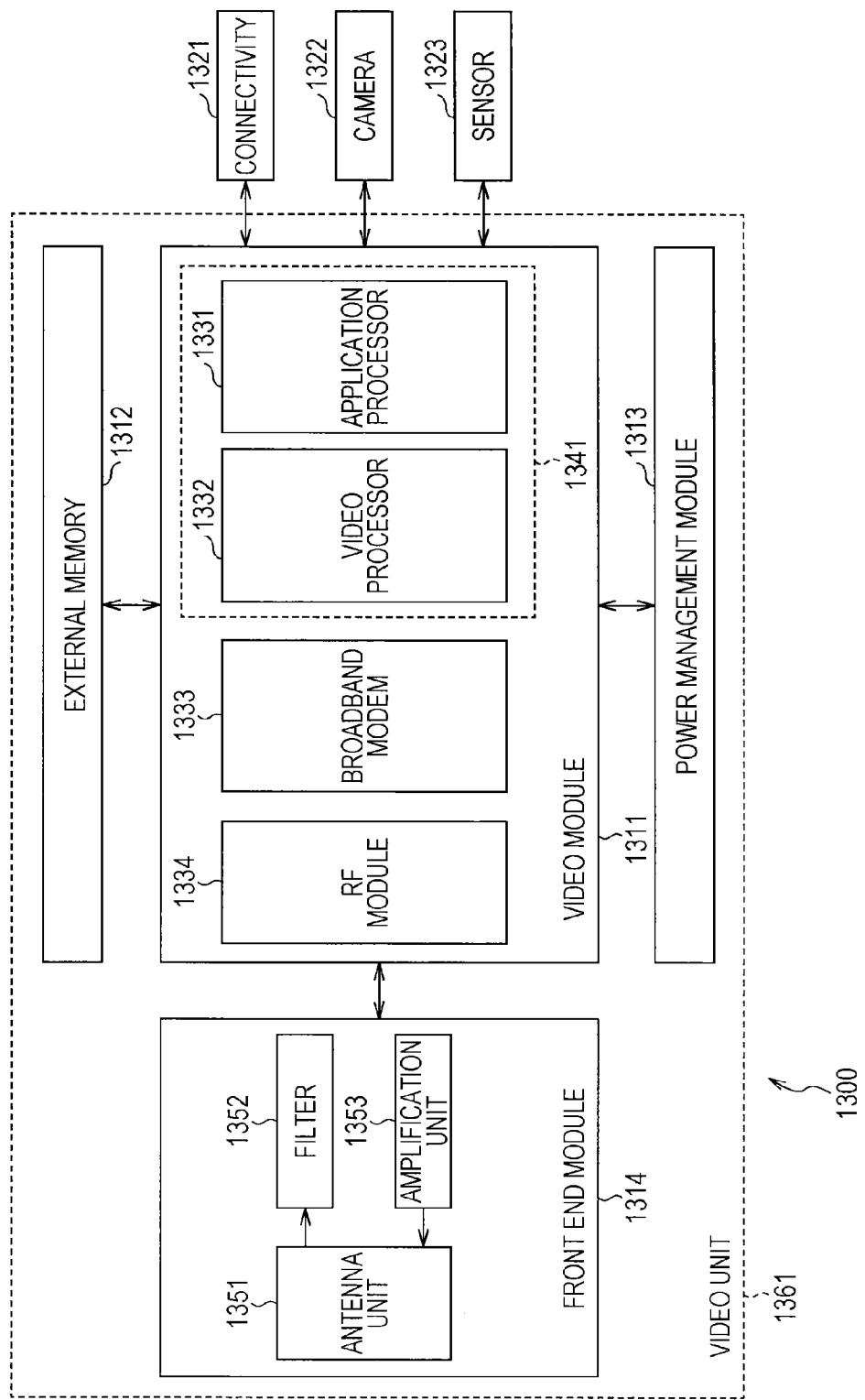
FIG. 42 is a block diagram illustrating an example of a schematic configuration of a video set.

An example of a case where the present technology is applied as a set will be described with reference to FIG. 42. FIG. 42 illustrates an example of the schematic configuration of a video set to which the present technology is applied.

Recently, the implementation of multiple functions of an electronic device is in progress, and, in the development or the manufacturing thereof, in a case where a part of the configuration is provided for sale, provision, or the like, there are not only a case where the configuration having one function is applied but also a case where one set having a plurality of functions, which is acquired by combining a plurality of configurations having relating function, is applied, which has commonly been seen.

The video set 1300 illustrated in FIG. 42 has such a multi-function configuration and is acquired by combining a device having a function relating to image encoding or image decoding (either one or both) with devices having other functions relating to the function.

As illustrated in FIG. 42, the video set 1300 includes a module group that includes a video module 1311, an external memory 1312, a power management module 1313, a front end module 1314, and the like and devices having related functions of a connectivity 1321, a camera 1322, a sensor 1323, and the like.

A module is formed as a component having a function having unity by arranging several component functions relating to each other together. While a specific physical configuration is arbitrary, for example, a module acquired by arranging a plurality of processors each having a function, an electronic circuit component such as a resistor or a capacitor, and other devices or the like on a wiring board or the like so as to be integrated together may be considered. In addition, it may be considered to form a new module by combining a module with other modules, processors, and the like.

In the example illustrated in FIG. 42, the video module 1311 is acquired by combining configurations having functions relating to image processing and includes: an application processor; a video processor; a broadband modem 1333; and an RF module 1334.

The processor is acquired by integrating a configuration having a predetermined function on a semiconductor chip as SoC (System On a Chip) and, for example, there is also the processor that is called a system LSI (Large Scale Integration) or the like. The configuration having the predetermined function may be a logic circuit (hardware configuration), a configuration including a CPU, a ROM, a RAM, and the like and a program (software configuration) executed using them, or a configuration combining both the configurations described above. For example, it may be configured such that the processor includes logic circuits, a CPU, a ROM, a RAM, and the like, some functions are realized by the logic circuits (hardware configuration), and the other functions are realized by a program (software configuration) executed by the CPU.

The application processor 1331 illustrated in FIG. 42 is a processor that executes an application relating to image processing. In order to realize predetermined functions, the application executed by the application processor 1331 may not only perform a calculation process but also control the configurations of the inside and the outside of the video module 1311 such as the video processor 1332 as is necessary.

The video processor 1332 is a processor that has a function relating to image encoding and image decoding (either one or both).

The broadband modem 1333 converts data (digital signal) transmitted by wired or wireless (or wired and wireless) broadband communication performed through a broadband line such as the Internet or a public telephone network into an analog signal through digital modulation or the like or demodulates the analog signal received by the broadband communication so as to be converted into data (digital signal). For example, the broadband modem 1333 processes arbitrary information such as image data processed by the video processor 1332, a stream in which the image data is encoded, an application program, and setting data.

The RF module 1334 is a module that performs frequency conversion, modulation/demodulation, amplification, a filter process, and the like for an RF (Radio Frequency) signal that is transmitted/received through an antenna. For example, the RF module 1334 generates an RF signal by performing frequency conversion and the like for a baseband signal generated by the broadband modem 1333. In addition, for example, the RF module 1334 generates a baseband signal by performing frequency conversion and the like for an RF signal received through the front end module 1314.

In addition, as denoted by a dotted line 1341 in FIG. 42, the application processor 1331 and the video processor 1332 may be integrated so as to be configured as one processor.

The external memory 1312 is a module that is disposed outside the video module 1311 and includes a storage device used by the video module 1311. The storage device of the external memory 1312 may be realized by any physical configuration. However, generally, since the storage device is frequently used for storing data having a large capacity such as image data configured in units of frames, the storage device is preferably realized by a semiconductor memory that has a large capacity at relatively low cost such as a DRAM (Dynamic Random Access Memory).

The power management module 1313 manages and controls the supply of power to the video module 1311 (each configuration within the video module 1311).

The front end module 1314 is a module that provides a front end function (a transmission/reception-end circuit on the antenna side) for the RF module 1334. As illustrated in FIG. 42, the front end module 1314, for example, includes an antenna unit 1351, a filter 1352, and an amplification unit 1353.

The antenna unit 1351 includes an antenna that transmits/receives a wireless signal and a peripheral configuration thereof. The antenna unit 1351 transmits a signal supplied from the amplification unit 1353 as a wireless signal and supplies a received wireless signal to the filter 1352 as an electric signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection to the outside. The physical configuration of the connectivity 1321 is arbitrary. For example, the connectivity 1321 includes a configuration having a communication function other than the communication specification to which the broadband modem 1333 corresponds, external input/output terminals, and the like.

For example, the connectivity 1321 may be configured to include a module having communication functions that are compliant with radio communication specifications such as Bluetooth (registered trademark), IEEE 802.11 (for example, Wi-Fi (Wireless Fidelity; registered trademark)), NFC (Near Field Communication), and IrDA (InfraRed Data Association) and an antenna that transmits/receives signals that are compliant with the specifications. In addition, for example, the connectivity 1321 may be configured to include a module having communication functions that are compliant with wired communication specifications such as USB (Universal Serial Bus) and HDMI (registered trademark) (High-Definition Multimedia Interface) and terminals that are compliant with the specifications. Furthermore, for example, the connectivity 1321 may be configured to have an additional data (signal) transmission function and the like of analog input/output terminals or the like.

In addition, the connectivity 1321 may be configured to include a device that is the transmission destination of data (signal). For example, the connectivity 1321 may be configured to include a drive (including not only a drive of a removable medium but also a hard disk, an SSD (Solid State Drive), a NAS (Network Attached Storage), and the like) that performs data reading or data writing for a recoding medium such as a magnetic disk, an optical disc, a magneto-optical disk, or a semiconductor memory. Furthermore, the connectivity 1321 may be configured to include an output device (a monitor, a speaker, or the like) of an image or an audio.

The camera 1322 is a module that has a function for acquiring image data of a subject by imaging the subject. The image data acquired by an imaging process performed by the camera 1322, for example, is supplied to the video processor 1332 and is coded.

The sensor 1323 is a module that has the function of an arbitrary sensor such as an audio sensor, an ultrasonic sensor, an optical sensor, an illuminance sensor, an infrared sensor, an image sensor, a rotation sensor, an angle sensor, an angular velocity sensor, a speed sensor, an acceleration sensor, a tilt sensor, a magnetic identification sensor, an impact sensor, or a temperature sensor. Data that is detected by the sensor 1323, for example is supplied to the application processor 1331 and is used by the application and the like.

In the description presented above, each configuration described as a module may be realized by a processor, and each configuration described as a processor may be realized by a module.

As will be described later, the present technology may be applied to the video processor 1332 of the video set 1300 having the configuration as described above. Accordingly, the video set 1300 may be configured as a set to which the present technology is applied.

[Configuration Example of Video Processor]

Figure 43:
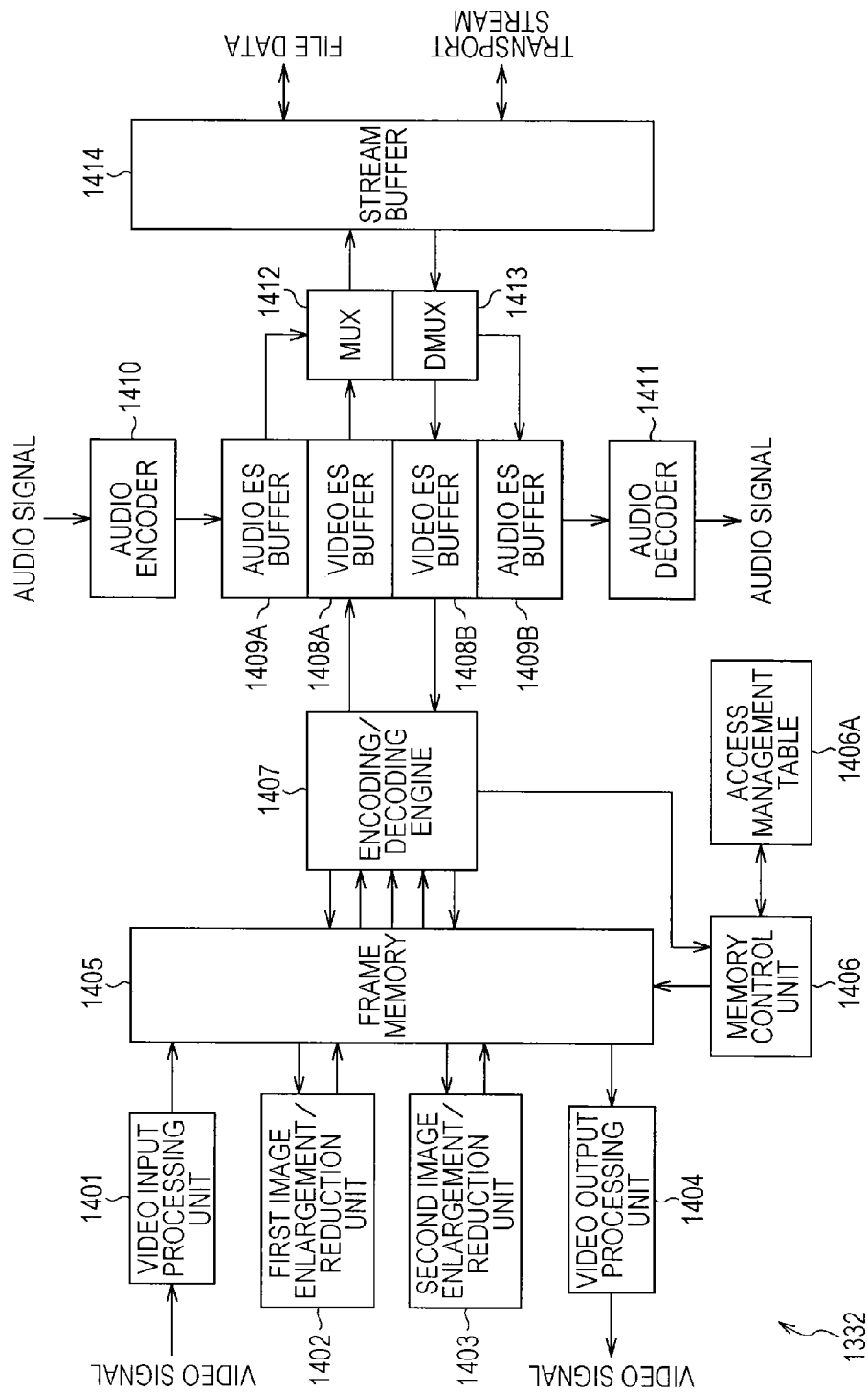
FIG. 43 is a block diagram illustrating an example of a schematic configuration of a video processor.

FIG. 43 illustrates an example of the schematic configuration of the video processor 1332 (FIG. 42) to which the present technology is applied.

In the example illustrated in FIG. 43, the video processor 1332 has a function of receiving an input of a video signal and an audio signal and encoding the received signals in accordance with a predetermined system and a function of decoding coded video data and coded audio data and reproducing and outputting a video signal and an audio signal.

As illustrated in FIG. 43, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video ES (Elementary Stream) buffers 1408A and 1408B, and audio ES buffers 1409A and 1409B. In addition, the video processor 1332 includes: an audio encoder 1410; an audio decoder 1411; a multiplexer (MUX) 1412; a demultiplexer (DMUX) 1413; and a stream buffer 1414.

The video input processing unit 1401, for example, acquires a video signal input from the connectivity 1321 (FIG. 42) or the like and converts the acquired video signal into digital image data. The first image enlargement/reduction unit 1402 performs format conversion and an image enlargement/reduction process for the image data. The second image enlargement/reduction unit 1403, for the image data, performs an image enlargement/reduction process in accordance with a format of the output destination through the video output processing unit 1404 or performs format conversion and an image enlargement/reduction process, which are similar to those of the first image enlargement/reduction unit 1402, and the like. The video output processing unit 1404 performs format conversion, conversion into an analog signal, and the like for the image data and outputs a resultant signal, for example, to the connectivity 1321 (FIG. 42) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405 is realized as a semiconductor memory such as a DRAM.

The memory control unit 1406 receives a synchronization signal supplied from the encoding/decoding engine 1407 and controls an access to the frame memory 1405 for writing/reading in accordance with an access schedule for the frame memory 1405 that is written into an access management table 1406A. The access management table 1406A is updated by the memory control unit 1406 in accordance with the process that is performed by the encoding/decoding engine 1407, the first image enlargement/reduction unit 1402, the second image enlargement/reduction unit 1403, and the like.

The encoding/decoding engine 1407 performs an encoding process of image data and performs a decoding process of a video stream that is a data acquired by encoding the image data. For example, the encoding/decoding engine 1407 encodes the image data read from the frame memory

1405 and sequentially writes the read image data into the video ES buffer 1408A as a video stream. In addition, for example, the encoding/decoding engine 1407 sequentially reads the video stream from the video ES buffer 1408B, decodes the read video stream, and sequentially writes the decoded video stream into the frame memory 1405 as image data. The encoding/decoding engine 1407 uses the frame memory 1405 as a work area in such encoding or decoding processes. In addition, the encoding/decoding engine 1407, for example, at the timing of starting the process of each macroblock, outputs a synchronization signal to the memory control unit 1406.

The video ES buffer 1408A buffers the video stream generated by the encoding/decoding engine 1407 and supplies the video stream to the multiplexer (MUX) 1412. The video ES buffer 1408B buffers the video stream supplied from the demultiplexer (DMUX) 1413 and supplies the video stream to the encoding/decoding engine 1407.

The audio ES buffer 1409A buffers the audio stream generated by the audio encoder 1410 and supplies the audio stream to the multiplexer (MUX) 1412. The audio ES buffer 1409B buffers the audio stream supplied from the demultiplexer (DMUX) 1413 and supplies the audio stream to the audio decoder 1411.

The audio encoder 1410 digital exchanges an audio signal, for example, input from the connectivity 1321 (FIG. 42) or the like, and for example, encodes the digital signal in accordance with a predetermined system such as an MPEG audio system or an AC3 (AudioCode number 3) system. The audio encoder 1410 sequentially writes audio streams that are data acquired by encoding the audio signals into the audio ES buffer 1409A. The audio decoder 1411 decodes the audio stream supplied from the audio ES buffer 1409B, performs conversion of the decoded audio stream, for example, into an analog signal and the like, and supplies the converted signal, for example, to the connectivity 1321 (FIG. 42) and the like as a reproduced audio signal.

The multiplexer (MUX) 1412 multiplexes the video stream and the audio stream. The multiplexing method (in other words, the format of a bit stream generated by the multiplexing) is arbitrary. In addition, at the time of multiplexing, the multiplexer (MUX) 1412 may add predetermined header information or the like to the bit stream. In other words, the multiplexer (MUX) 1412 can convert the format of the stream through the multiplexing process. For example, by multiplexing the video stream and the audio stream, the multiplexer (MUX) 1412 converts the video stream and the audio stream into a transport stream that is a bit stream having a format for transmission. In addition, for example, by multiplexing the video stream and the audio stream, the multiplexer (MUX) 1412 converts the video stream and the audio stream into data (file data) having a format for recording.

The demultiplexer (DMUX) 1413 demultiplexes the bit stream in which the video stream and the audio stream are multiplexed using a method corresponding to the multiplexing process performed by the multiplexer (MUX) 1412. In other words, the demultiplexer (DMUX) 1413 extracts a video stream and an audio stream from the bitstream read from the stream buffer 1414 (the video stream and the audio stream are separated). In other words, the demultiplexer (DMUX) 1413 can convert (inverse conversion of the conversion performed by the multiplexer (MUX) 1412) the format of the stream through the demultiplexing process. For example, the demultiplexer (DMUX) 1413 acquires the transport stream, for example, supplied from the connectivity 1321 (FIG. 42), the broadband modem 1333, or the like (FIG. 42) through the stream buffer 1414 and demultiplexes the acquired transport stream, thereby converting the transport stream into a video stream and an audio stream. In addition, for example, the demultiplexer (DMUX) 1413 acquires file data read from various recording media, for example, by the connectivity 1321 (FIG. 42) through the stream buffer 1414 and demultiplexes the acquired file data, thereby converting the file data into a video stream and an audio stream.

The stream buffer 1414 buffers the bit stream. For example, the stream buffer 1414 buffers the transport stream supplied from the multiplexer (MUX) 1412 and supplies the transport stream, for example, to the connectivity 1321 (FIG. 42), the broadband modem 1333 (FIG. 42), and the like at predetermined timing or based on a request transmitted from the outside.

In addition, for example, the stream buffer 1414 buffers the file data supplied from the multiplexer (MUX) 1412 and supplies the file data, for example, to the connectivity 1321 (FIG. 42) and the like at predetermined timing or based on a request transmitted from the outside.

Furthermore, the stream buffer 1414 buffers the transport stream acquired, for example, through the connectivity 1321 (FIG. 42), the broadband modem 1333 (FIG. 42), or the like and supplies the transport stream to the demultiplexer (DMUX) 1413 at predetermined timing or based on a request from the outside, and the like.

In addition, the stream buffer 1414 buffers the file data read from various recording media, for example, by the connectivity 1321 (FIG. 42) or the like and supplies the file data to the demultiplexer (DMUX) 1413 at predetermined timing or based on a request from the outside or the like.

Next, an example of the operation of the video processor 1332 having such a configuration will be described. For example, a video signal input to the video processor 1332 from the connectivity 1321 (FIG. 42) or the like is converted into digital image data according to a predetermined system such as the 4:2:2Y/Cb/Cr system by the video input processing unit 1401 and is sequentially written into the frame memory 1405. This digital image data is read by the first image enlargement/reduction unit 1402 or the second image enlargement/reduction unit 1403, and a format conversion into a predetermined system such as the 4:2:0Y/Cb/Cr system or the like and the enlargement/reduction process is performed for the digital image data, and the processed digital image data is written again into the frame memory 1405. This image data is coded by the encoding/decoding engine 1407 and is written into the video ES buffer 1408A as a video stream.

In addition, the audio signal input from the connectivity 1321 (FIG. 42) or the like to the video processor 1332 is coded by the audio encoder 1410 and is written into the audio ES buffer 1409A as an audio stream.

The video stream stored in the video ES buffer 1408A and the audio stream stored in the audio ES buffer 1409A are read by the multiplexer (MUX) 1412, are multiplexed, and are converted into a transport stream, file data, or the like. The transport stream generated by the multiplexer (MUX) 1412 is buffered into the stream buffer 1414 and then is output to the external network, for example, through the connectivity 1321 (FIG. 42), the broadband modem 1333 (FIG. 42), or the like. In addition, the file data generated by the multiplexer (MUX) 1412 is buffered into the stream buffer 1414, then is output, for example, to the connectivity 1321 (FIG. 42) or the like, and is recorded in various recording media.

In addition, the transport stream that is input from the external network to the video processor 1332, for example, through the connectivity 1321 (FIG. 42), the broadband modem 1333 (FIG. 42), or the like is buffered into the stream buffer 1414 and then is demultiplexed by the demultiplexer (DMUX) 1413. In addition, the file data that is read from those various recording media, for example, by the connectivity 1321 (FIG. 42) or the like and is input to the video processor 1332 is buffered into the stream buffer 1414 and then is demultiplexed by the demultiplexer (DMUX) 1413. In other words, the transport stream or the file data input to the video processor 1332 is separated into a video stream and an audio stream by the demultiplexer (DMUX) 1413.

The audio stream is supplied to the audio decoder 1411 through the audio ES buffer 1409B and is decoded, and the audio signal is reproduced. In addition, the video stream is written into the video ES buffer 1408B, then is sequentially read by the encoding/decoding engine 1407, is decoded, and is written into the frame memory 1405. The decoded image data is enlarged or reduced by the second image enlargement/reduction unit 1403 and is written into the frame memory 1405. Then, the decoded image data is read by the video output processing unit 1404, has the format converted into a predetermined system such as the 4:2:2Y/Cb/Cr system, and is further converted into an analog signal, and the video signal is reproduced and output.

In a case where the present technology is applied to the video processor 1332 configured as such, the present technology according to each embodiment described above may be applied to the encoding/decoding engine 1407. In other words, for example, the encoding/decoding engine 1407 may be configured to have the functions of the image encoding device 100 (FIG. 1) according to the first embodiment or the image decoding device 200 (FIG. 19) according to the second embodiment. By configuring as such, the video processor 1332 can acquire the same advantages as those described above with reference to FIGS. 1 to 31.

In addition, in the encoding/decoding engine 1407, the present technology (in other words, the functions of the image encoding device and the image decoding device according to each embodiment described above) may be realized by hardware such as logic circuits, may be realized by software such as a built-in program, or may be realized by both the hardware and the software.

[Another Configuration Example of Video Processor]

Figure 44:
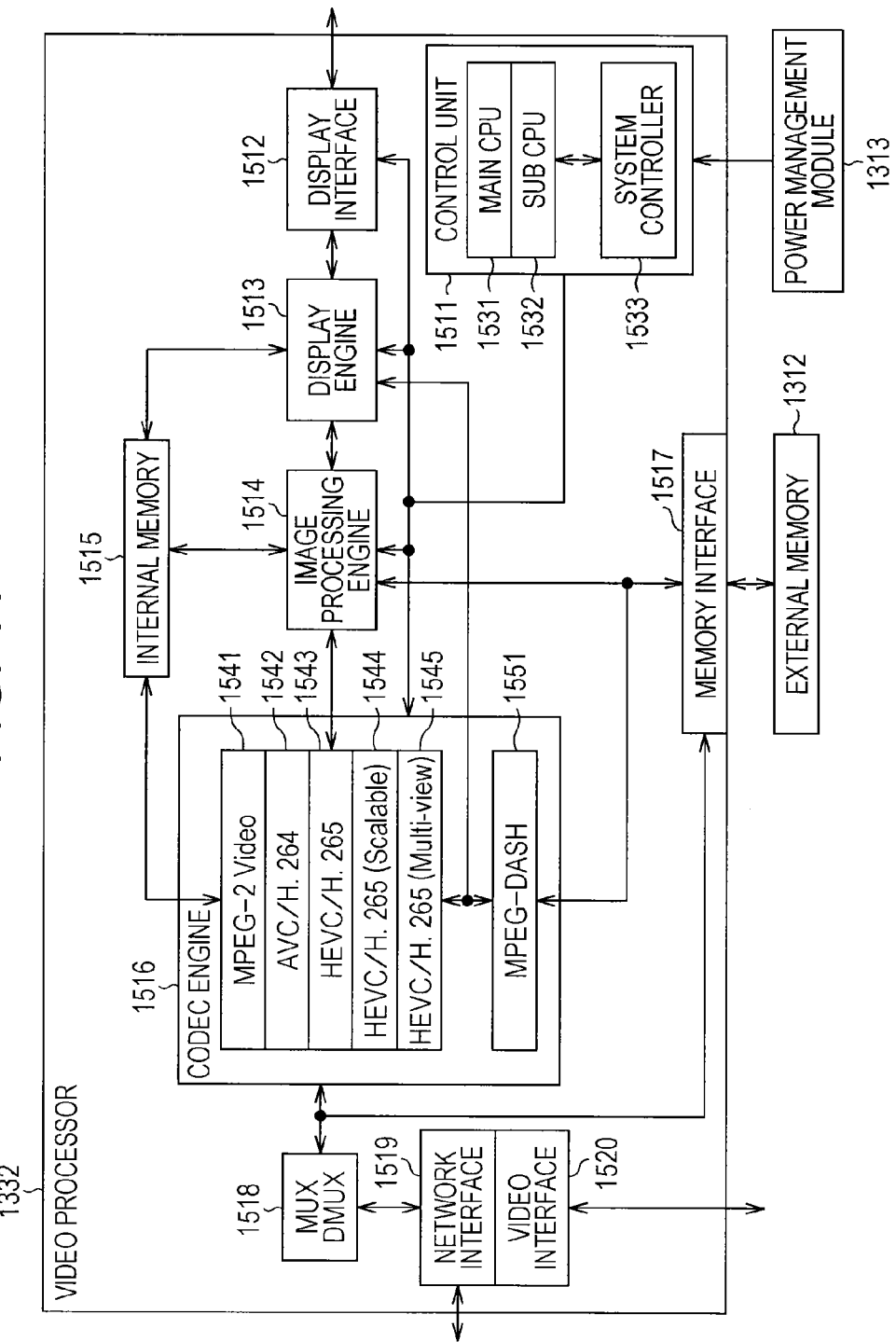
FIG. 44 is a block diagram illustrating another example of a schematic configuration of the video processor.

FIG. 44 is a diagram that illustrates another example of the schematic configuration of the video processor 1332 (FIG. 42) to which the present technology is applied. In the case of the example illustrated in FIG. 44, the video processor 1332 has a function of encoding/decoding the video data in accordance with a predetermined system.

More specifically, as illustrated in FIG. 44, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexer/demultiplexer (MUX DMUX) 1518; a network interface 1519; and a video interface 1520.

The control unit 1511 controls the operations of processing units arranged within the video processor 1332 such as the display interface 1512, the display engine 1513, the image processing engine 1514, and the codec engine 1516.

As illustrated in FIG. 44, the control unit 1511, for example, includes a main CPU 1531, a sub CPU 1532, and a system controller 1533. The main CPU 1531 executes a program that is used for controlling the operation of each processing unit disposed within the video processor 1332. The main CPU 1531 generates a control signal in accordance with the program or the like and supplies the control signal to each processing unit (in other words, controls the operation of each processing unit). The sub CPU 1532 achieves an auxiliary role for the main CPU 1531. For example, the sub CPU 1532 executes a child process, a sub routine, and the like of the program executed by the main CPU 1531. The system controller 1533 controls the operations of the main CPU 1531 and the sub CPU 1532 such as designation of programs to be executed by the main CPU 1531 and the sub CPU 1532.

The display interface 1512 outputs the image data, for example, to the connectivity 1321 (FIG. 42) or the like under the control of the control unit 1511. For example, the display interface 1512 converts the image data that is digital data into an analog signal and outputs the image data to the monitoring device or the like of the connectivity 1321 (FIG. 42) as a reproduced video signal or the image data that is the digital data.

The display engine 1513, under the control of the control unit 1511, performs various conversion processes such as a format conversion, a size conversion, and a color gamut conversion for the image data so as to be adjusted to the hardware specifications of the monitoring device displaying the image or the like.

The image processing engine 1514, under the control of the control unit 1511, performs predetermined image processing such as a filter process for improving the image quality or the like for the image data.

The internal memory 1515 is a memory disposed inside the video processor 1332 that is shared by the display engine 1513, the image processing engine 1514, and the codec engine 1516. The internal memory 1515, for example, is used for data interchange performed among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, in accordance with a request). While this internal memory 1515 may be realized by any storage device, generally, the internal memory 1515 is frequently used for storing data having a small capacity such as image data configured in units of blocks or parameters, and accordingly, it is preferably realized by a semiconductor memory having a relatively small capacity (for example, compared to the external memory 1312) and a high response speed such as a SRAM (Static Random Access Memory).

The codec engine 1516 performs the process relating to encoding or decoding image data. The encoding/decoding system to which the codec engine 1516 corresponds is arbitrary, and the number thereof may be one or two or more. For example, the codec engine 1516 may include a codec function of a plurality of encoding/decoding systems and perform the encoding of image data or the decoding of coded image data by using selected one of the plurality of encoding/decoding systems.

In the example illustrated in FIG. 44, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks of the process relating to the codec.

The MPEG-2 Video 1541 is a functional block used for encoding or decoding image data in accordance with the MPEG-2 system. The AVC/H.264 1542 is a functional block used for encoding or decoding image data in accordance with the AVC system. In addition, the HEVC/H.265 1543 is a functional block used for encoding or decoding image data in accordance with the HEVC system. The HEVC/H.265 (Scalable) 1544 is a functional block used for scalable encoding or scalable decoding image data in accordance with the HEVC system. The HEVC/H.265 (Multi-view) 1545 is a functional block used for multiple viewpoint encoding or multiple viewpoint decoding image data in accordance with the HEVC system.

The MPEG-DASH 1551 is a functional block used for transmitting/receiving image data in accordance with an MPEG-DASH (MPEG-Dynamic Adaptive Streaming over HTTP) system. The MPEG-DASH is a technology for streaming a video by using an HTTP (HyperText Transfer Protocol) and has a feature that one is appropriately selected from among a plurality of pieces of coded data having mutually-different resolutions and the like, which are prepared in advance, in units of segments and is transmitted. The MPEG-DASH 1551 performs generation of a stream, transmission control of the stream, and the like that are compliant with the specification, and, for encoding/decoding image data, uses MPEG-2 Video 1541 or HEVC/H.265 (Multi-view) 1545 described above.

The memory interface 1517 is an interface used for the external memory 1312. Data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexer/demultiplexer (MUX DMUX) 1518 multiplexes or demultiplexes various kinds of data relating to an image such as a bitstream of coded data, image data, or a video signal. The multiplexing/demultiplexing method is arbitrary. For example, at the time of the multiplexing process, the multiplexer/demultiplexer (MUX DMUX) 1518 may not only arrange a plurality of pieces of data into one but also add predetermined header information or the like to the data. In addition, at the time of the demultiplexing process, the multiplexer/demultiplexer (MUX DMUX) 1518 may not only divide one piece of data into a plurality of parts but also add predetermined header information or the like to the divided data. In other words, the multiplexer/demultiplexer (MUX DMUX) 1518 can convert the format of data through a multiplexing/demultiplexing process. For example, the multiplexer/demultiplexer (MUX DMUX) 1518 can convert the bitstream into a transport stream that is in the format for transmission or data (file data) that is in the file format for recording by multiplexing the bit stream. It is apparent that the inverse conversion can be performed through a demultiplexing process.

The network interface 1519 is a dedicated interface such as the broadband modem 1333 (FIG. 42) or the connectivity 1321 (FIG. 42). The video interface 1520 is a dedicated interface such as the connectivity 1321 (FIG. 42) or the camera 1322 (FIG. 42).

Next, an example of the operation of such a video processor 1332 will be described. For example, when a transport stream is received from the external network through the connectivity 1321 (FIG. 42), the broadband modem 1333 (FIG. 42), or the like, the transport stream is supplied to the multiplexer/demultiplexer (MUX DMUX) 1518 through the network interface 1519, is demultiplexed, and is decoded by the codec engine 1516. For the image data acquired by the decoding process performed by the codec engine 1516, for example, predetermined image processing is performed by the image processing engine 1514, and predetermined conversion is performed by the display engine 1513, the resultant image data is supplied, for example, to the connectivity 1321 (FIG. 42) or the like through the display interface 1512, and the image is displayed on the monitor. In addition, for example, the image data acquired by the decoding process performed by the codec engine 1516 is re-coded by the codec engine 1516, is multiplexed by the multiplexer/demultiplexer (MUX DMUX) 1518, is converted into file data, is output, for example, to the connectivity 1321 (FIG. 42) or the like through the video interface 1520, and is recorded on various recording media.

In addition, for example, file data of coded data that is acquired by encoding the image data read from a recording medium not illustrated in the figure by the connectivity 1321 (FIG. 42) or the like is supplied to the multiplexer/demultiplexer (MUX DMUX) 1518 through the video interface 1520, is demultiplexed, and is decoded by the codec engine 1516. The image data acquired by the decoding process performed by the codec engine 1516 is subjected to predetermined image processing performed by the image processing engine 1514, and a predetermined conversion is performed by the display engine 1513, and the resultant image data is supplied, for example, to the connectivity 1321 (FIG. 42) or the like through the display interface 1512, and the image is displayed on the monitor. Furthermore, for example, the image data acquired by the decoding process performed by the codec engine 1516 is re-coded by the codec engine 1516, is multiplexed by the multiplexer/demultiplexer (MUX DMUX) 1518, is converted into a transport stream, is supplied, for example, to the connectivity 1321 (FIG. 42), the broadband modem 1333 (FIG. 42), or the like through the network interface 1519, and is transmitted to another device not illustrated in the figure.

In addition, the interchange of image data or other data between processing units disposed within the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may include a functional block that realizes the image encoding device 100 (FIG. 1) according to the first embodiment or the image decoding device 200 (FIG. 19) according to the second embodiment. By configuring as such, the video processor 1332 can acquire the same advantages as those described above with reference to FIGS. 1 to 31.

In addition, in the codec engine 1516, the present technology (in other words, the functions of the image encoding device and the image decoding device according to each embodiment described above) may be realized by hardware such as logic circuits, may be realized by software such as a built-in program, or may be realized by both the hardware and the software.

As above, while two configurations of the video processor 1332 have been described as examples, the configuration of the video processor 1332 is arbitrary and may be a configuration other than the two configurations described above. In addition, this video processor 1332 may be configured by either one semiconductor chip or a plurality of semiconductor chips. For example, the video processor 1332 may be configured by a three-dimensional laminated LSI in which a plurality of semiconductors is laminated. In addition, the video processor 1332 may be realized by a plurality of LSI's.

[Example of Application to Device]

The video set 1300 may be built in various devices that process image data. For example, the video set 1300 may be built in the television apparatus 900 (FIG. 35), the mobile phone 920 (FIG. 36), the recording and reproducing device 940 (FIG. 37), the imaging device 960 (FIG. 38), and the like. By building the video set 1300 therein, the devices can acquire advantages that are the same as those described above with reference to FIGS. 1 to 31.

In addition, the video set 1300, for example, may be built in the terminal devices of the data transmission system 1000 illustrated in FIG. 39 such as the personal computer 1004, the AV device 1005, the tablet device 1006, and the mobile phone 1007, the broadcasting station 1101 and the terminal device 1102 of the data transmission system 1100 illustrated in FIG. 40, and the imaging device 1201 and the scalable coded data storage device 1202 of the imaging system 1200 illustrated in FIG. 41, and the like. By building the video set 1300 therein, the devices can acquire advantages that are the same as the advantages described above with reference to FIGS. 1 to 31.

Furthermore, even if some of the configurations of the video set 1300 described above may be configurations but the video processor 1332 is included, the configurations can be implemented as one in which the present technology is applied in a case. For example, only the video processor 1332 may be configured as a video processor to which the present technology is applied. In addition, as described above, the processor, the video module 1311, and the like denoted by the dotted line 1341 may be configured as a processor, a module, and the like to which the present technology is applied. Furthermore, for example, the video module 1311, the external memory 1312, the power management module 1313, and the front end module 1314 may be combined so as to be configured as a video unit 1361 to which the present technology is applied. In any of the configurations, the same advantages as those described above with reference to FIGS. 1 to 31 can be acquired.

In other words, any configuration that includes the video processor 1332, similar to the case of the video set 1300, may be built in various devices that process image data. For example, the video processor 1332, the processor and the video module 1311 denoted by the dotted line 1341, or the video unit 1361 may be built in the television apparatus 900 (FIG. 35), the mobile phone 920 (FIG. 36), the recording and reproducing device 940 (FIG. 37), the imaging device 960 (FIG. 38), the terminal devices of the data transmission system 1000 illustrated in FIG. 39 such as the personal computer 1004, the AV device 1005, the tablet device 1006 and the mobile phone 1007, the broadcasting station 1101 and the terminal device 1102 of the data transmission system 1100 illustrated in FIG. 40, and the imaging device 1201 and the scalable coded data storage device 1202 of the imaging system 1200 illustrated in FIG. 41, and the like. By building any configuration to which the present technology is applied therein, similar to the case of the video set 1300, the devices can acquire the same advantages as those described above with reference to FIGS. 1 to 31.

Further, in the present specification, the examples have been described in which various kinds of information such as skip enable information or skip identification information is multiplexed into a coded stream, and the coded stream is transmitted from the coding side to the decoding side. However, the technique for transmitting the information is not limited thereto. For example, the information may be transmitted or recorded as separate data associated with a coded bit stream without being multiplexed into the coded bit stream. Here, the term "being associated" represents that an image (a slice, a block, or the like; it may be a part of the image) included in a bit stream and information corresponding to the image are linked to each other at the time of the decoding process. In other words, the information may be transmitted on a transmission line that is different from that of the image (or the bit stream). Furthermore, the information may be recorded on a recording medium (or a different storage area of the same recoding medium) different from the recoding medium of the image (or the bit stream). In addition, the information and the image (or the bit stream) may be associated with each other in an arbitrary unit such as a plurality of frames, one frame, or a part of the frames.

The preferred embodiments of the present disclosure has been described in detail with reference to the appended drawings, but the technical scope of the present disclosure is not limited to the above examples. It should be understood by those skilled in the art that various modifications or alterations may occur within the scope of the technical spirit described in claims and they are within the technical scope of the present invention.

The present technology can also have the following configurations:

(1) An image processing device including: a quantization unit that uses a weighting coefficient applied to an orthogonal transform skip block in which orthogonal transform processing is skipped and quantizes the orthogonal transform skip block; and an encoding unit that encodes a coefficient of the orthogonal transform skip block quantized by the quantization unit.

(2) The image processing device described in (1), wherein the quantization unit uses a spatial domain value as the weighting coefficient.

(3) The image processing device described in (2), wherein the quantization unit uses one of the weighting coefficient.

(4) The image processing device described in (2), wherein the quantization unit uses a DC component of a quantization matrix used in quantizing an orthogonal transform block in which the orthogonal transform processing is performed, as the weighting coefficient.

(5) The image processing device described in (2), wherein the quantization unit quantizes the orthogonal transform skip block using a weighting coefficient matrix obtained by performing matrix processing on a DC component of a quantization matrix.

(6) The image processing device described in (1), wherein the quantization unit quantizes the orthogonal transform skip block using a weighting coefficient matrix obtained by performing matrix processing on the weighting coefficient.

(7) The image processing device described in (1), further including a transmission unit that transmits the weighting coefficient as a sequence parameter set or a picture parameter set.

(8) The image processing device described in (1), further including a transmission unit that transmits skip enable information indicating whether or not to enable the skip of the orthogonal transform processing as a picture parameter set or as a slice header.

(9) The image processing device described in (8), wherein the transmission unit transmits the skip enable information only when a minimum block size in performing an orthogonal transform is 4×4.

(10) The image processing device described in (1), further including a transmission unit that transmits the skip enable information as a sequence parameter set only when a minimum block size in performing an orthogonal transform is 4×4.

(11) The image processing device described in (10), wherein the transmission unit transmits the weighting coefficient subsequent to the skip enable information when the skip enable information is a value for enabling the skip of the orthogonal transform processing.

(12) An image processing method of an image processing device, wherein the image processing device uses a weighting coefficient applied to an orthogonal transform skip block in which orthogonal transform processing is skipped, quantizes the orthogonal transform skip block, and encodes a coefficient of the quantized orthogonal transform skip block.

(13) An image processing device including: a filter unit that performs a deblocking filter on a locally decoded image when an image is subjected to an encoding process; a control unit that controls the deblocking filter by the filter unit so as to increase strength of the deblocking filter with respect to a boundary between an orthogonal transform skip block in which orthogonal transform processing is skipped and an orthogonal transform block in which the orthogonal transform is performed; and an encoding unit that uses an image in which the deblocking filter is performed by the filter unit and encodes the image.

(14) An image processing method of an image processing device, wherein the image processing device performs a deblocking filter on a locally decoded image when an image is subjected to an encoding process, controls the deblocking filter by the filter unit so as to increase strength of the deblocking filter with respect to a boundary between an orthogonal transform skip block in which orthogonal transform processing is skipped and an orthogonal transform block in which the orthogonal transform is performed, uses an image in which the deblocking filter is performed by the filter unit, and encodes the image.

(15) An image processing device including: a decoding unit that performs a decoding process on a bit stream to generate an image; a filter unit that performs a deblocking filter on the image generated by the decoding unit; and a control unit that controls the deblocking filter by the filter unit so as to increase strength of the deblocking filter with respect to a boundary between an orthogonal transform skip block in which orthogonal transform processing is skipped and an orthogonal transform block in which the orthogonal transform is performed.

(16) An image processing method of an image processing device, wherein the image processing device performs a decoding process on a bit stream to generate an image, performs a deblocking filter on the generated image, and controls the deblocking filter so as to increase strength of the deblocking filter with respect to a boundary between an orthogonal transform skip block in which orthogonal transform processing is skipped and an orthogonal transform block in which the orthogonal transform is performed.

(21) An image processing device including:
a decoding unit that decodes coded data and generates a quantized coefficient; and
an inverse quantization unit that uses a weighting coefficient applied to an orthogonal transform skip block, in which orthogonal transform processing is skipped, to inversely quantize the quantized coefficient of the orthogonal transform skip block generated by the decoding unit.

(22) The image processing device according to (21), wherein the inverse quantization unit uses the one weighting coefficient.

(23) The image processing device according to (22), wherein the inverse quantization unit inversely quantizes a quantized coefficient of an orthogonal transform skip block having a block size of 4×4, using the weighting coefficient.

(24) The image processing device according to (23), further including a receiving unit that receives skip enable information transmitted as a picture parameter set and indicating whether or not to enable the skip of the orthogonal transform processing.

(25) The image processing device according to (24), wherein the receiving unit further receives the transmitted weighting coefficient, and the inverse quantization unit inversely quantizes the quantized coefficient of the orthogonal transform skip block, using the weighting coefficient received by the receiving unit.

(26) The image processing device according to (21), wherein the inverse quantization unit inversely quantizes a quantized coefficient of a non-orthogonal transform skip block in which the orthogonal transform processing is performed, using a quantization matrix different from a weighting coefficient matrix obtained by performing matrix processing on the weighting coefficient.

(27) The image processing device according to (24), further including a transmission unit that extracts a desired channel signal by receiving broadcasting signals and obtains coded data by decoding the extracted signal,
wherein the decoding unit decodes the coded data obtained from the broadcasting signals by the transmission unit.

(28) The image processing device according to (24), further including a demultiplexer that demultiplexes the transmitted coded data to separate into video coded data and audio coded data,
wherein the decoding unit decodes the video coded data separated from the audio coded data by the demultiplexer.

(29) The image processing device according to (24), further including a reproduction unit that reproduces video data obtained by performing decoding by the decoding unit and inverse quantization processing by the inverse quantization unit on the coded data.

(30) The image processing device according to (24), further including an audio codec unit that performs encoding and decoding on audio data.

(31) The image processing device according to (24), further including a reproduction unit that reads out coded data recorded on a storage medium,
wherein the decoding unit decodes the coded data read out from the storage medium by the reproduction unit.

(32) An image processing method including:
decoding coded data and generating a quantized coefficient; and
inversely quantizing the generated quantized coefficient of the orthogonal transform skip block using a weighting coefficient applied to an orthogonal transform skip block in which orthogonal transform processing is skipped.

REFERENCE SIGNS LIST

100 Image encoding device
104 Orthogonal transform unit
105 Quantization unit
106 Lossless encoding unit
108 Inverse quantization unit
109 Inverse orthogonal transform unit 111 Deblocking filter
121 Orthogonal transform skip unit
131 Skip encoding unit
132 Skip determination unit
141 Quantization matrix setting unit
142 Weighting coefficient generation unit
143 Quantization processing unit
151 Boundary determination unit
152 Strength adjustment unit
153 Filtering unit
200 Image decoding device
202 Lossless decoding unit
203 Inverse quantization unit
204 Inverse orthogonal transform unit
206 Deblocking filter
221 Inverse orthogonal transform skip unit
231 TransformSkipFlag buffer
232 Control signal generation unit
241 Quantization matrix buffer
242 Weighting coefficient generation unit
243 Quantization parameter buffer
244 Inverse quantization unit
251 Boundary determination unit
252 Strength adjustment unit
253 Filtering unit

The invention claimed is:

1. An image processing device comprising:
 circuitry configured to:
 decode coded data and generate quantized coefficients and inversely quantize the generated quantized coefficients of an orthogonal transform skip block in which orthogonal transform processing is skipped, using a quantization matrix with coefficients having the same values.

2. The image processing device according to claim 1, wherein the quantization matrix is 4×4 matrices.

3. The image processing device according to claim 1, wherein the circuitry is further configured to inversely quantize a quantized coefficient of an orthogonal transform skip block having a block size of 4×4, using the quantization matrix.

4. The image processing device according to claim 1, wherein the circuitry is further configured to skip enable information transmitted as a picture parameter set and indicating whether or not to enable the skip of the orthogonal transform processing.

5. The image processing device according to claim 1, wherein the circuitry is further configured to inversely quantize a quantized coefficient of a non-orthogonal transform skip block subjected to orthogonal transform processing, using a quantization matrix different from the quantization matrix.

6. The image processing device according to claim 1, wherein the circuitry is further configured to extract a desired channel signal by receiving broadcasting signals and obtains coded data by decoding the extracted desired channel signal,
 wherein the circuitry decodes the coded data obtained from the broadcasting signals received.

7. The image processing device according to claim 1, wherein the circuitry is further configured to demultiplex the coded data to separate into video coded data and audio coded data,
 wherein the circuitry decodes the video coded data separated from the audio coded data.

8. The image processing device according to claim 1, wherein the circuitry is further configured to reproduce video data obtained by performing decoding and inverse quantization processing on the coded data.

9. The image processing device according to claim 1, wherein the circuitry is further configured to perform encoding and decoding on audio data.

10. The image processing device according to claim 1, wherein the circuitry is further configured to read out coded data recorded on a storage medium,
 wherein the circuitry decodes the coded data read out from the storage medium.

11. An image processing method comprising:
 decoding coded data and generating quantized coefficients;
 inversely quantizing the generated quantized coefficients of an orthogonal transform skip block in which orthogonal transform processing is skipped, using a quantization matrix with coefficients having the same values.

* * * * *